US012330781B1

(12) United States Patent
Thalheimer et al.

(10) Patent No.: US 12,330,781 B1
(45) Date of Patent: Jun. 17, 2025

(54) WING-IN-GROUND EFFECT VEHICLES AND METHODS OF CONTROL

(71) Applicant: REGENT Craft Inc., Burlington, MA (US)

(72) Inventors: William Thalheimer, Waltham, MA (US); Michael Klinker, Hollis, NH (US); William Bryan Baker, Cohasset, MA (US); Edward Lester, Somerville, MA (US); Daniel Cottrell, Centreville, VA (US); Christian Bailey, Palo Alto, CA (US); David Larson, Medford, MA (US); Bradley C. Buskirk, Charlotte, NC (US); Jason Castriota, Stamford, MA (US); Marco Borge, Volpiano (IT); Andrew Gregg, Roslindale, MA (US); Andrew Levin, Cambridge, MA (US); Michael Christopher Tilley, Amherst, NH (US)

(73) Assignee: REGENT Craft Inc., North Kingstown, RI (US)

( * ) Notice: Subject to any disclaimer, the term of this patent is extended or adjusted under 35 U.S.C. 154(b) by 72 days.

(21) Appl. No.: 17/885,523

(22) Filed: Aug. 10, 2022

Related U.S. Application Data

(63) Continuation-in-part of application No. 17/885,463, filed on Aug. 10, 2022, now Pat. No. 12,116,139, and
(Continued)

(51) Int. Cl.
    B64C 35/00 (2006.01)
    B60F 5/02 (2006.01)

(52) U.S. Cl.
    CPC ........... B64C 35/006 (2013.01); B60F 5/02 (2013.01); B64C 35/007 (2013.01); B64C 35/008 (2013.01)

(58) Field of Classification Search
    CPC ....... B64C 13/16; B64C 35/00; B64C 35/006; B64C 35/007; B63B 79/00; B63B 1/24
    See application file for complete search history.

(56) References Cited

U.S. PATENT DOCUMENTS

| 1,840,716 A | 1/1932 | Hitt |
| 1,881,141 A | 10/1932 | Sikorsky |

(Continued)

FOREIGN PATENT DOCUMENTS

| GB | 2347909 A | 9/2000 |
| RU | 2661277 C1 | 7/2018 |

OTHER PUBLICATIONS

International Searching Authority, PCT International Search Report and Written Opinion, PCT International Application No. PCT/US2022/015979 dated May 30, 2022, 15 pages.
(Continued)

*Primary Examiner* — Michael C Zarroli
*Assistant Examiner* — Ka Chun Leung
(74) *Attorney, Agent, or Firm* — Lee Sullivan Shea & Smith LLP

(57) ABSTRACT

A craft includes a hull, a wing, a hydrofoil, and a control system. The wing is configured to generate upwards aero lift as air flows past the wing to facilitate wing-borne flight of the craft. The hydrofoil is configured to generate upwards hydrofoil lift during a first mode of operation as water flows past the hydrofoil to facilitate hydrofoil-borne movement of the craft through the water. While the craft is hydrofoil-borne, the control system is configured to determine the upwards aero lift generated by the wing. The control system is further configured to control the hydrofoil to generate downwards hydrofoil lift to counteract the upwards aero lift generated by the wing that maintains the hydrofoil at least
(Continued)

partially submerged in the water while the determined upwards aero lift is below a threshold lift.

20 Claims, 35 Drawing Sheets

Related U.S. Application Data a continuation-in-part of application No. 17/875,942, filed on Jul. 28, 2022, which is a continuation-in-part of application No. 17/845,480, filed on Jun. 21, 2022, and a continuation-in-part of application No. 17/570,090, filed on Jan. 6, 2022, now Pat. No. 11,420,738, said application No. 17/845,480 is a continuation-in-part of application No. 17/570,090, filed on Jan. 6, 2022, now Pat. No. 11,420,738, application No. 17/885,523 is a continuation-in-part of application No. 17/845,480, filed on Jun. 21, 2022, and a continuation-in-part of application No. 17/570,090, filed on Jan. 6, 2022, now Pat. No. 11,420,738.

(60) Provisional application No. 63/281,594, filed on Nov. 19, 2021, provisional application No. 63/148,565, filed on Feb. 11, 2021.

(56) References Cited

U.S. PATENT DOCUMENTS

| | | | |
|---|---|---|---|
| 2,214,945 A | | 9/1940 | Weihmiller |
| 2,400,173 A | | 5/1946 | Slate |
| 2,942,810 A | | 6/1960 | Hanning-Lee et al. |
| 3,139,059 A | * | 6/1964 | Hanford, Jr. ............ B63B 1/322 440/37 |
| 3,498,247 A | | 3/1970 | Handler |
| 4,080,922 A | | 3/1978 | Brubaker |
| 4,484,721 A | | 11/1984 | Gue |
| 4,926,773 A | * | 5/1990 | Manor .................... B63B 1/322 114/274 |
| 5,018,686 A | | 5/1991 | Zimmer |
| 6,547,181 B1 | | 4/2003 | Hoisington et al. |
| 6,732,672 B2 | | 5/2004 | Shin et al. |
| 7,275,493 B1 | | 10/2007 | Brass |
| 7,322,872 B2 | | 1/2008 | Butler et al. |
| 8,651,431 B1 | | 2/2014 | White et al. |
| 9,156,550 B2 | | 10/2015 | Nam |
| 9,688,356 B2 | | 6/2017 | Schulz |
| D843,919 S | | 3/2019 | Tzarnotzky et al. |
| D872,681 S | | 1/2020 | Tzarnotzky et al. |
| D873,200 S | | 1/2020 | Langford et al. |
| D988,226 S | | 6/2023 | Bevirt et al. |
| D988,926 S | | 6/2023 | Prager et al. |
| D996,339 S | | 8/2023 | Morris et al. |
| D1,005,211 S | | 11/2023 | Cummings |
| D1,007,366 S | | 12/2023 | Morris et al. |
| D1,009,696 S | | 1/2024 | Tao et al. |
| D1,009,697 S | | 1/2024 | Hesselbarth |
| 2007/0245943 A1 | | 10/2007 | Rice |
| 2014/0312177 A1 | | 10/2014 | Gaonjur |
| 2016/0280332 A1 | | 9/2016 | Schulz et al. |
| 2019/0291863 A1 | | 9/2019 | Lyasoff et al. |
| 2022/0250743 A1 | | 8/2022 | Thalheimer et al. |
| 2022/0324560 A1 | | 10/2022 | Klinker et al. |
| 2022/0382300 A1 | | 12/2022 | Larson et al. |
| 2023/0062717 A1 | | 3/2023 | Thalheimer et al. |
| 2024/0158091 A1 | | 5/2024 | Klinker et al. |

OTHER PUBLICATIONS

International Searching Authority, PCT International Search Report and Written Opinion, PCT International Application No. PCT/US2022/040012 dated Nov. 17, 2022, 11 pages.

Alcock, Charles; "How electric propulsion and blown-wing technology have liberated aircraft" Jan. 14, 2022, 3 pages.

Northrop XP-79. Wikipedia, Northrop Corporation, Oct. 18, 2023, Retrieved from the Internet: URL:<https://en.wikipedia.org/wiki/Northrop_XP-79>.

Van Beek et al. "Progress Report on Aerodynamic Analysis of a Surface Piercing Hydrofoil-Controlled Wing-In-Ground Effect SEABUS Configuration", The Netherlands, Oct. 5-8, 1998, 21 pages.

Mobile Blended Wing Unmanned Aerial Vehicle. Swift Engineering (n.d.). Killer Bee UAS, 2022, Retrieved from the Internet: URL:<https://www.swiftengineering.com/r-and-d/killer-bee-uas/>.

RQ-21A Blackjack, A versatile and multi-mission UAS serving the needs of the U.S. Navy and Marine Corps. Boeing, 2023, Retrieved from the Internet: URL: <https://www.boeing.com/defense/autonomous-systems/rq-21a-blackjack#solution>.

Tailsitter UAV. Tailsitters vs. quadplanes—why a VTOL tailsitter is the best surveying drone for your mapping missions. Wingtra, Nov. 29, 2018, Retrieved from the Internet: URL:<https://wingtra.com/tailsitters-vs-quadplanes-why-a-vtol-tailsitter-is-the-best-surveying-drone-for-your-mapping-missions/>.

Goebel, Greg. "The Wing" with twin-boom tail. Northrop's Flying Wings, Northrop, Mar. 1, 2023, Retrieved from the Internet: URL:<https://www.airvectors.net/avflwing.html>.

Bullard, Douglas. The 1929 Flying Wing. Northrop Nurflügels, 2023,Retrieved from the Internet: URL:<https://www.nurflugel.com/Nurflugel/Northrop/flying_wing/flying_wing.html>.

Synergy Aircraft Synergy. Wikipedia, DBT Aero, Aug. 10, 2021, Retrieved from the Internet: URL:<https://en.wikipedia.org/wiki/Synergy_Aircraft_Synergy>.

Ringbeck. "A 3D time of flight camera for object detection." Optical 3-D Measurement Techniques, PMDTechnologies GmbH, 2007, 10 pages.

\* cited by examiner

HULL-BORNE OPERATION

HYDROFOIL-BORNE
MANEUVERING OPERATION

HYDROFOIL-BORNE TAKEOFF
OPERATION

| Procedure | Craft Pitch | | Hydrofoil Control Surfaces | | Hydrofoil Incidence Angle Adjustment | | Control of Release | |
|---|---|---|---|---|---|---|---|---|
| | Constant Pitch | Increased Pitch | Control Ride Height | Control Extended Hold | Control Ride Height | Control Extended Hold | Active | Passive |
| A) Fixed Foil, Constant Pitch, No Hold | X | | X | | | | | |
| B) Fixed Foil, Constant Pitch, With Hold | X | | X | X | | | | |
| C) Fixed Foil, Increasing Pitch, With Hold | | X | X | X | | | | |
| D) Variable Foil, Passive Release, Increasing Pitch, With Hold | | X | X | X | X | X | | X |
| E) Variable Foil, Active Release, Increasing Pitch, With Hold | | X | X | X | X | X | X | |

WING-IN-GROUND EFFECT VEHICLES AND METHODS OF CONTROL

CROSS-REFERENCE TO RELATED APPLICATIONS

This application is a continuation-in-part of, and claims the benefit of priority under 35 U.S.C. § 120 to, U.S. patent application Ser. No. 17/885,463, filed on Aug. 10, 2022.

This application is also a continuation-in-part of, and claims the benefit of priority under 35 U.S.C. § 120 to, U.S. patent application Ser. No. 17/875,942, filed on Jul. 28, 2022, which is a continuation-in-part of U.S. patent application Ser. No. 17/845,480, filed on Jun. 21, 2022, which is a continuation-in-part of U.S. patent application Ser. No. 17/570,090, filed on Jan. 6, 2022, which claims priority to U.S. Provisional Patent App. No. 63/148,565, filed on Feb. 11, 2021, and U.S. Provisional Patent App. No. 63/281,594, filed on Nov. 19, 2021.

This application is also a continuation-in-part of, and claims the benefit of priority under 35 U.S.C. § 120 to, U.S. patent application Ser. No. 17/845,480, filed on Jun. 21, 2022, which is a continuation-in-part of U.S. patent application Ser. No. 17/570,090, filed on Jan. 6, 2022, which claims priority to U.S. Provisional Patent App. No. 63/148,565, filed on Feb. 11, 2021, and U.S. Provisional Patent App. No. 63/281,594, filed on Nov. 19, 2021.

This application is also a continuation-in-part of, and claims the benefit of priority under 35 U.S.C. § 120 to, U.S. patent application Ser. No. 17/570,090, filed on Jan. 6, 2022, which claims priority to U.S. Provisional Patent App. No. 63/148,565, filed on Feb. 11, 2021, and U.S. Provisional Patent App. No. 63/281,594, filed on Nov. 19, 2021.

The contents of each of the foregoing applications are incorporated by reference herein in their entireties.

FIELD OF THE DISCLOSURE

This disclosure is related to various vehicles including wing-in-ground effect vehicles (WIGs) and methods for operating such vehicles.

BACKGROUND

A WIG is an aircraft vehicle capable of moving over a surface (e.g., earth or water) by gaining support from the reactions of the air against one or more surfaces of the vehicle. When such a vehicle hovers relatively close to the surface, the drag experienced by the vehicle is reduced. For example, the drag on a WIG is reduced when its distance from the ground is within about half the length of the vehicle's wingspan.

BRIEF DESCRIPTION OF THE DRAWINGS

Features, aspects, and advantages of the presently disclosed technology may be better understood with regard to the following description, appended claims, and accompanying drawings where:

FIG. 11 is a table that summarizes aspects of some procedures that facilitate hydrofoil-borne takeoff operations, in accordance with example embodiments;

Figure 1A:
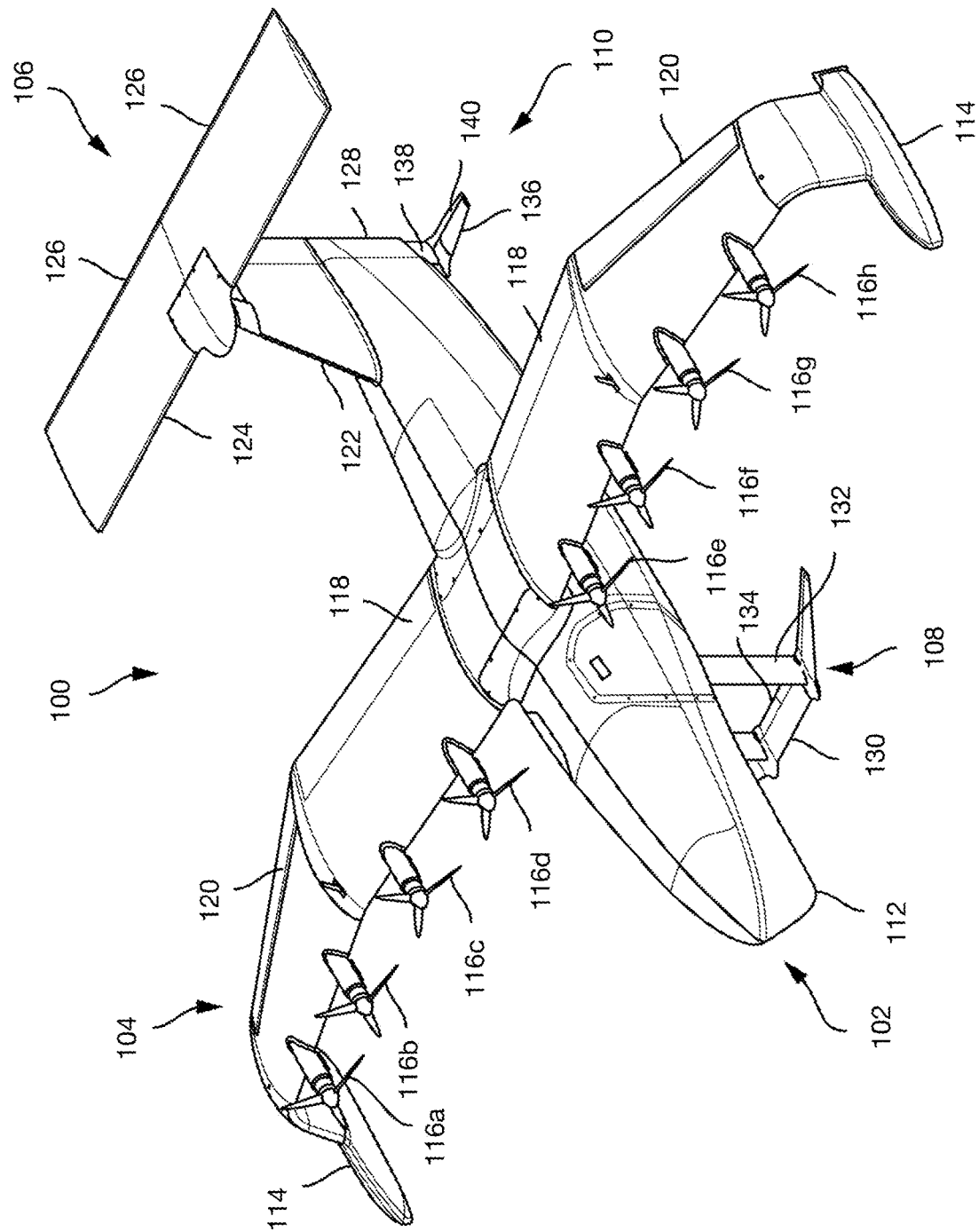
FIG. 1A depicts a perspective view of a craft, in accordance with example embodiments.
Figure 1B:
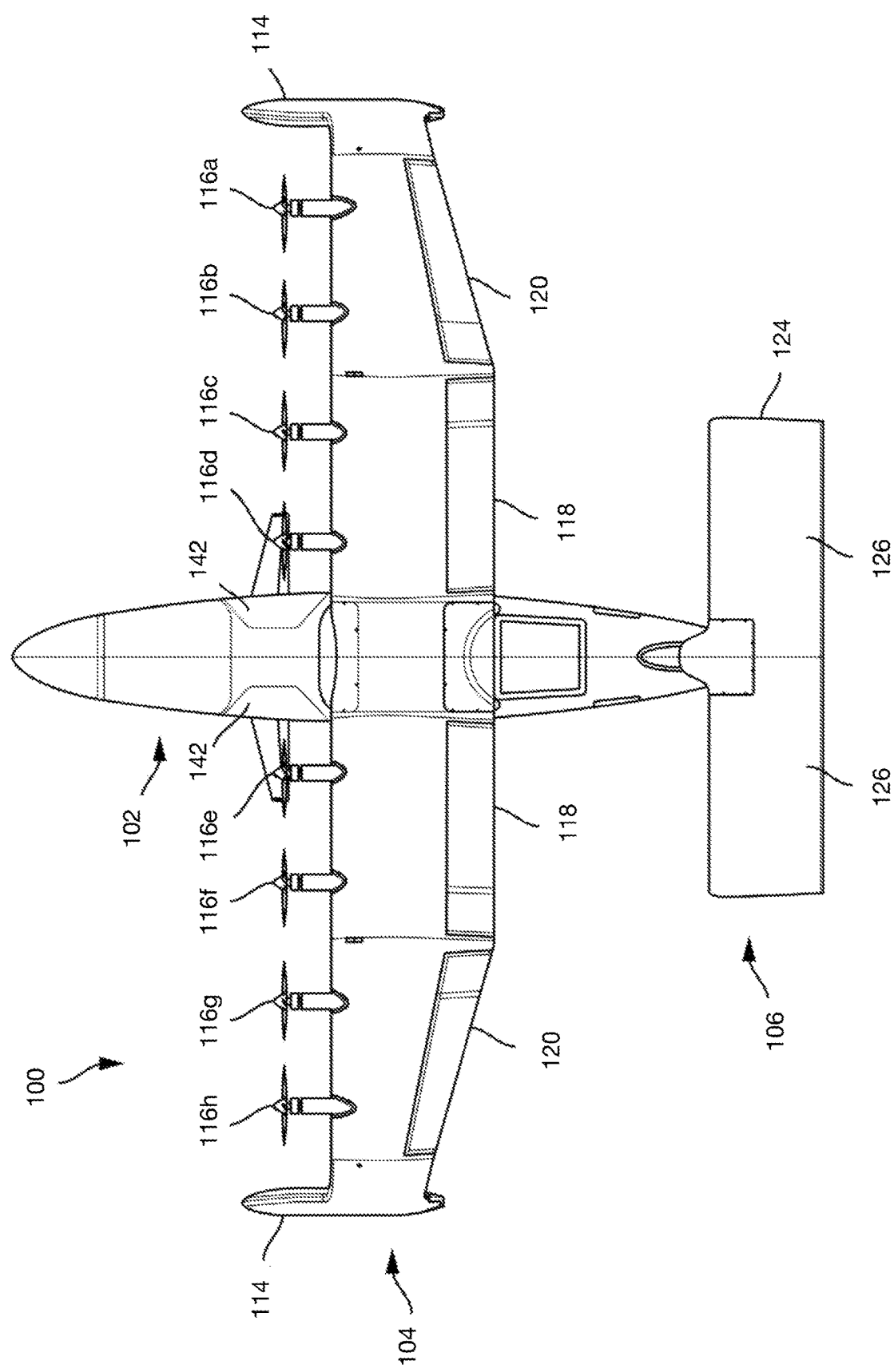
FIG. 1B depicts a top view of a craft, in accordance with example embodiments.
Figure 1C:
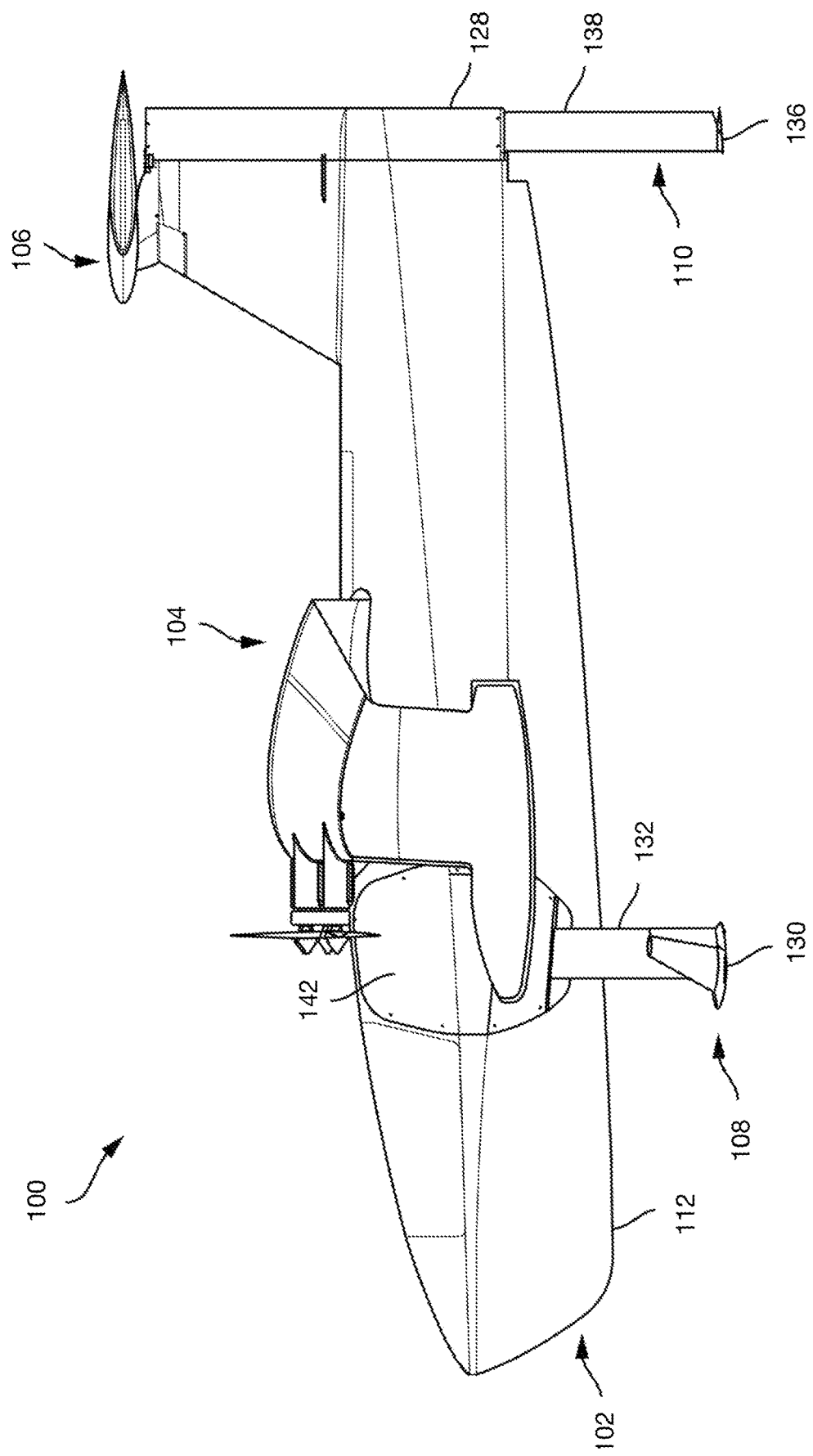
FIG. 1C depicts a side view of a craft, in accordance with example embodiments.

The drawings are for the purpose of illustrating example embodiments, and it is to be understood that the present disclosure is not limited to the arrangements and instrumentalities shown in the drawings.

DETAILED DESCRIPTION

Various examples of systems, devices, and/or methods are described herein. Any embodiment, implementation, and/or feature described herein as being an "example" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, terms such as "A coupled to B" or "A is mechanically coupled to B" do not require members A and B to be directly coupled to one another. It is understood that various intermediate members may be utilized to "couple" members A and B together.

Moreover, terms such as "substantially" or "about" that may be used herein, are meant that the recited characteristic, parameter, or value need not be achieved exactly but that deviations or variations, including, for example, tolerances, measurement error, measurement accuracy limitations and other factors known to skill in the art, may occur in amounts that do not preclude the effect the characteristic was intended to provide.

I. Introduction

In some applications as disclosed herein, an airborne vehicle according to the present teachings can be an aircraft for conventional fully aerodynamic flight, a wing-in-ground effect vehicle, a hydrofoil vehicle, or a combination thereof. In one embodiment, the airborne vehicle is a seaglider capable of transitioning from a hydrofoil phase of operation to airborne phase of operation. Therefore, it should be appreciated that the present teachings may find utility in a wide variety of applications. Accordingly, the present teachings should not be limited to any one type of vehicle unless specifically stated and/or claimed.

The example vehicles described herein include features designed to create a more comfortable passenger experience and wider environmental operating range compared to existing vehicles. Advantages may include, but are not limited to, more comfortable takeoff and landing maneuvers, a smaller turning radius, a higher cruise efficiency, increased flight stability and safety, decreased operating costs, and the ability to operate comfortably in high seas and at low speeds in crowded harbors. The vehicles (e.g., WIGs) described herein are designed to fly over bodies of water and can therefore be used for transporting people and/or cargo between coastal destinations or between shore and offshore infrastructure. The WIGs can emit zero emissions during operation by utilizing an all-electric drivetrain that sources energy from a battery or hydrogen fuel cell system.

The WIGs described herein are configured to operate in at least three different operational modes including a first waterborne mode in which the hull of the WIG is at least partially submerged in water, a second waterborne mode in which the hull of the WIG is elevated above the water while one or more hydrofoils of the WIG are at least partially submerged in water, and an airborne mode in which the entire WIG is elevated above the water in ground-effect flight. Unlike existing vehicles, the WIGs described herein may operate in each of these three modes over extended distances and times.

In order to provide such improvements over existing vehicles, the WIGs described herein can combine multiple different technologies including (i) an electric powertrain in a distributed blown-wing configuration, (ii) a retractable hydrofoil system, (iii) digital flight control systems for stabilizing the WIG and controlling an altitude of the WIG near a water surface, and (iv) control systems for detecting and avoiding maritime traffic and obstacles. These technologies are explained in further detail below.

Some WIG craft include fixed hydrofoils that create additional upward lift while the WIG is waterborne to reduce the wetted surface area on the vehicle's hull at intermediate speeds prior to takeoff. However, because WIGs need to fly at very low altitudes when wing-borne, the fixed hydrofoils need to be very short to avoid colliding with the water during flight. As a result, the fixed hydrofoils in these WIGs do not lift the hull of the vehicle above the water waves during waterborne operation. As such, these vehicles cannot (a) operate in rough seas or (b) operate at medium speeds (e.g., between the low speeds of a hull-borne operational mode and the high speeds of a wing-borne flight mode) in crowded harbors.

Disclosed herein are various examples of WIG craft that overcome these and other drawbacks of prior WIG craft. Some examples of these WIG craft correspond to seagliders and include and implement features disclosed in U.S. patent application Ser. No. 17/570,090, filed on Jan. 6, 2022, and issued as U.S. Pat. No. 11,420,738 on Aug. 23, 2022 (hereinafter the '090 application), and U.S. patent application Ser. No. 17/845,480, filed on Jun. 21, 2022 (hereinafter the '480 application). The '090 and '480 applications are incorporated herein by reference in their entireties. The '090 application describes, among other things, a seaglider that includes a pair of retractable hydrofoils (e.g., front and rear hydrofoils) that facilitate a hydrofoil-borne operation, described further below. The '480 application describes, among other things, a seaglider that implements a bi-plane tail.

Some examples of these craft are configured to transition through several operating modes when preparing for takeoff. For instance, an example of such a craft operates in a hull-borne mode while near docks or in no-wake zones. While in this mode, the hull of the craft is in the water, and the craft may move at low speeds (e.g., less than 20 mph). The craft next transitions to a hydrofoil-borne mode of operation. While in this mode, the craft is supported by the hydrofoils, and the hull is substantially lifted out of the water. The craft may operate in this mode while traveling through harbors and crowded waterways and may move at increased speeds (e.g., between 20-45 mph). The craft next transitions to a wing-borne mode of operation. While in this mode, the craft is urged out of the water by the lift generated by the wings. The craft may operate in this mode while in open waters and at further increased speeds (e.g., between 45 mph). It should be understood that the example parameters and characteristics (including operating heights and speeds) provided herein are provided for purposes of example and explanation only and should not be taken as limiting.

The hydrofoil-borne mode of operation allows for a wide range of benefits. For instance, operating in hydrofoil-borne mode facilitates a high degree of maneuverability and greater speed while in harbors and crowded waterways. Additionally, the one or more hydrofoils help address the challenges faced by other WIG craft that transition directly from a hull-borne mode to a wing-borne mode of operation. These WIG craft experience significant hull-induced drag while taking off. Such drag is not experienced by the craft disclosed herein because the craft are hydrofoil-borne during takeoff.

An ability for a craft to take off from the hydrofoil-borne mode is desirable for several reasons. For instance, the craft would be expected to be operating in hydrofoil-borne mode prior to initiating a takeoff procedure (e.g., while navigating a crowded harbor). Therefore, transitioning back to the hull-borne mode of operation prior to takeoff could be uncomfortable for passengers. Further, taking off while in the hydrofoil-borne mode of operation minimizes disturbances that would otherwise be felt by passengers due to choppiness/turbulence of the water waves, which can be exacerbated at higher speeds.

Thus, some examples of successful take-off procedures of the craft generally involve, when initially in a hull-borne borne mode of operation, causing the craft to increase speed over water. Once the craft reaches a sufficient speed, the craft enters the hydrofoil-borne mode of operation and continues to accelerate. Once sufficient lift is generated by the wings of the craft (e.g., lift corresponding to the weight of the craft or within some margin thereof), the craft transitions to a wing-borne mode of operation.

In general, to sustain takeoff and accomplish flight, the aero lift, $L_W$, generated by the wings of the craft and/or lift generated by other aspects of the craft such as, for example, tilted rotors that provide vertical thrust, should exceed the weight, $W_{CRAFT}$, of the craft. (See FIG. 7A). A variety of factors impact the magnitude of aero lift, including, for example, the size and shape of the wings of the craft, the angle at which the wings meet the oncoming air (angle of attack or "AOA"), the speed at which the wings move through the air, the density of the air, etc. Of particular importance are those factors that are controllable through the course of a takeoff procedure, e.g., the speed of the craft and the pitch of the craft (corresponding to the AOA of the wings). (Note, while the lift, $L_F$, generated by the hydrofoil can be positive, this lift does not generally contribute to the lift of the craft once in flight because (a) the hydrofoil is no longer in the water and (b) as described further below, the hydrofoil is eventually retracted into (or towards) the craft once the craft is operating in wing-borne mode.)

During takeoff procedures for a conventional land-based craft, the craft gradually increases speed, thereby gradually increasing the aero lift, $L_W$, prior to take-off and flight. Once the craft has achieved sufficient speed, the AOA of the craft is increased, e.g., by pitching the nose of the craft upward. This further contributes to an increase in the aero lift, $L_W$, and eventually causes the craft to take off and maintain flight.

Conceptually, the takeoff procedure of the example craft disclosed herein are similar in some respects. For instance, in one example, the craft gains the speed needed to obtain the required aero lift, $L_W$, while the craft is in the hydrofoil-borne mode of operation (i.e., traveling through water vs over the water). In some examples, additional lift can be generated, for example, using tilted rotors or the like that provide vertical thrust/lift. However, transitioning from the hydrofoil-borne mode of operation to the wing-borne mode of operation is complicated and/or may be interrupted or frustrated due to the effect/force on the craft by the hydrofoil in the water.

As noted above, hydrofoils, like wings, generate an associated lift, $L_F$, due to the force of water passing under the hydrofoils as the craft gains speed. In a normal/standard arrangement, the net lift, $L_{NET}$, is positive. That is, the lift is upward and urges the craft out of the water. In this respect, $L_F$ and $L_W$ normally act in concert to urge the craft out of the water as the craft increases in speed. Some approaches to takeoff might involve attempting to increase the speed of the craft sufficiently while in the hydrofoil-borne mode of operation to eventually take off and gain flight. Moreover, such approaches might involve, at some point during take-off, increasing the pitch of the craft, leading to increased wing AOA, to assist in increasing $L_W$ (and/or perhaps $L_F$) to contribute to increased lift and achievement of flight.

However, there are several challenges with such approaches. For instance, in testing this approach, applicants found that craft were unable to take flight after the speed of the craft was ramped towards a threshold lift speed at which the combination of $L_W$ and $L_F$ would theoretically exceed the weight of the craft. When the craft reached the threshold lift speed, and the AOA was increased, both the nose of the craft and the hydrofoil rotated upward. However, the positive lift provided by the hydrofoil, $L_F$, became negligible after the hydrofoil breached the surface of the water, and the remaining aero lift, $L_W$, was insufficient to sustain flight. As a result, once the hydrofoil left the water, the craft came back down into the water, thereby disrupting and/or frustrating and ultimately preventing takeoff from hydrofoil-borne operation to wing-borne operation. In other testing, applicants found that the angle of attack of the craft would abruptly increase. This, in turn, induced a stall condition in the craft, which prevented the craft from sustaining flight.

The example craft disclosed herein address these issues by modifying and improving the takeoff procedures described above to ensure that the aero lift, $L_W$, is sufficiently large prior to the point in the procedure at which the hydrofoils are to be removed from the water to facilitate allowing the craft to become wing-borne.

In some examples, an additional "negative" lift, $L_F$, is introduced via the hydrofoil while the craft is increasing in speed in anticipation of takeoff to "hold" the hydrofoils and, therefore, the craft in the water. As a result, the craft can further increase in speed and generate greater overall aero lift, $L_W$, without causing the craft to take flight and/or pitch up such that the front hydrofoil breaches the surface of the water (possibly leading to the failure described above).

In some examples, at an appropriate time after the "negative" lift, $L_F$, is introduced (e.g., when $L_W$ exceeds or is within some margin of the weight, $W_{CRAFT}$, of the aircraft according to some predetermined threshold), the negative lift, $L_F$, implemented via the hydrofoil can be "released," and the craft can, as a result, proceed to take off and gain sustained flight. These aspects are discussed in more detail below.

In some examples, the "hold" is not released. Rather, as the craft accelerates, the hydrofoil lift, $L_F$, generated by the hydrofoil increases to a maximum amount, which can be a predetermined maximum amount and/or a maximum amount achievable due to the control capabilities of the hydrofoil. Afterwards, as the aero lift, $L_W$, generated by the wings continues to increase, the aero lift, $L_W$, pulls the craft from the water. This can help prevent an abrupt increase in the AOA of the craft, which can, in some instances, "throw" the craft out of the water and cause the craft to stall, thereby frustrating further takeoff procedures.

To implement aspects of the above-described take-off procedures, some examples of the craft comprise a control system configured to coordinate and control the transition of the craft from waterborne to hydrofoil-borne operation and from hydrofoil-borne to wing-borne operation. For instance, some examples of the control system are configured to cause one or more hydrofoils of the craft to extend and retract as needed (e.g., extend prior to taking off and retract when the craft is wing-borne). Some examples of the control systems are configured to control the actions of various control surfaces of the craft (e.g., flaps, ailerons, elevators, rudders, etc.) to stabilize the craft and control the altitude of the craft when near the water surface, etc.

Some examples of the craft are configured to control the articulation of the one or more hydrofoils and/or the various control surfaces of the one or more hydrofoils which can modify the amount of downwards hydrofoil lift, $L_F$, generated by the one or more hydrofoils when the craft is in hydrofoil-borne mode. For instance, some examples of the hydrofoils comprise one or more flaperons, ailerons, elevators, etc. The control system is configured to adjust respective deflection angles of one or more of these components to thereby control the downwards hydrofoil lift, $L_F$, generated by the hydrofoils. In some examples, the control system is configured to control the overall angle of attack of one or more of the hydrofoils to thereby control the downwards hydrofoil lift, $L_F$, generated by the hydrofoils.

In some examples, while the craft is hydrofoil-borne, the control system is configured to control one or more of the hydrofoils to generate a downwards hydrofoil lift, $L_F$, that maintains the hydrofoil at least partially submerged in the water until after the lift generated by the main wing of the craft reaches a threshold lift. In some examples, the threshold lift is greater than or equal to an amount of lift required to be generated by the main wing to allow the craft to transition from hydrofoil-borne movement through the water to wing-borne flight in the air. By controlling the hydrofoil to generate downwards lift that counteracts the upwards aero lift generated by the main wing until the amount of upwards aero lift exceeds the threshold amount of upwards aero lift, the control system prevents the craft from leaving the hydrofoil-borne mode of operation until after the main wing generates enough lift to facilitate the transition of the craft to the wing-borne mode of operation, from which the craft can proceed to gain altitude.

In some examples, the hydrofoil is controlled to generate an actively derived, predetermined, or fixed amount of downwards hydrofoil lift that is sufficient to keep the hydrofoil submerged after the main wing produces sufficient lift to sustain wing-borne flight after the craft leaves the water. For instance, in some examples, the downwards hydrofoil lift generated by the hydrofoil is sufficient to keep the hydrofoil at least within a margin of distance below the surface of the water until after the lift generated by the main wing is sufficient to sustain wing-borne flight. Afterward, the hydrofoil breaches the surface of the water and no longer exhibits any appreciable downwards hydrofoil lift. In some examples, the control system is configured to control the hydrofoil to increase the downwards hydrofoil lift generated by the hydrofoil in proportion to an increase in the lift generated by the main wing.

In some examples, the control system is configured to control the hydrofoil to decrease the downwards hydrofoil lift generated by the hydrofoil after the lift generated by the main wing reaches the threshold lift. For instance, in an example, the downwards hydrofoil lift generated by the hydrofoil is initially selected so that when the lift generated by the main wing reaches the threshold above, the hydrofoil is about a meter below the surface of the water. At this point, the control system controls the hydrofoil to decrease or release the downwards hydrofoil lift. This, in turn, causes the craft to rise, bringing the hydrofoil out of the water so that the craft can transition from hydrofoil-borne to wing-borne operation. In some examples, the angle of attack/pitch of the craft, deflection angles of one or more control surfaces of the wings, etc., can be adjusted to generate additional aero lift.

In some examples, as the craft accelerates, the control system is configured to control the hydrofoil to increase the hydrofoil lift, $L_F$, generated by the hydrofoil to a maximum amount, which can be a predetermined maximum amount and/or a maximum amount achievable due to the control capabilities of the hydrofoil. Afterwards, as the aero lift, $L_W$, generated by the wings continues to increase, the hydrofoil is elevated out of the water so that the craft can transition from hydrofoil-borne to wing-borne operation. In some examples, the angle of attack/pitch of the craft, deflection angles of one or more control surfaces of the wings, etc., can be adjusted to generate additional aero lift.

Some examples of the control system are configured to determine the lift generated by the main wing based at least in part on one or more of the speed of the craft, an angle of attack of the main wing, a sensed load force imparted on the hydrofoil, etc.

In some examples, the craft comprises at least one hull, at least one wing, at least one hydrofoil, and a control system. The at least one wing is configured to generate upwards aero lift as air flows past the wing to facilitate wing-borne flight of the craft. The at least one hydrofoil is configured to generate upwards hydrofoil lift during a first mode of operation as water flows past the hydrofoil to facilitate hydrofoil-borne movement of the craft through the water. While the craft is hydrofoil-borne, the control system is configured to determine the upwards aero lift generated by the at least one wing. The control system is further configured to control the at least one hydrofoil to generate downwards hydrofoil lift that maintains the hydrofoil at least partially submerged in the water while the determined upwards aero lift is below a threshold lift.

In some examples, the craft comprises at least one hull, at least one wing, at least one hydrofoil, at least one processor system comprising one or more processors, and tangible, non-transitory computer-readable media. The at least one wing is configured to generate upwards aero lift as air flows past the at least one wing to facilitate wing-borne flight of the craft. The at least one hydrofoil is configured to generate upwards hydrofoil lift during a first mode of operation as water flows past the at least one hydrofoil to facilitate hydrofoil-borne movement of the craft through the water. The tangible, non-transitory computer-readable media comprises program instructions executable by the one or more processors to configure the craft to, among other features, (i) determine the upwards aero lift generated by the at least one wing as the craft accelerates over the water while in hydrofoil-borne operation, (ii) adjust downwards hydrofoil lift generated by the at least one hydrofoil based on the determined upwards aero lift (generated by the at least one wing) to maintain the at least one hydrofoil at least partially submerged in the water, and (iii) after determining that the upwards aero lift is above some predetermined threshold (e.g., in an example, a predetermined threshold that may be selected according to an amount of aero lift that is sufficient to allow the craft to sustain flight), decrease the amount of downwards hydrofoil lift generated by the at least one hydrofoil to allow the hydrofoil to exit the water. In operation, controlling when the hydrofoil exits the water allows the craft to improve control of the transition of the craft from hydrofoil-borne movement through the water to wing-borne movement through the air.

In some examples, a method for operating the craft comprises determining upwards aero lift generated by at least one wing of the craft as the craft accelerates while the craft is operating in a hydrofoil-borne mode over water. The method further comprises adjusting, based on the determined upwards aero lift (generated by the at least one wing), downwards hydrofoil lift generated by at least one hydrofoil of the craft to maintain the at least one hydrofoil at least partially submerged in the water, thereby causing the craft to remain in hydrofoil-borne operation. The method further comprises, after determining that the upwards aero lift is sufficient to allow the craft to sustain flight (or determining that the upwards aero lift generated by the at least one wing is above some threshold amount of upwards aero lift), decreasing the amount of downwards hydrofoil lift gener- ated by the hydrofoil to allow the hydrofoil to exit the water, thereby transitioning the craft from hydrofoil-borne operation to wing-borne operation.

In some examples, an airborne vehicle is provided having a body section; a main wing extending from the body section configured to generate aerodynamic lift, the main wing having one or more main wing control surfaces; and a tail assembly extending from the body section aft of the main wing. The tail assembly having a first tail member and a second tail member substantially parallel to each other. The first tail member having one or more control surfaces and the second tail member having one or more flap surfaces selectively deployable between a retracted position and an extended position. The flap surfaces being configured to increase a surface area and/or camber of the second tail member in the extended position.

Moreover, according to the principles of the present teachings, an airborne vehicle is disclosed having a multi-airfoil tail that provides a plurality of advantages over the prior art and may find utility in a wide range of applications, including, but not limited to, aircraft, WIGs, seagliders, and other vehicles configured to travel based at least in part on aerodynamic lift. In some embodiments of the present teachings, the multi-airfoil empennage and associated structure (generally referred to as multi-foil tail) is disclosed in connection with WIGs and/or seagliders. It should be understood that the detailed description below is provided in connection with WIGs, but aspects of the present teachings are equally applicable in connection with fully airborne flight, both within and outside of ground effect, and in connection with transition to airborne phase of operation from one or more of hydrofoil-, hull-, and float-borne phases of operation, and therefore should not be regarded as limited to WIGs specifically unless otherwise noted or claimed.

Further, WIGs such as those described herein may be operated at low altitudes over a water surface when in ground-effect flight. Vehicles operating at low altitudes over water surfaces experience unique conditions that other vehicles operating at higher altitudes or over different terrains experience. For instance, ocean waves occur in an earth-fixed (i.e., still) reference frame and typically have energy within a finite frequency bandwidth (effectively between 0 and 5 Hz). However, when the reference frame is not fixed but is instead that of a vehicle traveling with non-zero forward speed such as a ship or wing-in-ground effect vehicle, the observed frequency of the wave that the vehicle experiences is doppler shifted, both as a function of speed and heading with respect to the waves. Namely, the observed frequency of the waves encountered by the vehicle is given by the following equation:

$$\omega_{encounter} = \omega_{earth} - Uk\cos(\beta)$$

where $\omega_{encounter}$ is the frequency of wave oscillation the vehicle experiences, $\omega_{earth}$ is the earth-frame frequency the geophysical waves are oscillating at (as if observed by an observer standing still on a beach), k is the wave number, which is a property of the wave itself (not relating in any way to the vehicle or how it is moving, but related to the water depth, frequency of oscillation, and potentially other geophysical parameters), U is the forward speed of the vehicle, and $\beta$ is the wave heading with respect to the vehicle, defined such that $\beta=0$ radians when the waves are propagating in the same direction as the vehicle (also referred to as following waves), $\beta=\pi/2$ when the waves are propagating orthogonally to the direction of travel (also referred to as beam or side waves) and $\beta=\pi$ when the waves are propagating in the opposite direction as the vehicle (also referred to as head waves). Inspecting this relationship reveals how, when controlling a vehicle in a wavy environment, not only does altitude play a major role in the magnitude and frequency of excitations (and ability to move away from resonant peaks), but so does the speed and the heading of the vehicle.

The technologies described herein may help control a vehicle under these unique conditions experienced by WIGs or other vehicles operating at low altitudes over water surfaces. For instance, the present disclosure describes various examples of sensor systems and processes for measuring characteristics of a water surface beneath a vehicle in motion and using the measured characteristics as a basis for controlling operation of the vehicle. While the examples described herein are primarily described in connection with a WIG in airborne flight over the water surface or in hydrofoil-borne motion over the water surface, it should be understood that these examples may also be implemented in connection with other types of vehicles in other types of motion near a water surface where possible. For instance, in some examples, the sensor systems and processes described herein may be implemented in connection with a hydrofoil-borne watercraft in motion through a body of water with its hull lifted above the water surface due to the hydrodynamic lift force exerted on the watercraft's hydrofoil. In other examples, the sensor systems and processes described herein may be implemented in connection with an aircraft in flight above a body of water, such as a helicopter flying near the surface of the water. Still other examples may be possible as well.

II. Example Wing-In-Ground Effect Vehicles

FIGS. 1A-1G depict different views of an example WIG craft 100. As shown, the craft 100 may include a hull 102, a main wing 104, a tail 106, a main hydrofoil assembly 108, and a rear hydrofoil assembly 110. However, it should be understood that, in some examples, the craft 100 can be modified for conventional airborne flight from airport surfaces through modification of the hull and main wing airfoil, as well as the inclusion of a landing gear system. Accordingly, where possible, aspects of the present teachings may also be applicable to conventional airborne flight above ground-effect altitudes.

A. Hull

Some examples of the craft 100 are capable of operating in a first waterborne mode for extended periods of time, during which the hull 102 is at least partially submerged in water. As such, some examples of the hull 102 are configured to be watertight, particularly for surfaces of the hull that contact the water during this first waterborne operational mode. Further, some examples of the hull 102, as well as the entirety of the craft 100, are configured to be passively stable on all axes when floating in calm water. To help achieve this, the hull 102 may include a keel (or centerline) 112 which provides improved stability and other benefits described below. Further, some examples of the craft 100 may include various mechanisms for adjusting the center of mass of the craft 100 so that the center of mass aligns with the center of buoyancy of the craft 100. For instance, in some examples, a battery system (described in further detail below in connection with FIG. 2) of the craft 100 is coupled to one or more moveable mounts that may be moved by one or more servo motors or the like for repositioning the battery system and thereby redistributing the weight of the craft 100. A control system of the craft 100 may be configured to detect a change in its center of buoyancy, for instance, by detecting a rotational change via an onboard gyroscope, and responsively operate the servo motors to move the battery system until the gyroscope indicates that the craft 100 has stabilized. In other examples, the craft 100 may include a ballast system for pumping water or air to various tanks distributed throughout the hull 102 of the craft 100. The ballast system facilitates adjusting the center of mass of the craft 100 so that the center of mass aligns with the center of buoyancy of the craft 100. Other example systems may be used to control the center of mass of the craft 100 as well.

Additionally, or alternatively, some examples of the hull 102 may be configured to reduce drag forces when both waterborne and wing-borne. For instance, some examples of the hull 102 may have a high length-to-beam ratio (e.g., greater than or equal to 8), which facilitates reducing hydrodynamic drag forces when the craft 100 is under forward waterborne motion. In some examples, the keel 112 may be curved or rockered to improve maneuverability when waterborne. Further, some examples of the hull 102 may be configured to pierce the surface of waves (e.g., to increase passenger and crew comfort) by including a narrow, low-buoyancy bow portion of the hull 102.

B. Wing and Distributed Propulsion System

As shown in FIGS. 1A-1G, some examples of the main wing 104 may include an outrigger 114 at each end of the main wing 104. The outriggers 114 (which are sometimes referred to as "wing-tip pontoons") are configured to provide a buoyant force to the main wing 104 when submerged or when otherwise in contact with the water, which improves the stability of the craft 100 during waterborne operation.

Figure 1D:
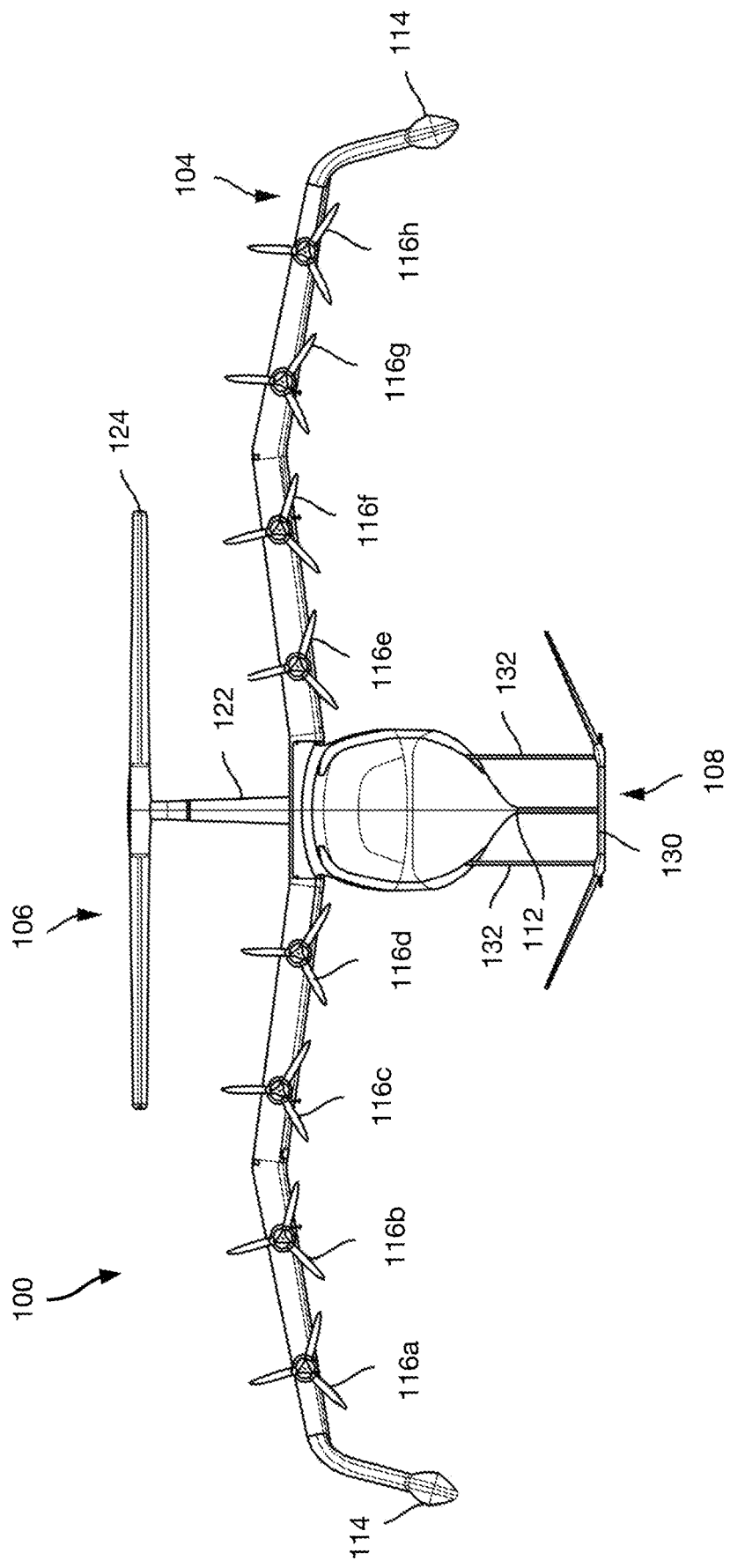
FIG. 1D depicts a front view of a craft, in accordance with example embodiments.

As shown in FIG. 1D, some examples of the main wing 104 may have a gull-wing shape such that the outriggers 114 at the ends of the main wing 104 are at the lowest point of the main wing 104 and are positioned approximately level with (or slightly above) a waterline of the hull 102 when the hull 102 is waterborne.

Further, some examples of the main wing 104 may have a high aspect ratio, which is defined as the ratio of the span of the main wing 104 to the mean chord of the main wing 104. In some examples, the aspect ratio of the main wing 104 is greater than or equal to five, or greater than or equal to six, but other example aspect ratios are possible as well. Such wings tend to have reduced pitch stability and maneuverability due to lower roll angular acceleration. These issues are ameliorated by various mechanisms described below. On the other hand, such wings tend to have increased roll stability and increased efficiency resulting from higher lift-to-drag ratios. Further, high aspect ratio wings provide a longer leading edge for the mounting of a distributed propulsion system along the wing.

As shown in the figures, some examples of the main wing 104 include a number of electric motor propeller assemblies 116 distributed across a leading edge of the main wing 104. This arrangement is referred to as a "blown-wing" propulsion system. Arranging the propeller assemblies 116 in this manner increases the speed of air moving over the main wing 104, which increases the lift generated by the main wing 104. This increase in lift allows the craft 100 to take off and become wing-borne at slower vehicle speeds. This facilitates, for example, taking off on water, which can be difficult at higher speeds due to the various forces that would otherwise act on the craft 100.

The electric motor propeller assemblies 116 tend to be much lighter, less complex, and smaller than the liquid-fueled engines used on conventional craft. Such electric motor propeller assemblies 116 can be controlled individually or collectively by an electronic speed controller and powered by an onboard battery system (e.g., a lithium-ion system, magnesium-ion system, lithium-sulfur system, etc.) or by some other onboard electrical supply system, such as a fuel cell or a centralized liquid-fueled electricity generator. In some examples, the onboard electrical supply system may include multiple systems for supplying power during different operational modes, such as a first battery system configured to deliver large amounts of power during takeoff and a second system with a higher energy density but lower peak power capability for delivering sustained lower power during cruise operation (e.g., during hydrofoil waterborne operation or during wing-borne operation, each of which are described in further detail below).

In some examples, the positioning of the electric motor propeller assemblies 116 along the leading edge of the main wing 104 may be determined based on a variety of factors including, but not limited to, (i) the required total thrust for all modes of operation of the craft 100, (ii) the thrust generated by each individual propeller of the propeller assemblies 116, (iii) the radius of each propeller in the respective propeller assemblies 116, (iv) the required tip clearance between each propeller and the surface of the water, and (v) the additional freestream speed over the main wing 104 required for operation.

As shown in the figures, in some examples, the number of propeller assemblies 116 is symmetrical across both sides of the hull 102. In some examples, the propeller assemblies 116 are all identical. In other examples, certain ones of the propeller assemblies 116 may have different propeller radii or blade configurations along the span so long as the configuration is symmetrical across the hull 102. The different propeller radii can facilitate providing adequate propeller tip clearance from the water or structural elements of the craft 100. In some examples, the different propellers are optimized for different operational conditions, such as for operating in a wing-borne cruise mode. The propeller placement and configuration may vary to increase the airflow over the main wing 104 or tail system 106 to improve controllability or stability. Further, while eight total propeller assemblies 116 are illustrated in the figures, the actual number of propeller assemblies 116 can vary based on the requirements of the craft 100.

In some examples, individual propeller assemblies 116 may have different pitch settings or variable pitch capabilities based on their position on the main wing 104. For instance, a subset of the propeller assemblies 116 may have fixed-pitch propellers sized for cruise speeds, while the remainder of the propeller assemblies 116 may have fixed-pitch propellers configured for takeoff, or may allow for varying of the propeller's pitch.

Additionally, or alternatively, different propeller assemblies 116 may be turned off or have reduced rotational speeds during different modes of operation. For instance, during waterborne operation, one or more of the propeller assemblies 116 may be turned off or have reduced rotational speeds in a manner that generates asymmetrical thrust. This may create a yawing moment on the craft 100, allowing the craft 100 to turn without large bank angles and increasing the turning maneuverability of the craft 100. For instance, in order to yaw right, the craft 100 may increase the rotational speeds of the propellers of one or more of propeller assemblies 116e-h while decreasing the rotational speeds of the propellers of one or more of propeller assemblies 116a-d. Similarly, in order to yaw left, the craft 100 may increase the rotational speeds of the propellers of one or more of propeller assemblies 116a-d while decreasing the rotational speeds of the propellers of one or more of propeller assemblies 116e-h.

Some examples of the main wing 104 may include one or more aerodynamic control surfaces, such as flaps 118 and ailerons 120, which may comprise movable hinged surfaces on the trailing or leading edges of the main wing 104 for changing the aerodynamic shape of the main wing 104. The flaps 118 may be configured to extend downward below the main wing 104 to reduce stall speed and create additional lift at low airspeeds, while the ailerons 120 may be configured to extend upward above the main wing 104 to decrease lift on one side of the main wing 104 and induce a roll moment in the craft 100. In some examples, the ailerons 120 may be additionally configured to extend downward below the main wing 104 in a flaperon configuration to help the flaps 118 generate additional lift on the main wing 104, which may be used to either create a rolling moment or additional balanced lift depending on coordinated movement of both ailerons. The flaps 118 and ailerons 120 may each include one or more actuators for raising and lowering the flaps 118 and ailerons 120. Within examples, the flaps 118 may include one or more of plain flaps, split flaps, slotted flaps, Fowler flaps, slotted Fowler flaps, Gouge flaps, Junkers flaps, or Zap flaps. Further, in some examples, the flaps 118 (and the ailerons 120 when configured as flaperons) are positioned so that they are in the wake of one or more of the propeller assemblies 116. Positioning the ailerons 120 in the wake of one or more of the propeller assemblies 116 may increase the effectiveness of the ailerons at low forward craft velocities. Some of the propeller assemblies 116 may be positioned so that no ailerons 120 are in their wake to increase thrust on the outboard wing during a turn without inducing adverse yaw. For example, in a left turn, a normal airplane would have adverse yaw to the right as the right aileron is deflected down, increasing drag. In the present disclosure, however, the right propeller assembly outboard of the right aileron may have its thrust increased relative to the respective left propeller assembly, initiating a turn without adverse yaw.

C. Tail System

As illustrated in FIGS. 1A-1G, some examples of the tail 106 may include a vertical stabilizer 122, a horizontal stabilizer 124, and one or more control surfaces, such as elevators 126. Similar to the flaps 118 and ailerons 120, the elevators 126 may comprise movable hinged surfaces on the trailing or leading edges of the horizontal stabilizer 124 for changing the aerodynamic shape of the horizontal stabilizer 124 to control a pitch of the craft 100. The horizontal stabilizer 124 may be combined with the elevator 126, creating a fully articulating horizontal stabilizer (e.g., a stabilator). Raising the elevators 126 above the hinge point creates a net downward force on the tail system and causes the craft 100 to pitch upward. Lowering the elevators 126 below the hinge point creates a net upward force on the horizontal stabilizer 124 and causes the craft 100 to pitch downward. The elevators 126 may include actuators, which may be operated by a control system of the craft 100 to raise and lower the elevators 126.

As illustrated in FIGS. 1A-1G, some examples of the tail 106 may include a rudder 128. The rudder 128 may comprise a movable hinged surface on the trailing edge of the vertical stabilizer 122 for changing the aerodynamic shape of the vertical stabilizer 122 to control the yaw of the craft 100 when operating in an airborne mode. In some examples, the rudder 128 may additionally change a hydrodynamic shape of the hull 102 to control the yaw of the craft 100 when operating in a waterborne mode. To facilitate such hydrodynamic control, the rudder 128 may be positioned low enough on the tail 106 that the rudder 128 is partially or entirely submerged when the hull 102 is floating in water. For instance, the rudder 128 may be positioned partially or entirely below the waterline of the hull 102. The rudder 128 may include one or more actuators, which may be operated by a control system of the craft 100 to rotate the hinged surface of the rudder 128 to the left or right of the vertical stabilizer 122. Actuating the rudder 128 to the left (relative to the direction of travel) causes the craft 100 to yaw left. Actuating the rudder 128 to the right (relative to the direction of travel) causes the craft 100 to yaw right. As such, the rudder 128 may be used in combination with any of the other mechanisms disclosed herein for controlling the yaw of the craft 100, including in combination with the ailerons 120 during airborne operation and in combination with varying the rotational speeds of different ones of the propeller assemblies 116 to help improve the maneuverability of the craft 100 during waterborne operation.

Figure 1E:
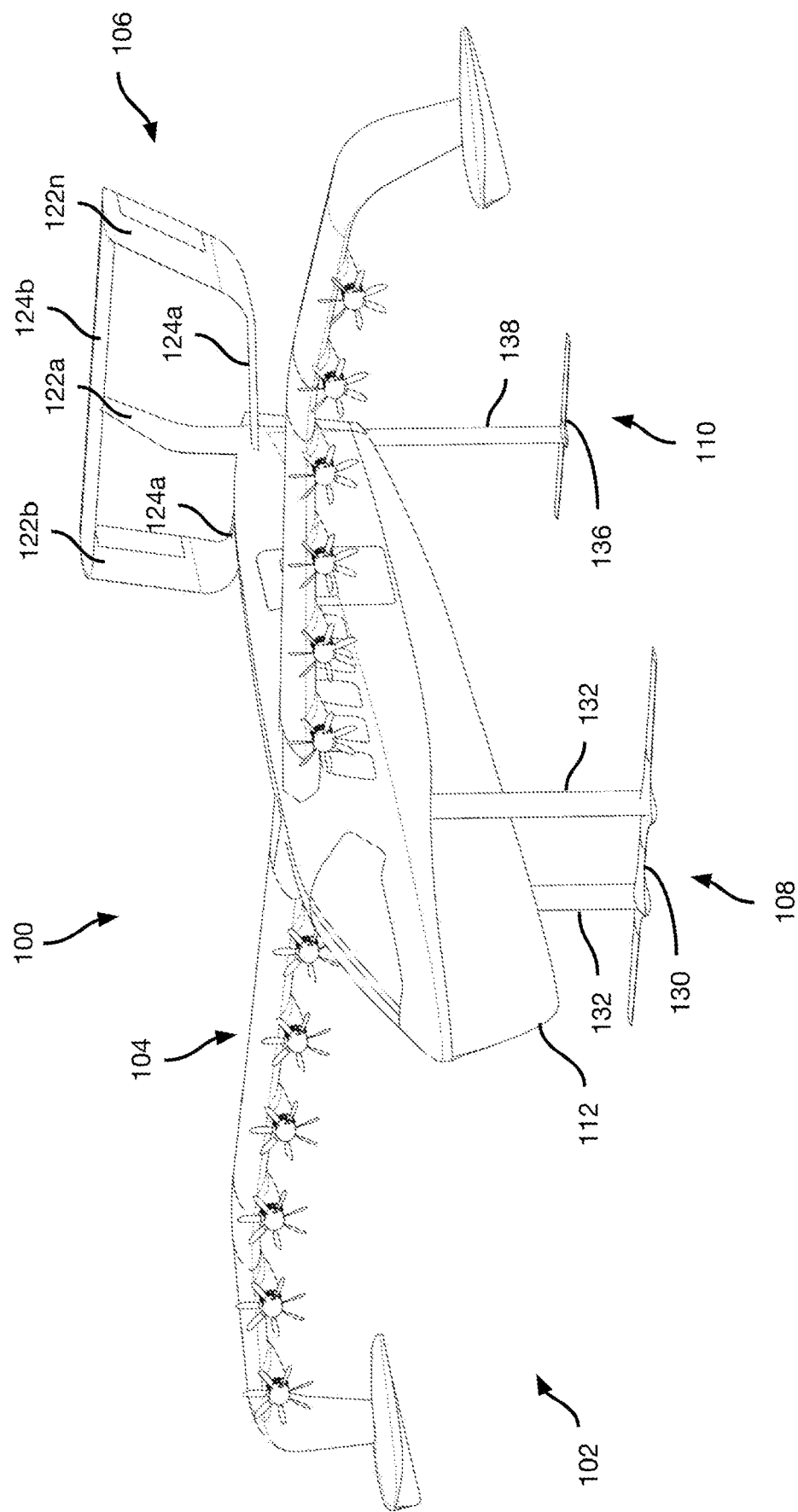
FIG. 1E depicts a front perspective view of a craft having a multi-airfoil tail, in accordance with example embodiments.
Figure 1F:
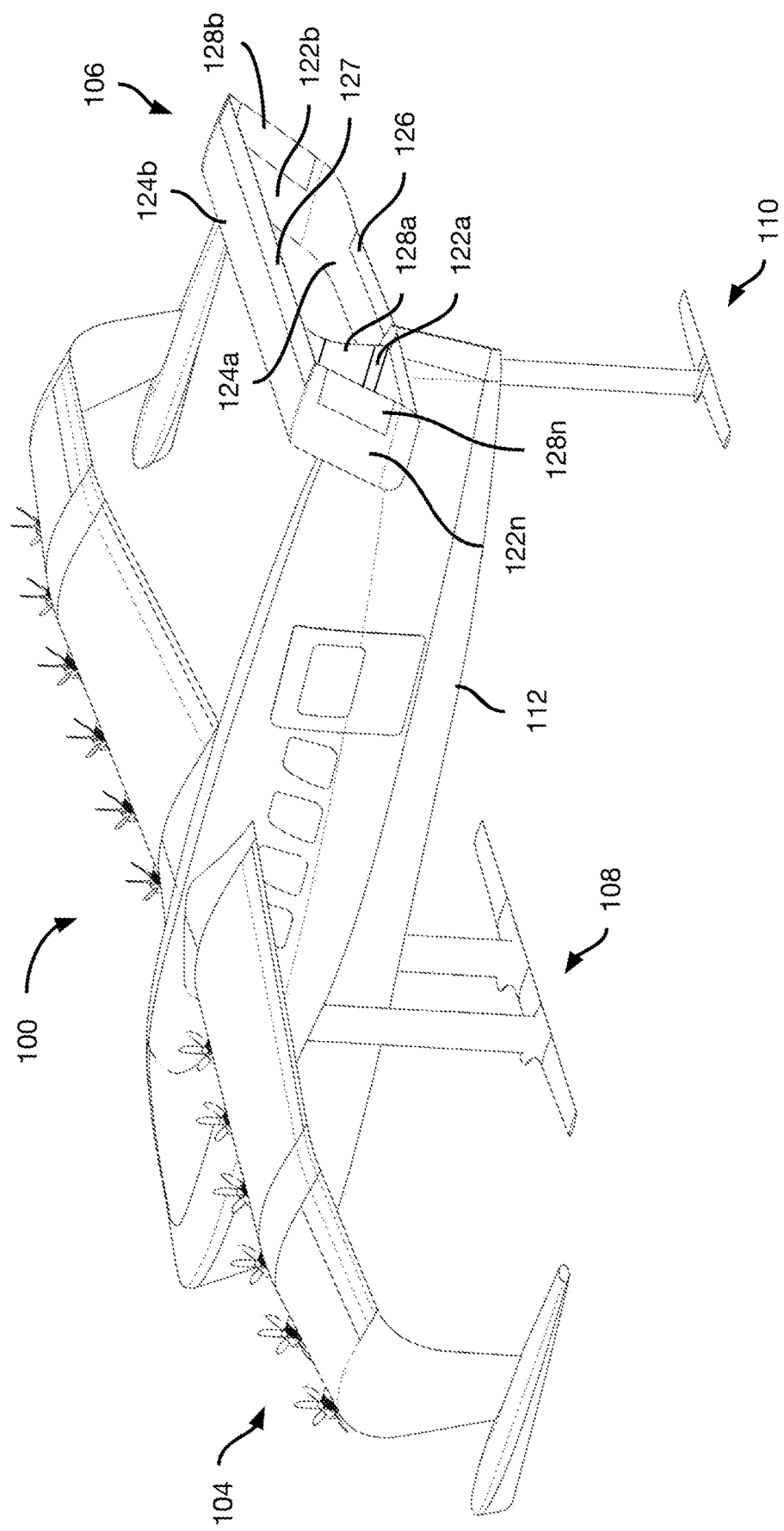
FIG. 1F depicts a rear perspective view of a craft, in accordance with example embodiments.
Figure 1G:
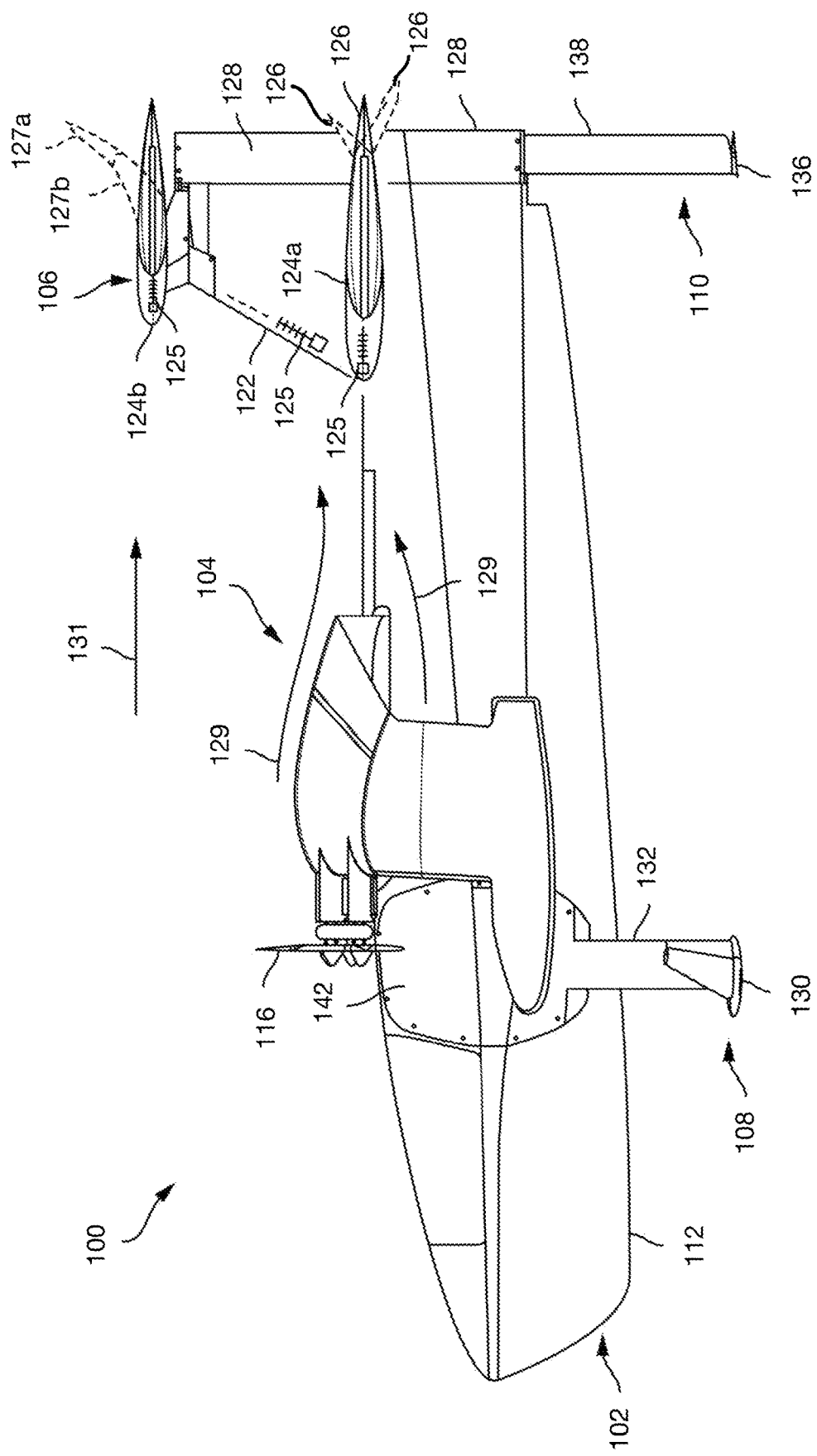
FIG. 1G depicts a side view of a craft, in accordance with example embodiments.

As illustrated in FIGS. 1E-1G, some examples of the tail 106 may include one or more vertical stabilizers 122a, 122b, 122n, one or more horizontal stabilizers 124a, 124b, one or more control surfaces, such as elevators 126, and one or more tail flaps 127a, 127b for enhanced pitch control configured to exert enhanced net downward force on the tail system. It should be understood that although FIGS. 1E-1G show only two horizontal stabilizers and two tail flaps, it is contemplated that more than two of each can be used within the scope of the present teachings. In some applications, it has been found that the transition from waterborne operation to airborne or wing-borne operation can require a larger pitching moment to overcome the larger drag forces existing between the hull 102 and/or the hydrofoil assemblies 108, 110 and the water. This phenomenon can further occur in wheeled aircraft configured for short takeoff and landing (STOL) operations. In this way, at low airspeeds, aerodynamic forces in conventional designs fail to produce sufficient downward force to permit sufficient pitching moment. To provide sufficient pitching moment to pitch the craft 100 upward, a conventional solution would be to increase the span of the tail so that the elevator generates more force; however, a resultant consequence of increasing the span of the tail is that the entire tail must be stronger and heavier, which can result in undesired reduction of payload and efficiency. However, the present configuration provides improved performance by providing a tail 106 having a first horizontal stabilizer 124a and a second horizontal stabilizer 124b. It should be understood that one or more additional horizontal stabilizers can be used.

In some examples, a first horizontal stabilizer 124a may be a lower horizontal stabilizer relative to a second horizontal stabilizer 124b. However, it should be appreciated that the horizontal stabilizers in some examples can be interchanged for performance purposes (e.g., the disclosed structure of the first horizontal stabilizer 124a can be incorporated in the upper horizontal stabilizer and the disclosed structure of the second horizontal stabilizer 124b can be incorporated in the lower horizontal stabilizer). In some non-limiting examples, the structure, shape, and/or performance of each horizontal stabilizer can be tailored as desired such that the lower horizontal stabilizer (in this example, the first horizontal stabilizer 124a) is more likely to experience aerodynamic effect from being in the wake of the blown-wing propulsion system disclosed herein or associated wake produced by alternative propulsion systems. In this way, greater aerodynamic control and/or downward lift can be generated during desired phases of operation.

Some examples of the horizontal stabilizers 124a, 124b can include one or more aerodynamic control surfaces, such as tail flaps 127 and elevators 126, which may comprise movable hinged surfaces on the trailing or leading edges of the horizontal stabilizer 124 for changing the aerodynamic shape of the respective horizontal stabilizer 124. It should be recognized that at least one of the horizontal stabilizers 124a, 124b can be sized, shaped, and/or spaced relative to a second of the horizontal stabilizers 124a, 124b to enhance or minimize the aerodynamic effect on the adjacent stabilizers. In this way, the aerodynamic flow, pressures, and/or forces can be used to improve the efficiency or effectiveness of the adjacent stabilizer. In some examples, at least one of the horizontal stabilizers 124a, 124b can be actuated in an opposing direction. In some examples, at least one of the horizontal stabilizers 124a, 124b can define a ratio of a surface area of the first horizontal stabilizer to a surface area of the second horizontal stabilizer in the range of 0.9 to 1.6. For instance, in some non-limiting example configurations, the surface area of the first horizontal stabilizer is 5.7 $m^2$, the surface area of the second horizontal stabilizer is 3.9 $m^2$, and both have a chord of about 1 m and a vertical separation of 1.8 m. In some examples, a vertical separation distance between the first horizontal stabilizer and the second horizontal stabilizer is in the range of 0.25 to 0.75 of the lower horizontal stabilizer span. In some examples, a vertical separation distance may be dependent on the required rudder authority and thus elevator size (driven by, e.g., yaw stability, or the need to counteract asymmetric thrust following powerplant failure). In some examples, a sweep offset moves the center of pressure further aft from the center of gravity, thus allowing the airfoil of the horizontal stabilizer to have less surface area overall, thus being smaller and lighter. In some examples, a dihedral in the bottom surface of the horizontal stabilizer adds stability. In some examples, the box tail design itself increases the efficiency due to the elimination of wingtip vortices of a typical tail. In some examples, a lower horizontal stabilizer may have approximately a 15% thickness-to-chord ratio to support the weight of the upper components, whereas the vertical and upper surfaces may be thinner, such as, for example, a 10% thickness-to-chord ratio due to reduced structural load requirement, which enables the upper horizontal stabilizer to be more efficient (lower drag). It should be appreciated that the left and right elevator surfaces 126 can be controlled independently and/or differentially to create a rolling moment, thereby enabling the wing ailerons 120 to be made smaller. The smaller wing ailerons 120 further enable larger flaps 118. It should be appreciated that in some embodiments, using the vertical control surfaces 128a, 128b, 128n can change the pressure distribution across the elevator 126, for example, commanding a left 5-degree deflection in the left vertical control surface may move the mean pressure distribution left/right by a percentage of the elevator width.

Some examples of the tail flaps 127 may be configured to selectively extend upward above the horizontal stabilizer 124 for changing a surface area, camber, aspect ratio, and/or shape of the horizontal stabilizer 124. The tail flaps 127 may include, for example, one or more of plain flaps, split flaps, slotted flaps, Fowler flaps, slotted or double-slotted Fowler flaps, Gouge flaps, Junkers flaps, or Zap flaps. That is, in some examples, tail flaps 127 serve to change an angle of attack of the horizontal stabilizer 124, change a chord line of the horizontal stabilizer 124, change a surface area of the horizontal stabilizer 124, and/or otherwise increase the net effective downwardly directed lift of the horizontal stabilizer 124. Such configurations effectively reduce the speed at which the horizontal stabilizer 124 becomes aerodynamically effective by creating additional net downward force at low airspeeds to aid in exerting a nose-up pitching moment of the craft 100. The elevators 126 may be configured for changing the aerodynamic shape of the horizontal stabilizer 124 to further control or vary a pitch of the craft 100.

In some example operations, the tail flaps 127 can be deployed (e.g., extended as depicted in 127a and 127b with dashed lines in FIG. 1G) for takeoff (e.g., transition from hydrofoil-borne mode to airborne mode) and landing (e.g., transition from airborne mode to hull-borne mode) to generate additional downforce on the tail system when additional pitch-up moment is required. Tail flaps 127 can be stowed (e.g., retracted as depicted in FIGS. 1E-1F) for other phases of operation, such as hull-borne mode, to reduce downforce on the tail system and reduce drag.

In some examples, the elevators 126 may be additionally configured to extend upward above the horizontal stabilizer 124 in a flaperon-like configuration (yet with elevators, rather than ailerons) to help the tail flaps 127 generate additional downward force on the horizontal stabilizer 124, which may be used to either create a pitching moment or additional balanced downward force. The tail flaps 127 and elevators 126 may each include one or more actuators 125 for raising and lowering the tail flaps 127 and elevators 126, singly or in combination. The actuators 125 can comprise any system configured to selectively actuate the associated system, such as but not limited to a flap track system (integrated into vertical stabilizers 122a, 122b, 122n, which can reduce complex hinge systems or external arms, thereby reducing wetted area and excrescences drag), an electric servo motor mounting within the vertical stabilizers 122a, 122b, 122n and/or horizontal stabilizers 124a, 124b, and/or a central vertical strut system generally mounted in the hull 102 or the fuselage of the craft 100 (to provide the potential for reduced cross-sectional area and associated drag).

Further, in some examples, as depicted in FIG. 1G, the elevators 126 and/or the tail flaps 127 can be positioned so that they are in the wake 129 of one or more of the propeller assemblies 116 of main wing 104. The elevators 126 and/or the tail flaps 127 may be positioned so that they are in the wake 129 of one or more of the propeller assemblies 116 to increase the effectiveness of the elevators at low forward velocities. In some examples, the propeller assemblies 116 may be positioned so that no elevators 126 and/or tail flaps 127 are in the wake 129 to ensure consistent and/or predictable aerodynamic forces, independent of power application, are exerted during critical operational phases. In some examples, the propeller assemblies 116 may be positioned so that the elevators 126 are in their wake 129 and the tail flaps 127 are not in the wake 129 (e.g., above the wake 129) and are exposed to clean air 131. It should be understood that positioning of the tail flaps 127 in the second horizontal stabilizer 124b, or at a distance above the center of gravity of the craft 100, will have the added unexpected benefit of creating additional nose-up pitching moment as a result of induced drag acting about the center of gravity causing the craft 100 to pitch upward.

Similar to the flaps 118 and the ailerons 120 of the main wing 104, some examples of the elevators 126 may comprise movable hinged surfaces on the trailing or leading edges of the horizontal stabilizer 124 for changing the aerodynamic shape of the horizontal stabilizer 124 to control a pitch of the craft 100. The horizontal stabilizer 124 may be combined with the elevator 126, creating a fully articulating horizontal stabilizer (e.g., a stabilator). Raising the elevators 126 above the hinge point creates a net downward force on the tail system and causes the craft 100 to pitch upward. Lowering the elevators 126 below the hinge point creates a net upward force on the horizontal stabilizer 124 and causes the craft 100 to pitch downward. The elevators 126 may include actuators, which may be operated by a control system of the craft 100 in order to raise and lower the elevators 126.

In some examples, the tail 106 may include one or more rudders 128a, 128b, 128n. The rudders 128a, 128b, 128n may each comprise a movable hinged surface on the trailing edge of the corresponding vertical stabilizers 122a, 122b, 122n for changing the aerodynamic shape of the vertical stabilizer 122 to control the yaw of the craft 100 when operating in an airborne mode. It should be understood that rudders 128a, 128b, 128n can operate independently or in combination as desired. Moreover, in some examples, rudders 128a, 128b, 128n can be used as redundant systems, particularly useful in the event of one or more failures.

In some examples, the rudders 128a, 128b, 128n may additionally change a hydrodynamic shape of the hull 102 to control the yaw of the craft 100 when operating in a waterborne mode. In order to facilitate such hydrodynamic control, the rudders 128a, 128b, 128n may be positioned low enough on the tail 106 that one or more of the rudders 128a, 128b, 128n is partially or entirely submerged when the hull 102 is floating in water. Namely, the rudders 128a, 128b, 128n may be positioned partially or entirely below a waterline of the hull 102. The rudders 128a, 128b, 128n may include one or more actuators, which may be operated by a control system of the craft 100 in order to rotate the hinged surface of the rudders 128a, 128b, 128n to the left or right of the vertical stabilizer 122. Actuating the rudders 128a, 128b, 128n to the left (relative to the direction of travel) causes the craft 100 to yaw left. Actuating the rudders 128a, 128b, 128n to the right (relative to the direction of travel) causes the craft 100 to yaw right. As such, the rudders 128a, 128b, 128n may be used in combination with any of the other mechanisms disclosed herein for controlling the yaw of the craft 100, including in combination with the ailerons 120 during airborne operation and in combination with varying the rotational speeds of different ones of the propeller assemblies 116 to help improve the maneuverability of the craft 100 during waterborne operation.

As depicted in FIG. 1F, it should be understood that the fundamental shape of tail 106, having one or more vertical stabilizers 122a, 122b, 122n and one or more horizontal stabilizers 124a, 124b, can result in a box-like assembly, wherein the vertical stabilizers are generally coupled to the horizontal stabilizers to form a reinforced box-like construction. This box-like construction provides enhanced structural integrity that enables tail 106 of some examples to be lighter and/or smaller than otherwise constructed.

While not shown in FIGS. 1A-1G, some examples of the craft 100 may include a distributed propulsion system on the tail 106, which may be similar to the distributed propulsion system of propeller assemblies 116 on the main wing 104. Such a distributed propulsion system may provide similar benefits of increasing the freestream velocity over the control surfaces (e.g., the elevators 126 and/or the rudder 128) to allow for increased pitch and yaw control of the craft 100 at lower travel speeds. When determining the number and size of propeller assemblies to include on the tail 106, one may apply the same factors described above when determining the number and size of propeller assemblies to include on the main wing 104.

D. Hydrofoil Systems

As noted above, some examples of the craft 100 may include a main hydrofoil assembly 108 and a rear hydrofoil assembly 110. The main hydrofoil assembly may be positioned closer to the middle or bow of the craft 100, and the rear hydrofoil assembly 110 may be positioned proximate to the stern of the craft 100. For instance, in some examples, the main hydrofoil assembly 108 is positioned between the bow and a midpoint (between the bow and stern) of the craft 100, and the rear hydrofoil assembly 110 is positioned below the tail 106 of the craft 100.

The main hydrofoil assembly 108 and the rear hydrofoil assembly 110 are configured to facilitate the breaking of contact between the hull 102 and the water surface during takeoff, which, as noted above, can otherwise be challenging in some conventional craft designs. Some examples of the main hydrofoil assembly 108 and the rear hydrofoil assembly 110 are configured to be retractable, to be large enough to lift the entire craft 100 out of the water such that the hull 102 does not impact the water surface, and to enable sustained operation in the hydrofoil-borne mode (where the entire weight of the craft is supported by the one or more hydrofoil assemblies).

The main hydrofoil assembly 108 may include a main foil 130, one or more main foil struts 132 that couple the main foil 130 to the hull 102, and one or more main foil control surfaces 134. Similarly, the rear hydrofoil assembly 110 may include a rear foil 136, one or more rear foil struts 138 that couple the rear foil 136 to the hull 102, and one or more rear foil control surfaces 140.

The main foil 130 and the rear foil 136 may each take the form of one or more hydrodynamic lifting surfaces (also referred to as "foils") configured to be operated partially or entirely submerged underwater while the hull 102 of the craft 100 remains above and clear of the water's surface. In operation, as the craft 100 moves through water with the main foil 130 and the rear foil 136 submerged, the foils generate a lifting force that causes the hull 102 to rise above the surface of the water. In general, the lifting force generated by the foils must be at least equal to the weight of the craft 100 to cause the hull 102 to rise above the surface of the water. The lifting force of the foils depends on the speed and angle of attack at which the foils move through the water, as well as their various physical dimensions, including the aspect ratio, the surface area, the span, and the chord of the foils.

The height at which the hull 102 is elevated above the surface of the water during hydrofoil-borne operation is limited by the length of the one or more main foil struts 132 that couple the main foil 130 to the hull 102 and the length of the one or more rear foil struts 138 that couple the rear foil 136 to the hull 102. In some examples, the main foil struts 132 and the rear foil struts 138 may be long enough to lift the hull 102 at least five feet above the surface of the water during hydrofoil-borne operation, which facilitates operation in water with larger wave heights (e.g., wave heights up to five feet). However, struts of other lengths may be used as well. For instance, some examples may utilize longer struts that allow for better wave-isolation of the hull 102 (but at the expense of the stability of the craft 100 and the increased complexity of the retraction system).

In practice, hydrofoils have a limited top speed before cavitation occurs, which results in vapor bubbles forming and imploding on the surface of the hydrofoil. Cavitation not only may cause damage to a hydrofoil but also significantly reduces the amount of lift generated by the hydrofoil and increases drag. Therefore, it is desirable to reduce the onset of cavitation by designing the main foil 130 and the rear foil 136 in a way that allows the foils to operate at higher speeds (e.g., ~20-45 mph) and across the entire required hydrofoil-borne speed envelope before cavitation occurs. For instance, the onset of cavitation may be controlled based on the geometric design of the main foil 130 and the rear foil 136. Additionally, the structural design of the main foil 130 and the rear foil 136 may be configured to allow the surfaces of the foils to flex and twist at higher speeds, which may reduce loading on the foils and delay the onset of cavitation.

Further, in some examples, the distributed blown-wing propulsion system described above may further facilitate delaying the onset of cavitation on the main foil 130 and the rear foil 136. Cavitation is caused by both (i) the profile of the hydrofoil (which is affected by both the hydrofoil's angle of attack and its vertical thickness) and (ii) the amount of lift force generated by the hydrofoil as it moves through water. Therefore, reducing the amount of lift force generated by the hydrofoil can help delay the onset of cavitation. One way to reduce the amount of lift force generated by the hydrofoil is to share the load (i.e., the weight) of the vehicle across both the hydrofoil and the aerodynamic main wing 104. As described above, the blown-wing propulsion system creates additional lift on the main wing 104, thereby causing the main wing 104 to bear more of the vehicle's weight and reducing the amount of lift exerted on the main foil 130 and the rear foil 136 to lift the hull 102 out of the water. Further, because the main foil 130 and the rear foil 136 do not need to generate as much lift to raise or sustain the hull 102 out of the water, their angles of attack may be reduced as well, which further delays the onset of cavitation. Accordingly, combining the blown-wing propulsion system with the hydrofoil designs described herein may, in some examples, facilitate operating the craft 100 in a hydrofoil-borne mode at speeds above 35 knots before cavitation occurs.

The main foil 130 and/or the rear foil 136 may take any of various forms. As shown in FIGS. 1E and 1F, the main foil 130 and the rear foil 136 may be substantially flat along a horizontal plane, such that the foils are configured to be fully submerged during operation. However, in other examples, the main foil 130 and/or the rear foil 136 may include one or more angled surfaces, such that the foil is a surface-piercing foil configured to be partially submerged during operation. For instance, as shown in FIGS. 1A, 1C, 1D, and 1G, the main foil 130 may have a flattened V-shaped design in which a center portion of the main foil 130 is substantially flat and the ends of the main foil 130 extend upward toward the hull 102 of the craft 100. This flattened V-shape design facilitates passive regulation of the distance between the hull 102 and the surface of the water (also referred to as "ride height") while also allowing for passive roll-moment control. The passive regulation of ride height is achieved by having the tips of the V-shaped hydrofoil breach the surface of the water, reducing the extent of the lifting surface that is underwater. If the ride height is too low, the increased hydrofoil surface area under the surface of the water will create a net force greater than the weight of the craft 100, causing the hydrofoil to rise higher. If the ride height is too high, more of the hydrofoil's lifting surface will be above the water surface and the hydrofoil lifting area under the surface of the water will be insufficient to prevent the craft 100 from descending closer to the water until equilibrium is achieved. The passive roll stability is due to one side of the V-shaped hydrofoil breaching further out of the water than the other side. This creates a stabilizing roll moment when the craft 100 is rolled to (for example) the left because the left side of the V-shaped hydrofoil will have more surface area under the water surface, allowing it to generate more lift than the right side.

As noted above, the main hydrofoil assembly 108 may include one or more main foil control surfaces 134, and the rear hydrofoil assembly 110 may include one or more rear foil control surfaces 140. The main foil control surfaces 134 may include one or more hinged surfaces on a trailing or leading edge of the main foil 130 as well as one or more actuators, which may be operated by a control system of the craft 100 to rotate the hinged surfaces so that they extend above or below the main foil 130. The main foil control surfaces 134 on the main foil 130 may be operated in a similar manner as the flaps 118 and ailerons 120 on the main wing 104 of the craft 100. In some examples, lowering the control surfaces 134 to extend below the main foil 130 may change a hydrodynamic shape of the main foil 130 in a manner that generates additional lift on the main foil 130, similar to the aerodynamic effect of lowering the flaps 118. In some examples, asymmetrically raising one or more of the control surfaces 134 (e.g., raising a control surface 134 on only one side of the main foil 130) may change a hydrodynamic shape of the main foil 130 in a manner that generates a roll force on the main foil 130, similar to the aerodynamic effect of raising one of the ailerons 120.

Likewise, the rear foil control surfaces 140 may include one or more hinged surfaces on a trailing or leading edge of the rear foil 136 as well as one or more actuators, which may be operated by a control system of the craft 100 to rotate the hinged surfaces so that they extend above or below the rear foil 136. The rear foil control surfaces 140 on the rear foil 136 may be operated in a similar manner as the elevators 126 on the tail 106 of the craft 100. In some examples, lowering the control surfaces 140 to extend below the rear foil 136 may change a hydrodynamic shape of the rear foil 136 in a manner that causes the craft 100 to pitch downwards, similar to the aerodynamic effect of lowering the elevators 126. In some examples, raising the control surfaces 140 to extend above the rear foil 136 may change a hydrodynamic shape of the rear foil 136 in a manner that causes the craft 100 to pitch upwards, similar to the aerodynamic effect of raising the elevators 126.

In some examples, one or both of the main foil control surfaces 134 or the rear foil control surfaces 140 may include rudder-like control surfaces similar to the rudder 128 on the tail 106 of the craft 100. For instance, the main foil control surfaces 134 may include one or more hinged surfaces on a trailing edge of the main foil strut 132 as well as one or more actuators, which may be operated by a control system of the craft 100 to rotate the hinged surfaces so that they extend to the left or right of the main foil strut 132. Similarly, the rear foil control surfaces 140 may include one or more hinged surfaces on a trailing edge of the rear foil strut 138 as well as one or more actuators, which may be operated by a control system of the craft 100 to rotate the hinged surfaces so that they extend to the left or right of the rear foil strut 138. In some examples, actuating the main foil control surfaces 134 or the rear foil control surfaces 140 in this manner may change a hydrodynamic shape of the main foil strut 132 or the rear foil strut 138, respectively, which may facilitate controlling the yaw of the craft 100 when operating in a waterborne or hydrofoil-borne mode, similar to the effect of actuating the rudder 128 of the craft 100, as described above.

In some examples, instead of (or in addition to) actuating hinged control surfaces on the main foil 130 and/or the rear foil 136, a control system of the craft 100 may actuate the entire main foil 130 and/or the entire rear foil 136 themselves. As one example, the craft 100 may include one or more actuators for rotating the main foil 130 and/or the rear foil 136 around the yaw axis. As another example, the craft 100 may include one or more actuators for controlling an angle of attack of the main foil 130 and/or the rear foil 136 (i.e., rotating the main foil 130 and/or the rear foil 136 around the pitch axis). As another example, the craft 100 may include one or more actuators for rotating the main foil 130 and/or the rear foil 136 around the roll axis. As another example, the craft 100 may include one or more actuators for changing a camber or shape of the main foil 130 and/or the rear foil 136. As yet another example, the craft 100 may include one or more actuators for flapping the main foil 130 and/or the rear foil 136 to help propel the craft 100 forward or backward. Other examples are possible as well.

Further, some examples of the craft 100 may dynamically control an extent to which the main foil 130 and/or the rear foil 136 are deployed based on an operational mode (e.g., hull-borne, hydrofoil-borne, or wing-borne modes) of the craft 100. For instance, during hull-borne mode, the rear hydrofoil assembly 110 may be partially deployed or retracted to increase turning authority. The amount of partial deployment or retraction may be a function of the desired overall vehicle draft when operating in a shallow water environment. During hydrofoil-borne mode, the main hydrofoil assembly 108 may be partially retracted to reduce the distance between the hull of the vehicle and the water's surface. This may increase the amount of lift generated by the main wing 104 by operating the wing closer to the surface of the water, increasing the effects of the aerodynamic ground effect.

As noted above, one or both of the main hydrofoil assembly 108 or the rear hydrofoil assembly 110 may interface with a deployment system that facilitates retracting the main hydrofoil assembly 108 and/or the rear hydrofoil assembly 110 into or toward the hull 102 for hull-borne or wing-borne operation and extending the main hydrofoil assembly 108 and/or the rear hydrofoil assembly 110 below the hull 102 for hydrofoil-borne operation. As described further below, in some examples, the deployment system may be used in connection with extending, retracting, and/or otherwise controlling the positioning of the main hydrofoil assembly 108 and/or the rear hydrofoil assembly 110 during takeoff when the craft 100 is transitioning from hydrofoil-borne operation to wing-borne operation.

E. Battery System

Figure 2:
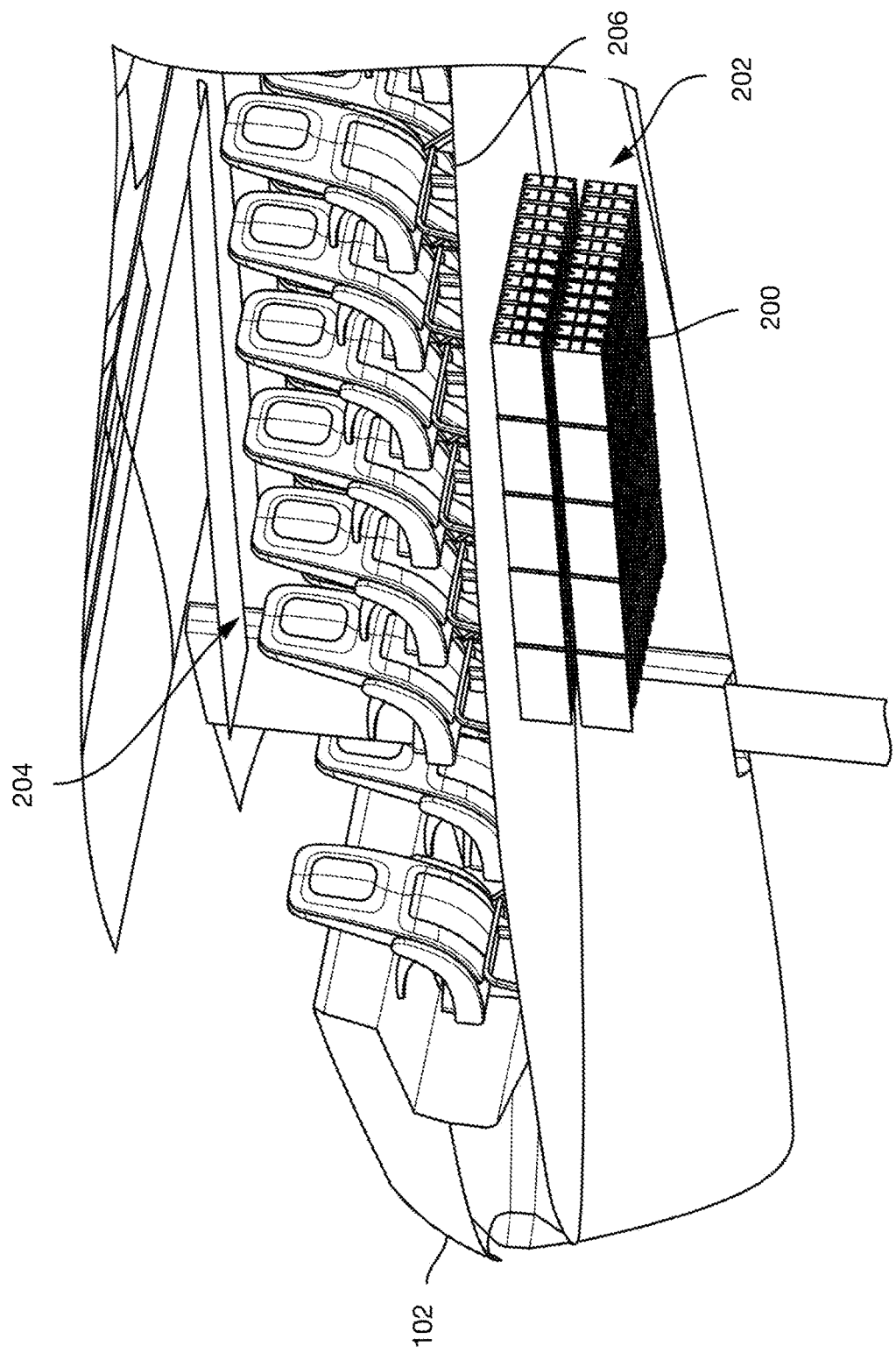
FIG. 2 depicts a battery system of a craft, in accordance with example embodiments.

FIG. 2 depicts an example of an onboard battery system 200. In some examples, the battery system 200 may be arranged in a protected area 202 of the hull 102 below a passenger seating area 204. The battery system 200 may be separated from the passenger seating area 204 by a firewall 206 to protect the passengers from harm if a thermal runaway occurs. In this regard, some examples of the craft 100 include a battery management system comprising voltage, current, and/or thermal sensors for detecting thermal runaway or some other fire detection system for detecting a fire in the protected area 202.

Some examples of the craft 100 may include one or more mechanisms for flooding the battery system 200 upon detecting a thermal runaway or a fire in the protected area 202. For instance, the hull 102 may include one or more valves or other controllable openings in the hull 102. The control system of the craft 100 may be configured to open the valves and/or controllable openings upon detecting a fire in the protected area 202 or thermal runaway in the battery system 200 to allow water to enter the protected area 202 and to extinguish or prevent a fire in the protected area 202.

In some examples, the battery system 200 may be configured to be jettisoned through one or more of the controllable openings in the hull 102 described above. In this regard, the weight of the battery system 200 may be sufficient to jettison the battery system 200 out of the hull 102 when the hull 102 is opened. In some examples, the craft 100 may include an actuator or the like configured to jettison the battery system 200 out of the hull 102.

In other examples, the craft 100 may take measures to become waterborne in response to detecting a fire in the protected area 202 or thermal runaway in the battery system 200. In some examples, the control system of the craft 100 may determine a particular fire suppression operation to perform based on the operational state of the craft 100 (e.g., operating in hull-borne, hydrofoil-borne, or wing-borne mode). For instance, when operating in hull-borne mode and upon detecting a thermal runaway or a fire in the protected area 202, the control system may be configured to flood the battery system 200 as described above. When operating in hydrofoil-borne or a wing-borne mode, the control system may be configured to cause the craft 100 to transition to hull-borne mode upon detecting a thermal runaway or a fire in the protected area 202 and then flood the battery system 200.

F. Hydrofoil Deployment Systems

One key feature of a hydrofoil deployment system for use with the craft 100 described herein is that the main hydrofoil assembly 108 and/or the tail hydrofoil assembly 110 is capable of retracting from a fully deployed state once the craft 100 is entirely in wing-borne operation. Conventional deployment systems are insufficient for use with the craft 100 for a number of reasons including, but not limited to, being incapable of deploying hydrofoil assemblies during water-borne or wing-borne operation, being incapable of deploying hydrofoil assemblies large enough for use with the craft 100, being manually operated, and being too fragile to withstand a sufficient number of deployment cycles that would be carried out over the lifetime of the craft 100. Example hydrofoil deployment systems that include features to help address these issues are described below.

Figure 3A:
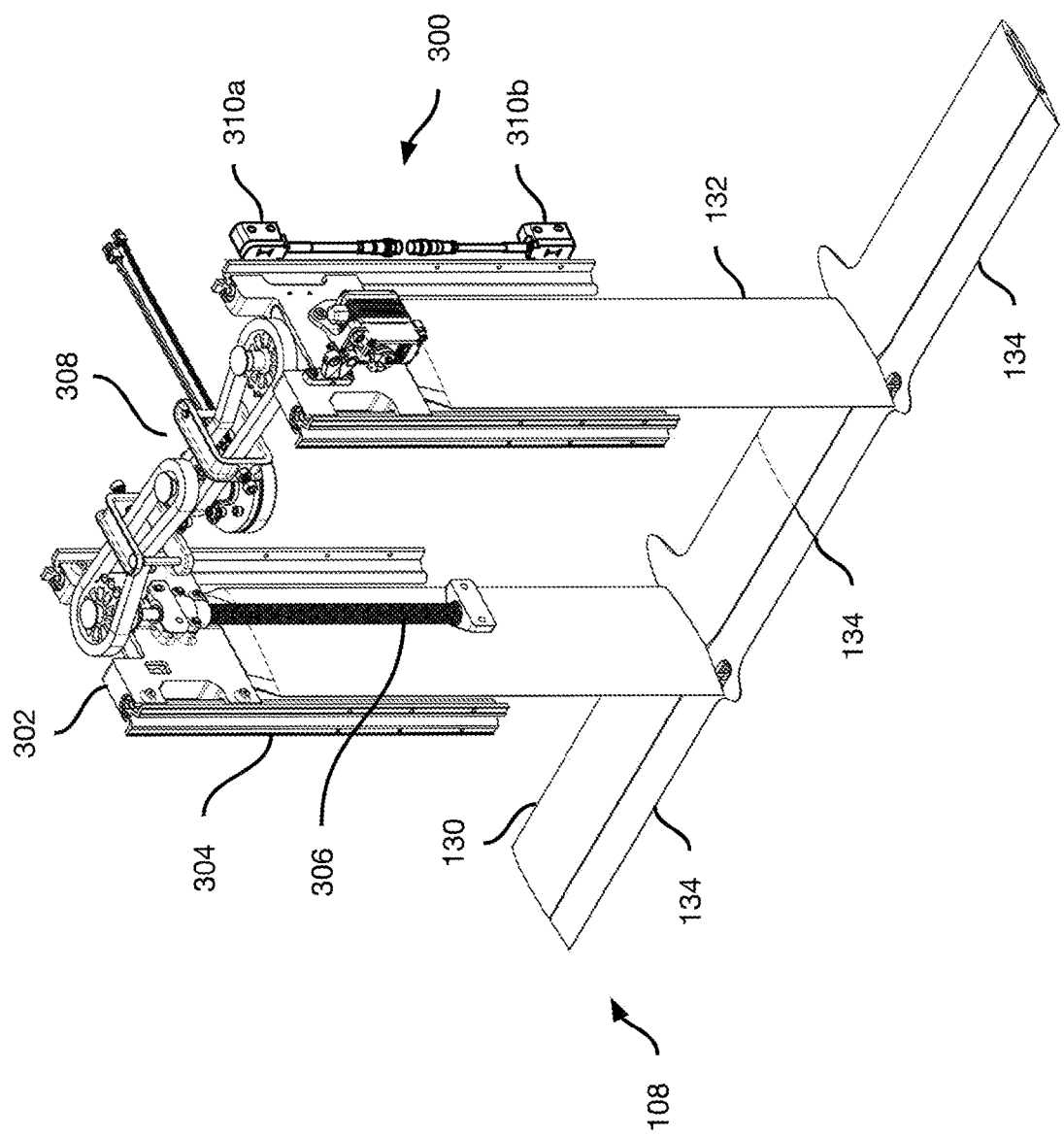
FIG. 3A depicts a main hydrofoil deployment system of a craft, in accordance with example embodiments.

FIG. 3A depicts an example of a main hydrofoil deployment system 300 that facilitates retracting and extending the main hydrofoil assembly 108. As shown, the main hydrofoil deployment system 300 may take the form of a linear actuator that includes one or more brackets 302 that couple the main hydrofoil assembly 108 (by way of the main foil struts 132) to one or more vertical tracks 304. The brackets 302 may be configured to move vertically along the tracks 304, such that when the brackets 302 move vertically along the tracks 304, the main hydrofoil assembly 108 likewise moves vertically. The brackets 302 may be coupled to a leadscrew 306 that, when rotated, causes vertical movement of the brackets 302. The leadscrew 306 may be rotated by any of various sources of torque, such as an electric motor coupled to the leadscrew 306 by a gear assembly 308.

Some examples of the main hydrofoil deployment system 300 may further include one or more sensors 310 configured to detect a vertical position of the main hydrofoil assembly 108. As shown, the sensors 310 include a first sensor 310a that senses when the main hydrofoil assembly 108 has reached a fully retracted position and a second sensor 310b that senses when the main hydrofoil assembly 108 has reached a fully extended position. However, the main hydrofoil deployment system 300 may include additional sensors for detecting additional discrete positions or continuous positions of the main hydrofoil assembly 108. The sensors 310 may be included as part of, or otherwise configured to communicate with, the control system of the craft 100 to provide the control system with data that indicates the position of the main hydrofoil assembly 108. The control system may then use this data to determine whether to operate the electric motor to retract or extend the main hydrofoil assembly 108.

In some examples, such as examples where the linear actuator is not a self-locking linear actuator, the main hydrofoil deployment system 300 may include a locking or braking mechanism for holding the main foil struts 132 in a fixed position (e.g., in a fully retracted or fully extended position). The locking mechanism may be, for example, a dual-action mechanical brake that is coupled to the electric motor, the leadscrew 306, or the gear assembly 308.

Figure 3B:
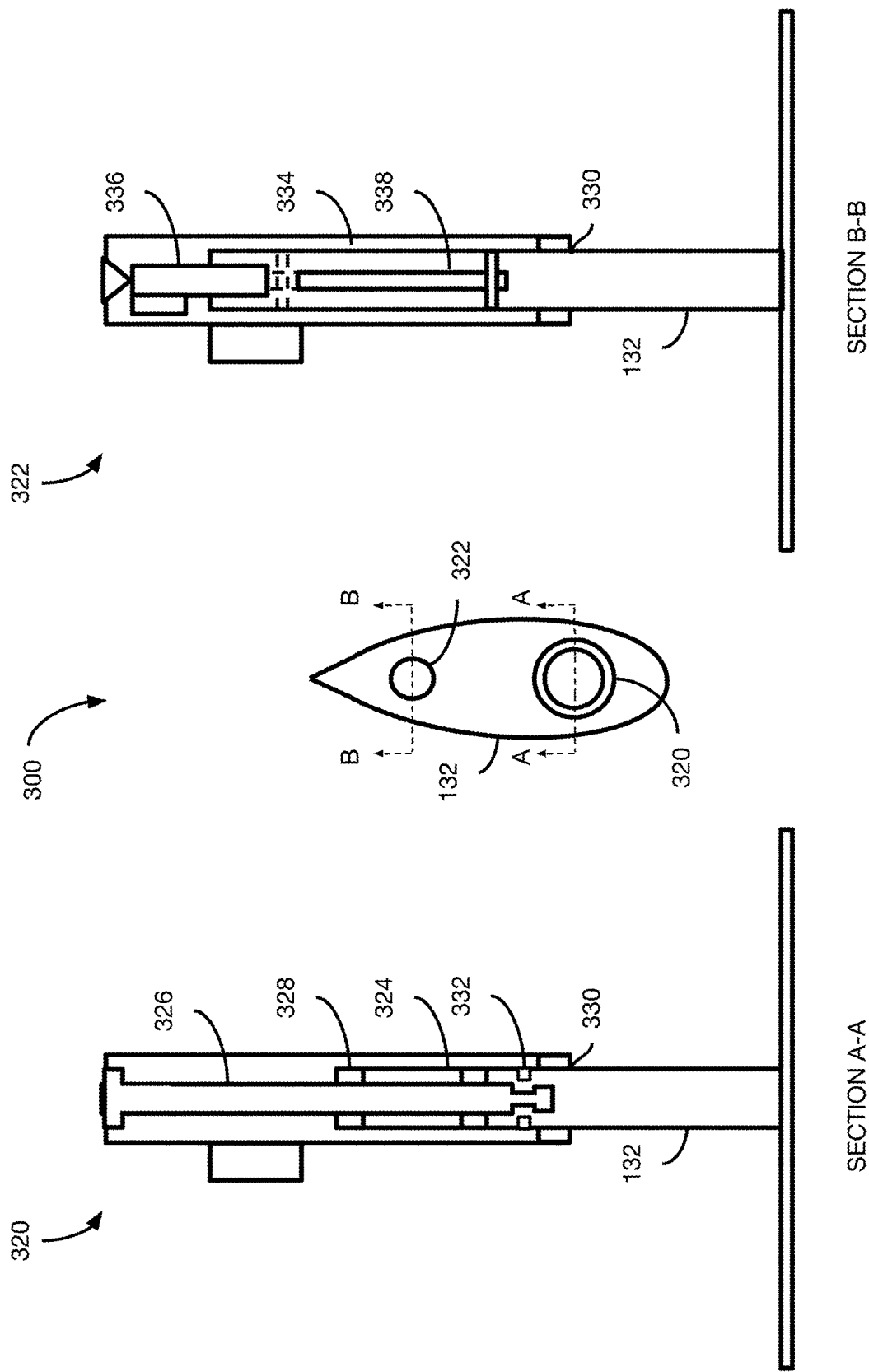
FIG. 3B depicts a main hydrofoil deployment system of a craft, in accordance with example embodiments.
Figure 3C:
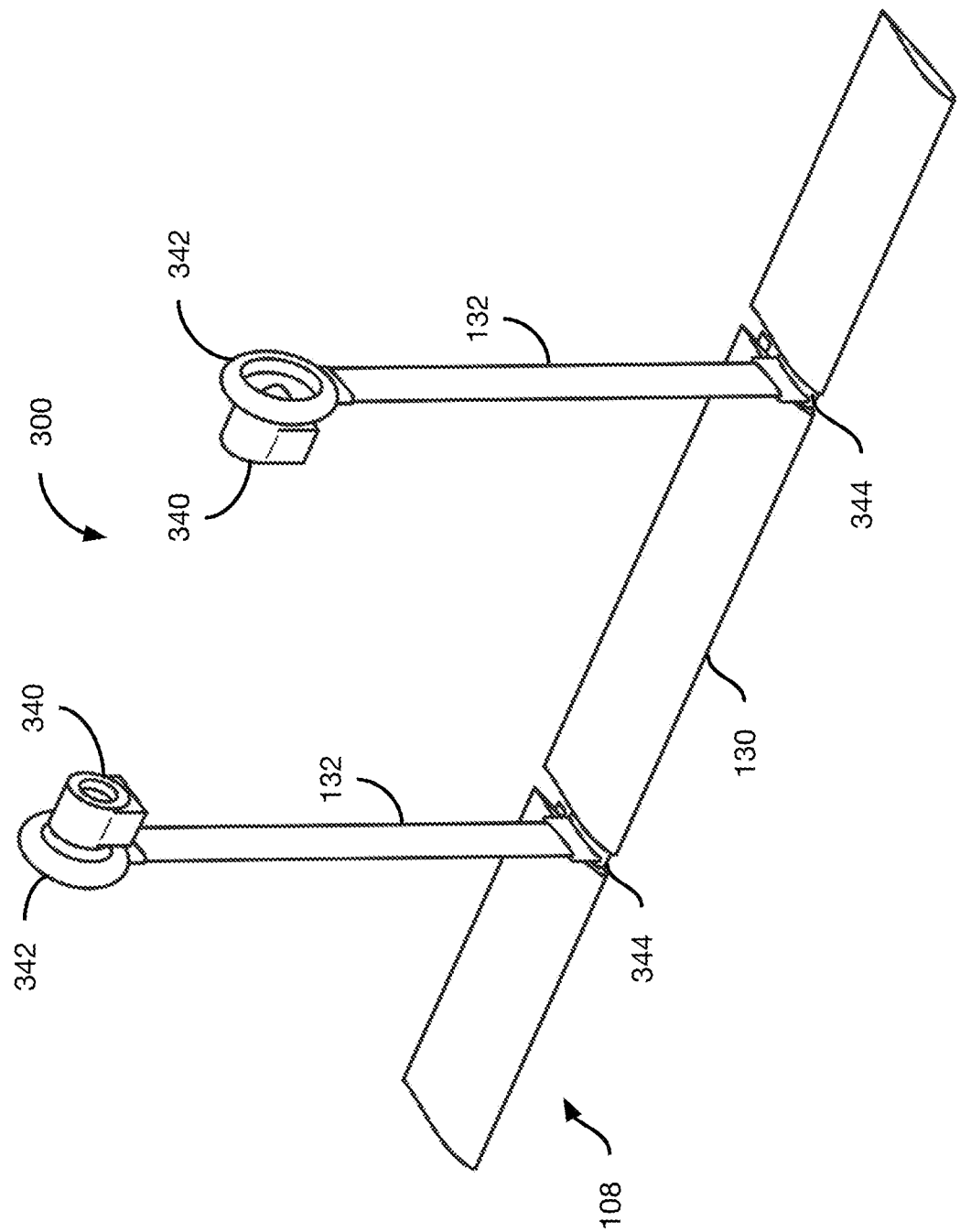
FIG. 3C depicts a main hydrofoil deployment system of a craft, in accordance with example embodiments.

FIG. 3B depicts another example of the main hydrofoil deployment system 300 that facilitates retracting and extending the main hydrofoil assembly 108 using a linear actuator comprising a dual-channel configuration. As shown by the top-down cross-sectional view of one of the main foil struts 132 in FIG. 3B, each main foil strut 132 may include a first linear channel 320 and a second linear channel 322. FIG. 3B further depicts a more detailed view of the first linear channel 320 in the cross-sectional view of section A-A, as well as a more detailed view of the second linear channel 322 in the cross-sectional view of section B-B.

The first linear channel 320 may be configured to guide the linear actuation of the main hydrofoil assembly 108 and provide reinforcing structural support to the main hydrofoil assembly 108, while the second linear channel 322 may be configured to apply an actuation force to the main hydrofoil assembly 108. In this regard, the main hydrofoil deployment system 300 may include a first column 324 having a linear guide 326 arranged in an interior portion of the first column 324. The main foil strut 132 may be configured to slide vertically in the interior portion of the first column 324 and along the linear guide 326.

In order to reduce friction while maintaining a snug fit, the first linear channel 320 may include one or more bearing elements 328 configured to interface between the first linear channel 320 and the linear guide 324. Further, the first column 324 may include one or more gaskets 330 at the interface of the main foil strut 132 and the first column 324 to facilitate sealing the interior portion of the first column 324 from water or other contamination.

The first linear channel 320 may further include a locking mechanism 332. The locking mechanism 332 may be configured to lock the main foil strut 128 in a given deployment position (e.g., in a fully deployed position, a fully retracted position, or some intermediate position) by interlocking with a corresponding receptacle in the linear guide 324. The locking mechanism 332 may be a passive locking mechanism or an active locking mechanism, which may be controlled by the control system 500.

The second linear channel 322 may include a second column 334 having a linear actuator 336 arranged in an interior portion of the second column 334. The second linear channel 322 may further include a coupling mechanism 336 configured to couple the actuator 334 to the main foil strut 132, which may be configured to slide vertically in the interior portion of the second column 334. The actuator 334 may be configured to apply an upward or downward force to the main foil strut 132 by way of the coupling mechanism 336, thereby causing the main foil strut 132 to move vertically within the first and second linear channels 320, 322. In operation, the control system 500 may cause the linear actuator 336 to apply an upward force to the main foil strut 132 to retract the main hydrofoil assembly 108, and the control system 500 may cause the linear actuator 336 to apply a downward force to the main foil strut 132 to deploy the main hydrofoil assembly 108.

Using such a dual-channel configuration may improve the structural integrity of the main hydrofoil deployment system 300 by reducing some of the stress forces applied to the actuator 336 during operation and offloading those forces onto the linear guide 324.

FIGS. 3C-3F depict yet another example of the main hydrofoil deployment system 300 that facilitates retracting and deploying the main hydrofoil assembly 108. As shown, instead of linearly deploying the main hydrofoil assembly 108, the main hydrofoil deployment system 300 depicted in FIGS. 3C-3F is configured to rotate the main hydrofoil assembly 108 around one or more hinge points between a fully deployed position (shown in FIG. 3D) and a fully retracted position (shown in FIGS. 3E and 3F). In this regard, the main hydrofoil deployment system 300 depicted in FIGS. 3C-3F includes one or more rotary actuators 340 coupled to the main foil struts 132 by way of one or more coupling mechanisms 342 configured to transfer the rotational motion of the rotary actuators 340 to the main foil struts 132. The rotary actuators 340 may be fixed to the craft 100, such as by mounting the rotary actuators 340 to the hull 102.

As further shown in FIGS. 3C-3F, when using such a rotational main hydrofoil deployment system 300, the main foil assembly 108 may be configured to also rotate an orientation of the main foil 130. For instance, as shown, the main foil 130 may be coupled to the main foil struts 132 by one or more hinge mechanisms 344 configured to rotate the main foil 130 relative to the main foil struts 132. The hinge mechanisms 344 may take various forms and may include one or more rotary actuators that may be controlled by the control system 500 to actively rotate the main foil to a desired orientation.

With the configuration depicted in FIGS. 3C-3F, the main hydrofoil deployment system 300 may articulate the main hydrofoil assembly 108 at two separate joints—the joint where the rotary actuators 340 couple the main foil struts 138 to the hull 102 and the joint where the hinge mechanisms 344 couple the main foil 130 to the main foil struts 138. Accordingly, the main hydrofoil deployment system 300 may be configured to control an angle of attack of the main foil 130 even as the main hydrofoil deployment system 300 retracts or deploys the main hydrofoil assembly 108. For instance, in some examples, the main hydrofoil deployment system 300 may be configured to maintain the main foil 130 in a substantially flat or horizontal orientation while retracting or deploying the main hydrofoil assembly 108, which may significantly reduce undesirable drag on the main hydrofoil assembly 108 while moving through water.

Figure 3D:
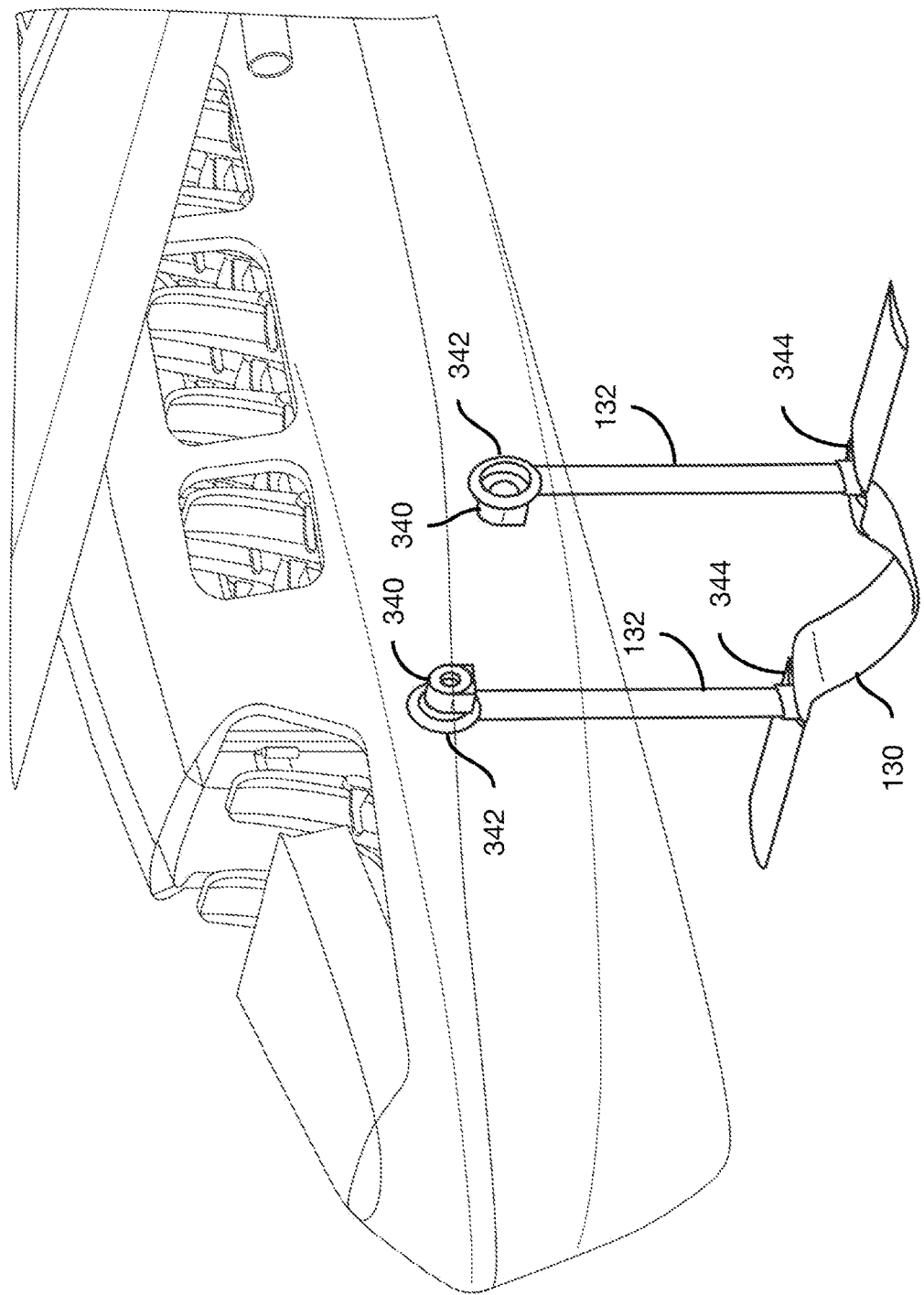
FIG. 3D depicts a main hydrofoil deployment system of a craft, in accordance with example embodiments.
Figure 3E:
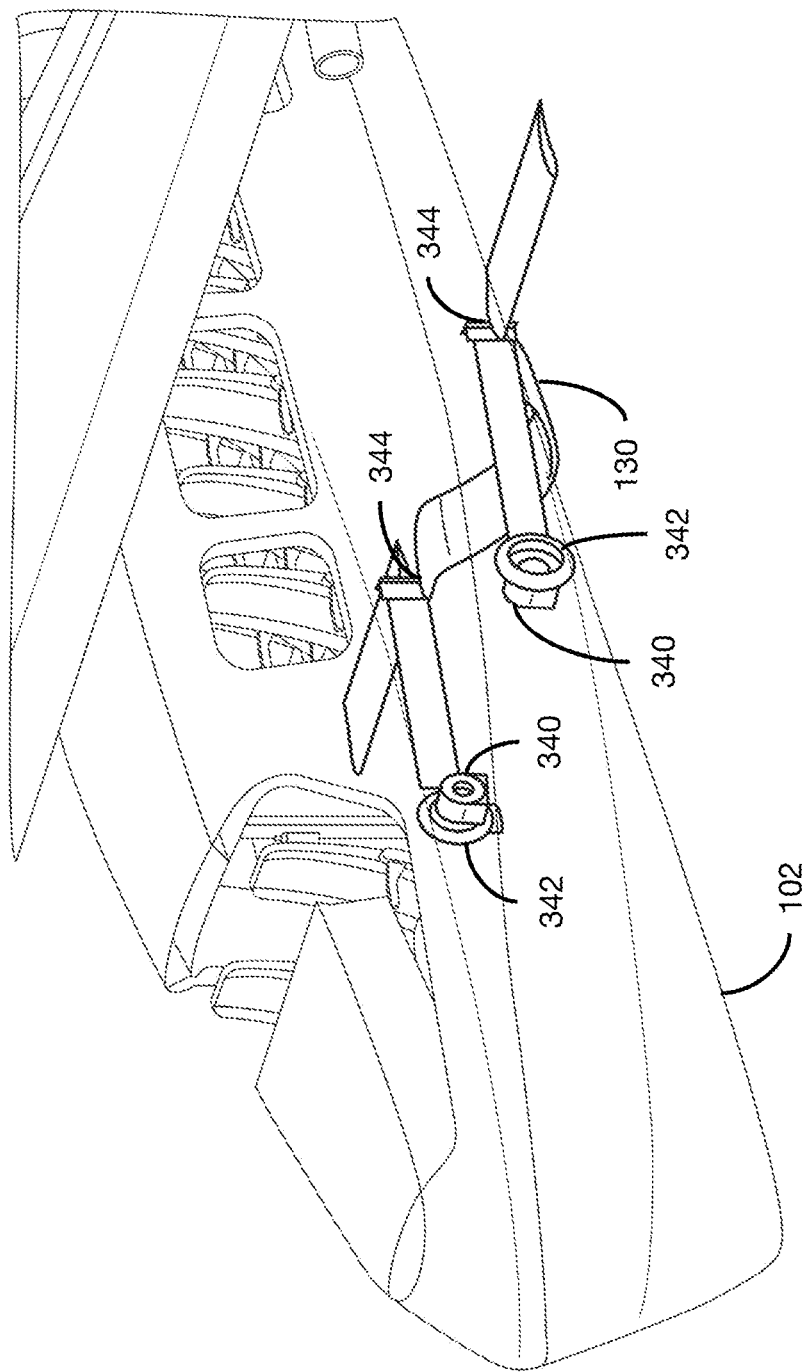
FIG. 3E depicts a main hydrofoil deployment system of a craft, in accordance with example embodiments.
Figure 3F:
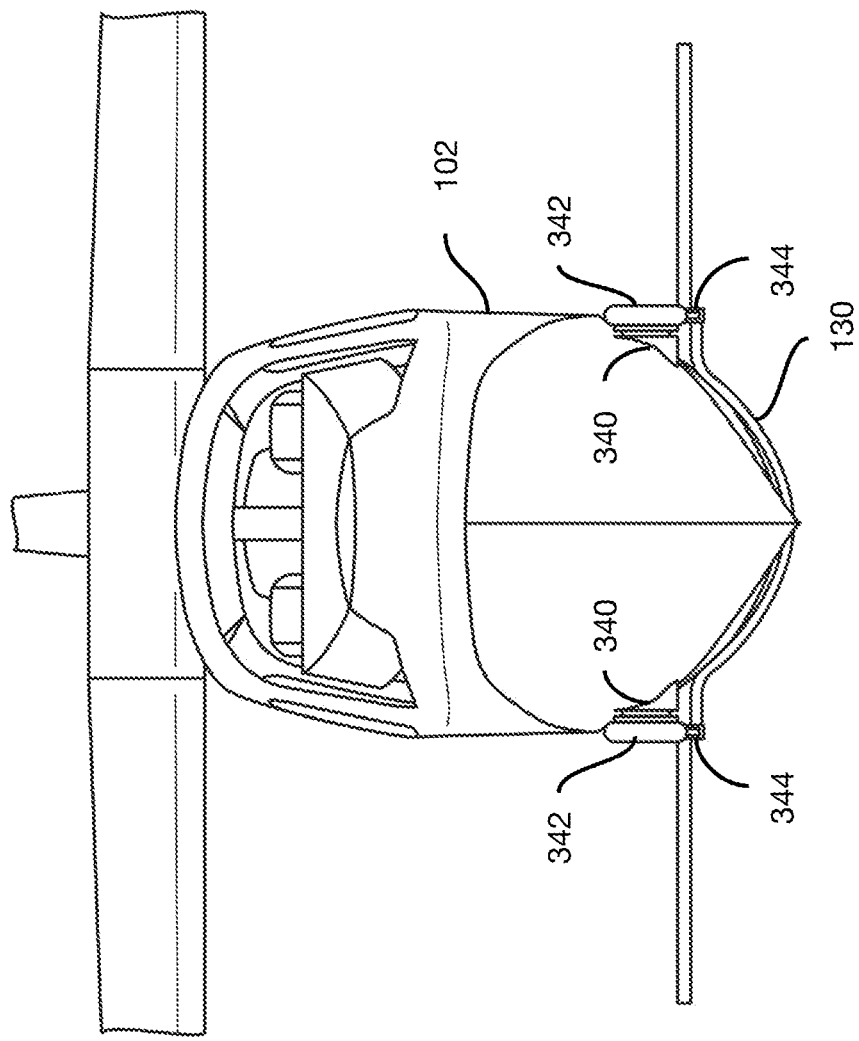
FIG. 3F depicts a main hydrofoil deployment system of a craft, in accordance with example embodiments.

Further, as shown in FIGS. 3D-3F, the main foil 130 may be shaped to conform to an outer surface of the hull 102. For instance, as shown, a center portion of the main foil 130 may be curved or otherwise shaped to include a recessed area, while the outer edge portions of the main foil 130 may be flat. As shown in FIGS. 3E and 3F, the recessed area of the main foil 130 may be configured to substantially conform to the underside of the hull 102 when the main hydrofoil assembly 108 is fully retracted. In some examples, the flat outer edges of the main foil 130 may include one or more of the main foil control surfaces 134.

Figure 3G:
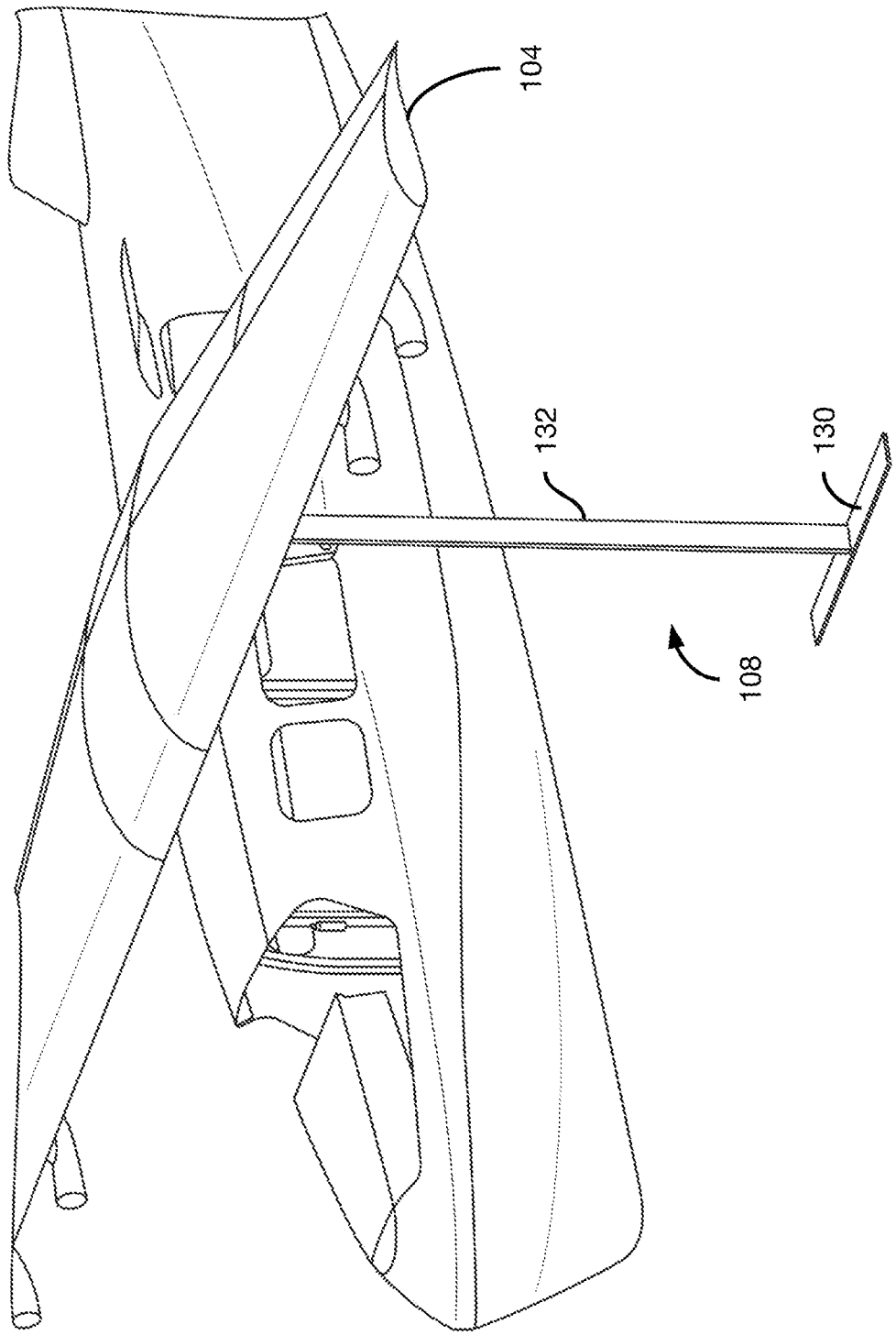
FIG. 3G depicts a main hydrofoil deployment system of a craft, in accordance with example embodiments.
Figure 3H:
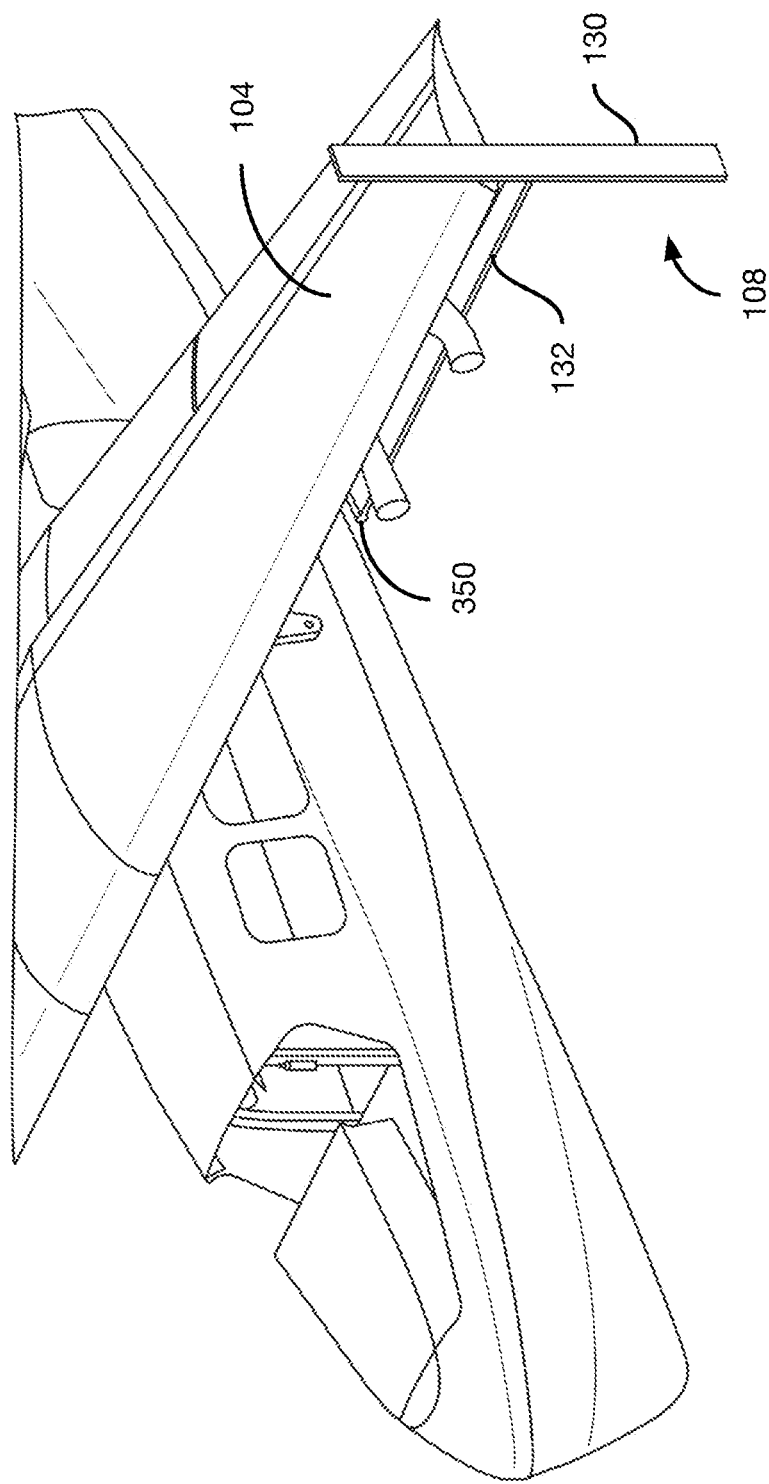
FIG. 3H depicts a main hydrofoil deployment system of a craft, in accordance with example embodiments.

FIGS. 3G and 3H depict yet another example of the main hydrofoil deployment system 300 that facilitates retracting and deploying the main hydrofoil assembly 108. As shown in FIGS. 3G and 3H, the main hydrofoil deployment system 300 may include a hinge mechanism 350 configured to couple the main foil strut 132 to the main wing 104. The hinge mechanism 350 may include a rotary actuator configured to rotate the main foil assembly 108 between a fully deployed position (shown in FIG. 3G) and a fully retracted position (shown in FIG. 3H) tucked against the underside of the main wing 104. For simplification, FIGS. 3G and 3H only depict a single hydrofoil assembly 108 on one side of the main wing 104, but it should be understood that the other side of the main wing 104 may include an additional hydrofoil assembly 108 that can be deployed and retracted using a similar main hydrofoil deployment system 300.

While the above description provides various details of example main hydrofoil deployment systems 300, it should be understood that the example main hydrofoil deployment systems 300 depicted in FIGS. 3A-3H are for illustrative purposes and are not meant to be limiting. For instance, the main hydrofoil deployment system 300 may include any of various other actuators now known or later developed that are capable of retracting and extending the main hydrofoil assembly 108.

Figure 4A:
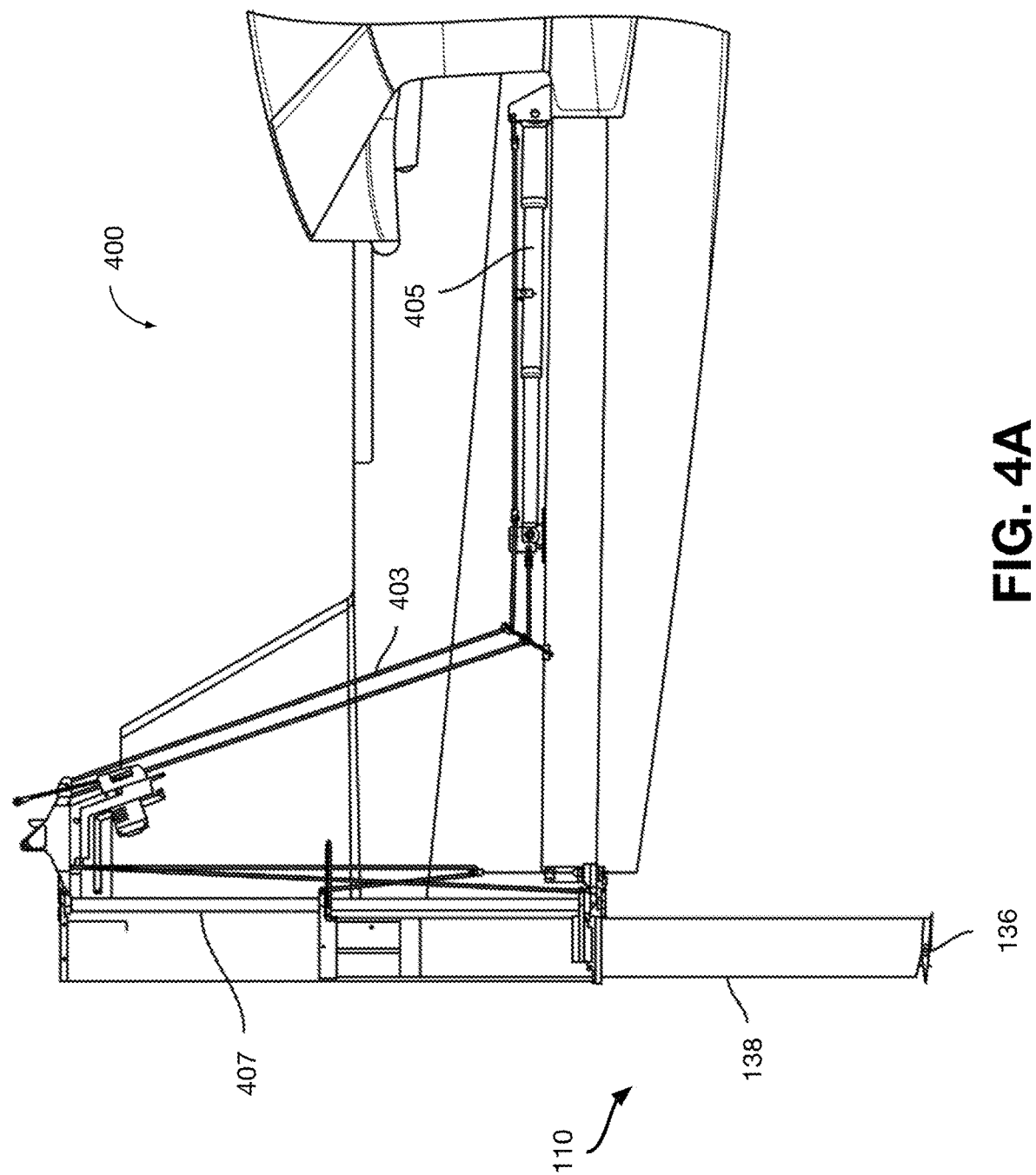
FIG. 4A depicts a rear hydrofoil deployment system of a craft, in accordance with example embodiments.
Figure 4B:
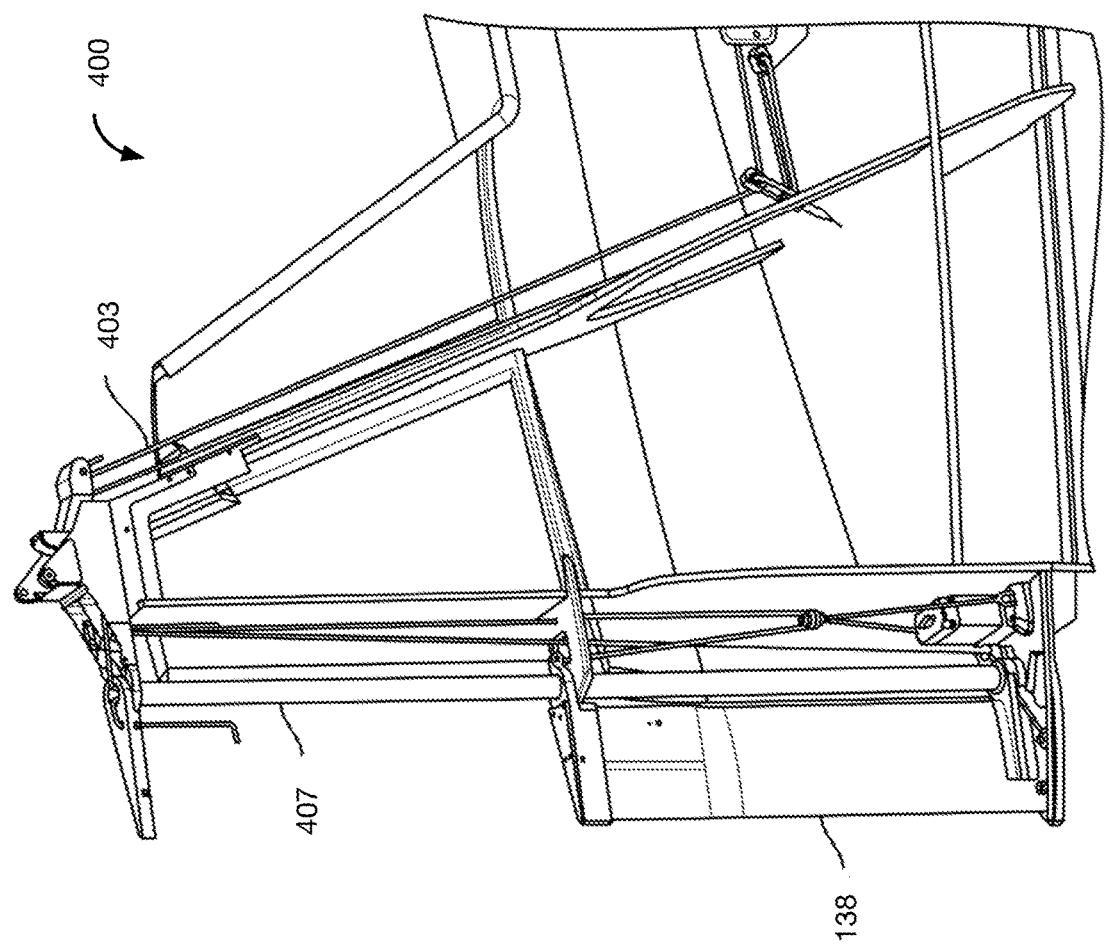
FIG. 4B depicts the rear hydrofoil deployment system of a craft, in accordance with example embodiments.

FIGS. 4A and 4B depict an example of a rear hydrofoil deployment system 400 that facilitates retracting and extending the rear foil 136. As shown, the rear hydrofoil deployment system 400 may include a pulley system 403 that couples an actuator 405 to the rear foil strut 138. When actuated, the actuator 405 causes the pulley system 403 to raise or lower the rear foil strut 138 by causing the rear foil strut 138 to slide vertically along a shaft 407. While not depicted in FIGS. 4A and 4B, in some examples, the rudder 128 may also be mounted to the shaft 407 such that, when the actuator 405 raises the rear foil strut 138, the rear foil strut 138 retracts at least partially into the rudder 128. Additionally, some examples of the rear hydrofoil deployment system 400 may include one or more servo motors configured to rotate the rear foil strut 138 around the shaft. In this respect, the rear foil strut 138 may be rotated around the shaft to act as a hydro-rudder when submerged in water or to act as an aero-rudder when out of the water. Further, because the rudder 128 is mounted to the same shaft 407 as the rear foil strut 138 and the rear foil strut 138 can be retracted into the rudder 128, the same servo motor can also be used to control the rotation of the rudder 128.

The actuator 405 of the rear hydrofoil deployment system 400 may take various forms and may, for instance, include any of various linear actuators now known or later developed that are capable of retracting and extending the rear hydrofoil assembly 110. Further, in some examples, the actuator 405 may have a non-unitary actuation ratio such that a given movement of the actuator 405 causes a larger corresponding induced movement of the rear hydrofoil assembly 110. This can help allow for faster retractions of the rear hydrofoil assembly 110, which may be beneficial during takeoff, as described in further detail below.

Some examples of the main hydrofoil assembly 108 and/or the rear hydrofoil assembly 110 may be configured such that, when fully retracted, the hydrofoil assembly is flush, conformal, or tangent to the hull 102 and/or tail 106. For instance, in some examples, the hull 102 and/or tail 106 may include one or more recesses configured to receive the main hydrofoil assembly 108 and/or the rear hydrofoil assembly 110, and the main hydrofoil assembly 108 and/or the rear hydrofoil assembly 110 may be shaped such that when the main hydrofoil assembly 108 and/or the rear hydrofoil assembly 110 are fully retracted into the one or more recesses of the hull 102 and/or tail 106, the outer contour of the hull 102 and/or tail 106 forms a substantially smooth transition at the intersection of the hull 102 and the main hydrofoil assembly 108 and/or the tail 106 and the rear hydrofoil assembly 110.

In other examples, the main hydrofoil assembly 108 and/or the rear hydrofoil assembly 110 may not conform to the shape of the hull 102 and/or tail 106 when fully retracted but instead may protrude slightly below the hull 102 and/or tail 106. In these examples, the main hydrofoil assembly 108 and/or the rear hydrofoil assembly 110 may have a non-negligible effect on the aerodynamics of the craft 100, and the craft 100 may be configured to leverage these effects to provide additional control of the craft 100. For instance, when the main hydrofoil assembly 108 and/or the rear hydrofoil assembly 110 are retracted but still exposed, the exposed hydrofoil may be manipulated in flight to impart forces and moments on the craft 100 similar to an aero-control surface.

In some examples, one or both of the main hydrofoil assembly 108 and/or the rear hydrofoil assembly 110 may be mounted on a pivot, which may be locked while underwater and unlocked while in the air to allow the hydrofoil to move around the pivot. With such a configuration, the control surfaces act like trim tabs and are able to effect movement of the entire unlocked, pivoting hydrofoil which would otherwise require impractically large and heavy servo motors. This configuration facilitates unlocking and moving of the hydrofoil using a slow servo and/or a combination of control surface movement combined with forward movement through water, and then re-locked such that the hydrofoil is at a selected angle of incidence.

As noted above, some examples of the main hydrofoil assembly 108 are configured to be retractable, such that the hull 102 may include openings through which the struts 132 of the main hydrofoil assembly 108 may be retracted and extended. However, when the hull 102 contacts the water surface, water may seep into the hull 102 through these openings. To account for this, some examples of the hull 102 may be configured to isolate water that enters the hull 102 through these openings and to allow for the water to drain from the hull 102 after the hull 102 is lifted out of the water. For instance, the hull 102 may include pockets 142 on each side of the hull 102 aligned above the struts 132. The pockets 142 may be isolated from the remainder of the interior of the hull 102 so that water that accumulates in the pockets 142 does not reach any undesired areas (e.g., the cockpit, passenger seating area, areas that house the battery system 200 or components of the control system of the WIG craft, etc.). Further, the pockets 142 may include venting holes or other openings located at or near the bottom of the pockets 142. Such venting openings may be configured to allow water that enters the pockets 142 to vent out of the pockets 142 after the hull 102 is lifted out of the water.

Some examples of the main hydrofoil assembly 108 and/or the rear hydrofoil assembly 110 may include one or more propellers for additional propulsion when submerged underwater. For instance, one or more propellers may be mounted to the main foil 130 and/or the rear foil 136. Such propellers may be configured to provide additional propulsion force to the craft 100 during hydrofoil-borne or hull-borne operation. In some examples, the one or more propellers may additionally or alternatively be mounted to the hull 102 such that the propellers are submerged during hull-borne operation and may be configured to provide additional propulsion force to the craft 100 during hull-borne operation.

Some examples of the main hydrofoil assembly 108 and/or the rear hydrofoil assembly 110 may further include various failsafe mechanisms in case of malfunction. For instance, if one or both of the main hydrofoil deployment system 300 or the rear hydrofoil deployment system 400 cannot be retracted due to a malfunction, then the craft 100 may be configured to jettison the malfunctioning assembly. In this regard, the main hydrofoil assembly 108 and/or the rear hydrofoil assembly 110 may be coupled to the hull 102 by a releasable latch. The control system of the craft 100 may be configured to identify a retraction malfunction (e.g., based on data received from the positional sensors 310) and responsively open the latch to release the connection between the hull 102 and the malfunctioning hydrofoil assembly. In some examples, the weight of the malfunctioning hydrofoil assembly may provide sufficient force to jettison the malfunctioning hydrofoil assembly out of the hull 102 when the latch is opened. However, some examples of the craft 100 may include an actuator or some other mechanism to jettison the malfunctioning hydrofoil assembly out of the hull 102. In some examples, the main hydrofoil assembly 108 and/or the rear hydrofoil assembly 110 may be configured to break in a controlled manner upon impact with a water surface. For instance, a joint between the main foil struts 132 and the hull 102 and/or a joint between the rear foil struts 138 and the hull 102 may be configured to disconnect when subjected to a torque significantly larger than standard operational torques at the joints. Other designs for providing controlled breaks are possible as well.

G. Control System

Figure 5:
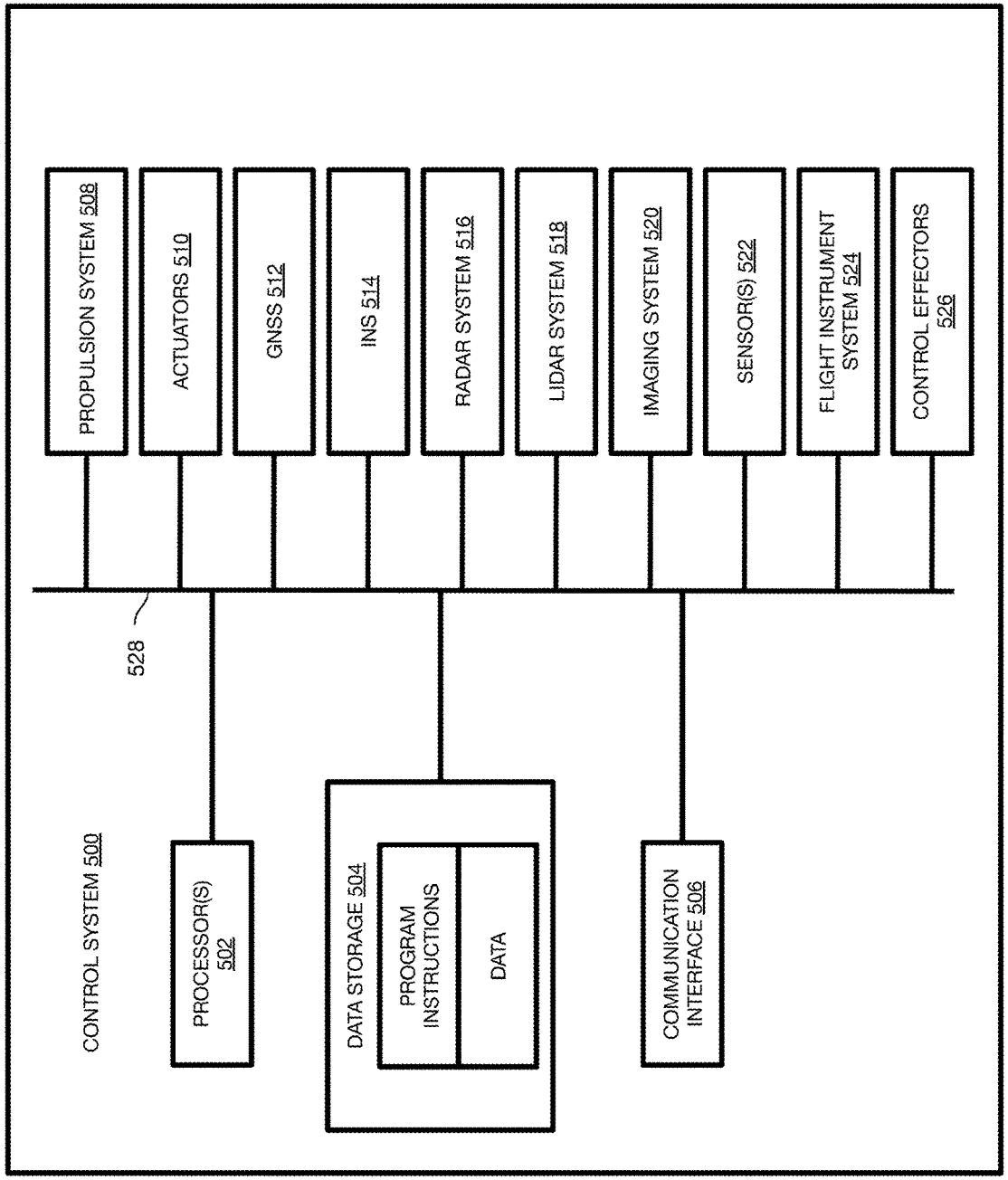
FIG. 5 depicts a control system of a craft, in accordance with example embodiments.

FIG. 5 depicts a simplified block diagram illustrating various components that may be included in an example control system 500 of the craft 100. As shown, the control system 500 may include one or more processors 502, data storage 504, a communication interface 506, a propulsion system 508, actuators 510, a Global Navigation Satellite System (GNSS) 512, an inertial navigation system (INS) 514, a radar system 516, a lidar system 518, an imaging system 520, various sensors 522, a flight instrument system 524, and flight controls 526, some or all of which may be communicatively linked by one or more communication links 528 that may take the form of a system bus, a communication network such as a public, private, or hybrid cloud, or some other connection mechanism.

The one or more processors 502 may comprise one or more processing components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. Further, while the one or more processors 502 are depicted as a separate stand-alone component of the control system 500, it should also be understood that the one or more processors 502 could comprise processing components that are distributed across one or more of the other components of the control system 500.

The data storage 504 may comprise one or more non-transitory computer-readable storage mediums that are collectively configured to store (i) program instructions that are executable by the one or more processors 502 such that the control system 500 is configured to perform some or all of the functions disclosed herein, and (ii) data that may be received, derived, or otherwise stored, for example, in one or more databases, file systems, or the like, by the control system 500 in connection with the functions disclosed herein. In this respect, the one or more non-transitory computer-readable storage mediums of data storage 504 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. Further, while the data storage 504 is depicted as a separate stand-alone component of the control system 500, it should also be understood that the data storage 504 may comprise computer-readable storage mediums that are distributed across one or more of the other components of the control system 500.

The communication interface 506 may include one or more wireless interfaces and/or one or more wireline interfaces, which allow the control system 500 to communicate via one or more networks. Example wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Example wireline interfaces may include an Ethernet interface, a Universal Serial Bus (USB) interface, CAN Bus, RS-485, or similar interface to communicate via a wire, a twisted pair of wires, a coaxial cable, an optical link, a fiber-optic link, or other physical connection to a wireline network.

The propulsion system 508 may include one or more electronic speed controllers (ESCs) for controlling the electric motor propeller assemblies 116 distributed across the main wing 104 and, in some examples, across the horizontal stabilizer 124. In some examples, the propulsion system 508 may include a separate ESC for each respective propeller assembly 116, such that the control system 500 may individually control the rotational speeds of the electric motor propeller assemblies 116.

The actuators 510 may include any of the actuators described herein, including (i) actuators for raising and lowering the flaps 118, tail flaps 127, ailerons 120, elevators 126, main foil control surfaces 134, and rear foil control surfaces 140, (ii) actuators for turning the rudder 128, the main foil control surfaces 134 positioned on the main foil struts 132, and the rear foil control surfaces 140 positioned on the rear foil strut 138, (iii) actuators for retracting and extending the main hydrofoil assembly 108 and the rear hydrofoil assembly 110, and/or (iv) actuators for performing the various other disclosed actuations of the main hydrofoil assembly 108 and the rear hydrofoil assembly 110. Each of the actuators described herein may include any actuators now known or later developed capable of performing the disclosed actuation. Some examples of the actuators 510 may correspond to linear actuators, rotary actuators, hydraulic actuators, pneumatic actuators, electric actuators, electro-hydraulic actuators, and mechanical actuators. Further, more specific examples of actuators may include electric motors, stepper motors, and hydraulic cylinders. Other examples are contemplated herein as well.

The GNSS system 512 may be configured to provide a measurement of the location, speed, altitude, and heading of the craft 100. The GNSS system 512 includes one or more radio antennas paired with signal processing equipment. Data from the GNSS system 512 may allow the control system 500 to estimate the position and speed of the craft 100 in a global reference frame, which can be used for route planning, operational envelope protection, and vehicle traffic deconfliction by both understanding where the craft 100 is located and comparing the location with known traffic.

The INS 514 may include various sensors that are configured to provide data for measuring navigational characteristics of the craft 100 without the need for external reference data. For example, the INS 514 may include motion sensors, such as angular and/or linear accelerometers, and rotational sensors, such as gyroscopes, to calculate the position, orientation, and speed of the craft 100 using dead reckoning techniques. In some examples, the control system 500 may be configured to use one or more of these components to calculate actuator outputs to stabilize or otherwise control the craft 100 during any or all modes of operation.

The radar system 516 may include a transmitter and a receiver. The transmitter may transmit radio waves via a transmitting antenna. The radio waves reflect off an object and return to the receiver. The receiver receives the reflected radio waves via a receiving antenna, which may be the same antenna as the transmitting antenna, and the radar system 516 processes the received radio waves to determine information about the object's location and speed relative to the craft 100. This radar system 516 may be utilized to detect, for example, the water surface, maritime or airborne vehicle traffic, wildlife, or weather.

The lidar system 518 may include a light source and an optical receiver. The light source emits a laser that reflects off an object and returns to the optical receiver. The lidar system 518 measures the time for the reflected light to return to the receiver to determine the distance between the craft 100 and the object. In some examples, the control system 500 may be configured to use the lidar system 518 to measure the distance from the craft 100 to the surface of the water in various spatial measurements.

The imaging system 520 may include one or more still and/or video cameras configured to capture image data from the environment of the craft 100. Some examples of the cameras may correspond to or comprise charge-coupled device (CCD) cameras, complementary metal-oxide-semiconductor (CMOS) cameras, short-wave infrared (SWIR) cameras, mid-wave infrared (MWIR) cameras, or long-wave infrared (LWIR) cameras. In some examples, the control system 500 may be configured to use the imaging system 520 to perform obstacle avoidance, localization techniques, water surface tracking for more accurate navigation (e.g., by applying optical flow techniques to images), video feedback, and/or image recognition and processing, among other possibilities.

As noted above, the control system 500 may further include various other sensors 522 for use in controlling the craft 100. Examples of such sensors 522 may correspond to or comprise thermal sensors or other fire detection sensors for detecting a fire in the hull 102 or for detecting thermal runaway in the battery system 200. As further described above, the sensors 522 may include position sensors for sensing a position of the elevator 126, the tail flaps 127, the main hydrofoil assembly 108 and/or the rear hydrofoil assembly 110 (e.g., sensing whether the assemblies are in a retracted or extended position). Examples of position sensors may include photodiode sensors, capacitive displacement sensors, eddy-current sensors, Hall effect sensors, inductive sensors, or any other position sensors now known or later developed.

Some examples of the sensors 522 may facilitate determining an altitude of the craft 100. For instance, the sensors 522 may include an ultrasonic altimeter configured to emit and receive ultrasonic waves. The emitted ultrasonic waves reflect off the water surface below the craft 100 and return to the altimeter. The ultrasonic altimeter measures the time for the reflected ultrasonic wave to return to the altimeter to determine the distance between the craft 100 and the water surface. As another example, the sensors 522 may include a barometer for use as a pressure altimeter. The barometer measures the atmospheric pressure in the environment of the craft 100 and determines the altitude of the craft 100 based on the measured pressure. As another example, the sensors 522 may include a radar altimeter to emit and receive radio waves. The radar altimeter measures the time for the radio wave to reflect off of the surface of the water below the craft 100 to determine a distance between the craft 100 and the water surface. These various sensors may be placed at different locations on the craft 100 in order to reduce the impact of sensor constraints, such as sensor deadband or sensitivity to splashing water.

Further, the control system 500 may be configured to use one or more of the sensors 522 or other components of the control system 500 to help navigate the craft 100 through maritime traffic or to avoid any other type of obstacle. For example, the control system 500 may determine the position, orientation, and speed of the craft 100 based on data from the INS 514 and/or the GNSS 512, and the control system 500 may determine the location of an obstacle, such as a maritime vessel, a dock, or various other obstacles, based on data from the radar system 516, the lidar system 518, and/or the imaging system 520. In some examples, the control system 500 may determine the location of an obstacle using the Automatic Identification System (AIS). The control system 500 may be configured to maneuver the craft 100 to avoid collision with an obstacle based on the determined position, orientation, and speed of the craft 100 and the determined location of the obstacle by actuating various control surfaces of the craft 100 in any of the manners described herein.

The flight instrument system 524 may include instruments for providing data about the altitude, speed, heading, orientation (e.g., yaw, pitch, and roll), battery levels, or any other information provided by the various other components of the control system 500.

The flight controls 526 may include various input devices that may allow an operator to interact with and provide input to the control system 500. Some examples of the flight controls 526 may include one or more joysticks, thrust control levers, buttons, switches, dials, levers, or touch screen displays, etc. In operation, a pilot may use the flight controls 526 to operate one or more control surfaces (e.g., flaps, ailerons, elevators, rudder, propulsion props, etc.) of the craft 100 to thereby maneuver the craft 100 (e.g., control the direction, speed, altitude, etc. of the craft 100)

In some examples, the combinations of control surfaces on the craft 100 used by the control system 500 to control operations of the craft 100 depends on the mode of operation of the craft 100 and is determined based at least in part on aspects such as vehicle position, speed, attitude, acceleration, rotational rates, and/or altitude above water. Table 1 summarizes an example of the relationship between the control surfaces and the operational mode of the craft 100.

TABLE 1

| Control Surface | Hull-borne | Hydrofoil-borne | Wing-borne |
| --- | --- | --- | --- |
| Propulsion | Y | Y | Y |
| Aerodynamic Elevator | N | Y | Y |
| Aerodynamic Ailerons | N | Y | Y |
| Aerodynamic Rudder | Y | Y | Y |
| Aerodynamic Wing Flaps | N | Y | Y |
| Aerodynamic Tail Flaps | Y | Y | Y |
| Hydrodynamic Elevator | Y | Y | N |
| Hydrodynamic Flaps | Y | Y | N |
| Hydrodynamic Rudder | Y | Y | N |

In some examples, the propulsion control surfaces in the table include the propeller assembly 116, as well as any propellers mounted to the hull 102, main hydrofoil assembly 108, or rear hydrofoil assembly 110. In some examples, the aerodynamic elevator control surfaces include elevator 126, the aerodynamic ailerons include ailerons 120, the aerodynamic rudder includes rudder 128 (when not submerged), the aerodynamic flaps include flaps 118, the hydrodynamic elevator includes rear hydrofoil control surfaces 140, the hydrodynamic flaps include main hydrofoil control surfaces 134, and the hydrodynamic rudder includes rudder 128 (when submerged).

In some examples, when actuating the control surfaces in the various example operational modes identified in Table 1 above, the control system 500 may execute different levels of stabilization along the various vehicle axes during different modes of operation. Table 2 below identifies examples of stabilization controls that the control system 500 may apply during the various modes of operation for each axis of the craft 100. Closed-loop control may comprise feedback and/or feed-forward control.

TABLE 2

| Vehicle Axis | Hull-borne | Hydrofoil-borne | Wing-borne |
| --- | --- | --- | --- |
| Pitch Axis | None | Closed-loop control on vehicle ride height | Closed-loop control on vehicle altitude |
| Roll Axis | None | Closed-loop control around vehicle bank angle = 0 | Stabilization and closed-loop control on heading |
| Yaw Axis | Rate stabilization | Closed-loop control on vehicle heading | Closed-loop control on vehicle heading |
| Speed Control | Closed-loop control on vehicle GPS Speed | Closed-loop control on vehicle GPS Speed | Closed-loop control on vehicle airspeed |

Further, in some examples, the control system 500 may be configured to actuate different control surfaces to control movement of the craft 100 about its different axes. Table 3 below identifies example axial motions that are affected by the various control surfaces of the craft 100.

TABLE 3

| Control Surface | Axis Control Function |
|---|---|
| Propulsion | (a) accelerate and decelerate the vehicle<br>(b) turn the vehicle about yaw axis<br>(c) create a rolling moment |
| Aerodynamic Elevator | (a) create a pitch up or pitch down moment |
| Aerodynamic Ailerons | (a) create a rolling moment<br>(b) increase lift on aerodynamic wing<br>(c) create a pitch down moment |
| Aerodynamic Rudder | (a) create a yawing moment |
| Aerodynamic Wing Flaps | (a) increase lift on aerodynamic wing<br>(b) create a pitch down moment |
| Aerodynamic Tail Flaps | (a) create a pitch up moment |
| Hydrodynamic Elevator | (a) create a pitch moment<br>(b) generate heave force on rear hydrofoil |
| Hydrodynamic Flaps | (a) generate heave force on main hydrofoil |
| Hydrodynamic Rudder | (a) create a yaw moment |

It should be understood that the control system 500 can be configured to optimize control outputs based on any one or a combination of functions, parameters, or considerations. By way of non-limiting example, the control system 500 can be configured to output a desired pitch which can be mapped as a pitch moment and control surface deflection based on the actuators being used. Moreover, the deflection of the elevator 126 and flaps (i.e., flaps 118 and tail flaps 127) can be mapped to or as a function of pitch, pitch rate, current actuator state, operational status of actuators (e.g., operational vs inoperational), altitude, motor output, weather conditions, loading conditions, temperature, and the like. This optimization can be driven to minimize draft, minimize power to deflect, maximize rate of response, or any other desired characteristics.

III. Example Modes of Operation

A. Hull-Borne Operation

Figure 6A:
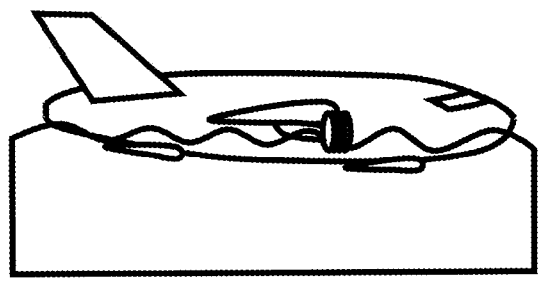
FIG. 6A depicts a craft in a hull-borne mode of operation, in accordance with example embodiments.

FIG. 6A illustrates an example of the craft 100 when the craft 100 is operating in a hull-borne mode. During this mode, the craft 100 is docked and floating on the hull 102, with the buoyancy of the outriggers 114 providing for roll stabilization of the craft 100. While docked, the battery system 200 of the craft 100 may be charged. In some examples, rapid charging is aided by an open or closed-loop water-based cooling system. In some examples, the surrounding body of water is used in the loop or as a heat sink. In some examples, the craft 100 includes a heat sink integrated into the hull 102 for exchanging heat from the battery system 200 to the surrounding body of water. In other examples, the heat sink is located offboard in order to reduce the mass of the craft 100.

Additionally, in some examples, the propeller assemblies 116 are folded in a direction away from the dock while the craft 100 is docked to help avoid collision with nearby structures or people. This folding may be actuated in various ways, such as by metal spring force, hydraulic pressure, electromechanical actuation, or centrifugal force due to propeller rotation. Other examples are possible as well. Further, in some examples, the main hydrofoil assembly 108 and the rear hydrofoil assembly 110 are retracted (or partially retracted) to avoid collisions with nearby underwater structures.

In some examples, when the craft 100 is ready to depart, the craft 100 uses its propulsion systems, including the propeller assemblies 116 and/or the underwater propulsion system (e.g., one or more propellers mounted to the hull 102, the main foil 130, and/or the rear foil 136), to maneuver away from the dock while remaining hull-borne. In some examples, the main hydrofoil assembly 108 and the rear hydrofoil assembly 110 remain retracted (or partially retracted) during this maneuvering to reduce the risk of hitting underwater obstacles near docks or in shallow waterways. However, when there is a limited risk of hitting underwater obstacles, the craft 100 may partially or fully extend the main hydrofoil assembly 108 and/or the rear hydrofoil assembly 110. With the main hydrofoil assembly 108 and/or the rear hydrofoil assembly 110 extended, the craft 100 actuates the main foil control surfaces 134 and/or the rear foil control surfaces 140 to improve maneuverability as described above.

In some examples, at low speeds during hull-borne operation, the control system 500 controls the position and/or rotation of the craft 100 by causing all of the propeller assemblies 116 to spin at the same idle speed, but with a first subset spinning in a forward direction and a second subset spinning in a reverse direction. For instance, in some examples, the control system 500 causes propeller assemblies 116a, 116c, 116f, and 116h to idle in reverse and propeller assemblies 116b, 116d, 116e, and 116g to idle forward. In this arrangement, the control system 500 causes the craft 100 to make various maneuvers without having to change the direction of rotation of any of the propeller assemblies 116. For instance, to induce a yaw on the craft 100, in some examples, the control system 500 increases the speed of the reverse propeller assemblies on one side of the main wing 104 while increasing the speed of the forward propeller assemblies on the other side of the main wing 104 and without causing any of the propeller assemblies to transition from forward to reverse or from reverse to forward. For example, idling the propellers at a nominal RPM may allow for a faster response in generating a yaw moment on the craft 100 because the propellers required for generating the yaw moment do not have to increase from zero RPM to the desired RPM value. Rather, they can spin from the idle RPM to the desired RPM value.

B. Hydrofoil-Borne Maneuvering Operation

Figure 6B:
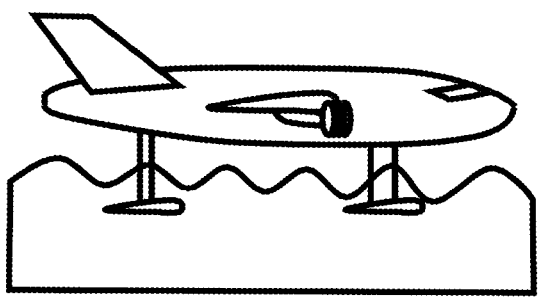
FIG. 6B depicts a craft in a hydrofoil-borne maneuvering mode of operation, in accordance with example embodiments.

FIG. 6B illustrates an example of the craft 100 when the craft 100 is operating in hydrofoil-borne maneuvering mode. During this mode, the craft 100 is configured to, for example, move through harbors and crowded waterways at speeds generally between 20-45 mph. In this regard, the craft 100 may extend the main hydrofoil assembly 108 and the rear hydrofoil assembly 110 (if not already extended) (not shown in FIG. 6B) and accelerate using the previously described propulsion system towards a desired takeoff speed. During acceleration, the craft 100 reaches a speed at which the main hydrofoil assembly 108 and the rear hydrofoil assembly 110 alone support the weight of the craft 100, and the hull 102 is lifted above the surface of the water (e.g., by 3-5 ft) so that the hull is clear of any surface waves. After the hull 102 leaves the surface of the water, the drag forces exerted on the craft 100 drop significantly, and the amount of thrust required to maintain acceleration can be reduced. Therefore, in some examples, after the hull 102 has left the water, the control system 500 reduces the speed of the propeller assemblies 116 to lower the thrust of the craft 100.

Some examples of the control system 500 sustain this operational mode by actively controlling the pitch and speed of the craft 100 so that the main hydrofoil assembly 108 and the rear hydrofoil assembly 110 continue to entirely support the weight of the craft 100. In this regard, some examples of the control system 500 actuate the main foil control surfaces 134 and/or the rear foil control surfaces 140 and/or the propulsion system to stabilize the attitude of the craft 100 to maintain the desired height above the surface of the water, vehicle heading, and vehicle forward speed. In this regard, some examples of the control system 500 are configured to detect various changes in the yaw, pitch, or roll of the craft 100 based on data provided by the INS 514 and to make calculated actuations of the main hydrofoil control surfaces 134 and/or the rear hydrofoil control surfaces 140 to counteract the detected changes.

C. Hydrofoil-Borne Takeoff Operation

Figure 7A:
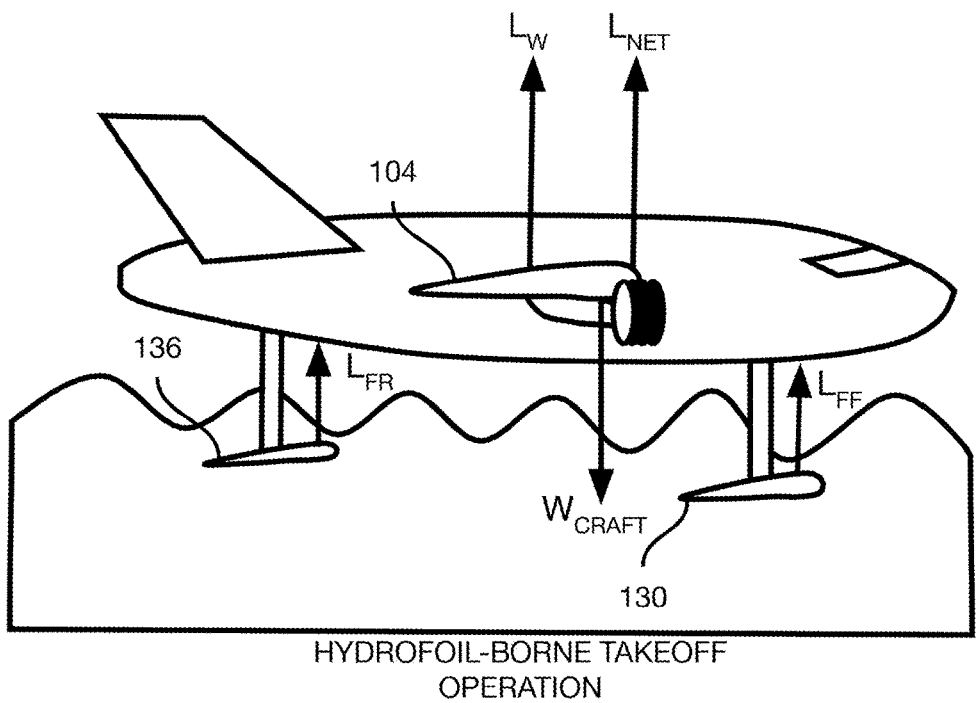
FIG. 7A depicts a craft in a hydrofoil-borne takeoff mode of operation, in accordance with example embodiments.

FIG. 7A illustrates an example of the craft 100 when the craft 100 is operating in hydrofoil-borne takeoff mode. During this mode, the craft 100 is configured to, for example, move through open waters and obtain speeds generally between 40-50 mph to facilitate generating the lift required to become wing-borne.

Referring to FIG. 7A, aero lift, $L_W$, generally represents the lift generated by the main wing 104 of the craft 100 but can also include the lift generated by other surfaces such as the tail wing, hull, or propulsive devices such as props, rotors, jects, etc. $L_F$ generally corresponds to the lift generated by one or more hydrofoils 130, 136 of the craft 100, where $L_{FF}$ corresponds to the lift generated by the front foil and the $L_{FR}$ corresponds to the lift generated by the rear foil. $W_{CRAFT}$ corresponds to the force of gravity exerted on the craft 100 and is also referred to as the weight of the craft. During steady state operation, $W_{CRAFT}$ generally corresponds to $L_W + L_{FR} + L_{FF}$ which also corresponds to $L_{NET}$. Throughout the description, the term $L_F$ is generally understood to correspond to $L_{FR} + L_{FF}$.

As previously noted, some experimental craft developed by Applicant that include hydrofoils were unable to achieve the lift required to sustain flight. In these experimental craft, in an attempt to become airborne, the craft 100 would ramp up to a speed at which point the hydrofoil would breach the surface of the water, as $W_{CRAFT} < L_W + L_F$, and $L_F > 0$, resulting in $L_W < W_{CRAFT}$. However, in order to takeoff from the water's surface, the aero lift must be greater than or equal to the weight of the craft, however prior to takeoff, the hydrofoils are still under the water's surface, and up until takeoff, have been generating lift as the aerodynamic lift has been insufficient for takeoff up until this point. If the hydro lift and the aero lift sum to greater than the weight of the craft, the vehicle will accelerate upwards and potentially create a premature takeoff condition (prior to condition $C_0$ in FIG. 7B) as the aero lift, $L_W$, generated by the wings, etc., of the craft 100 would be insufficient to sustain flight, and, as a result, the craft 100 would come back down and breach the water, ultimately preventing takeoff. The techniques disclosed below ameliorate these problems by controlling the hydrofoil lift vector, $L_F$, specifically by generating downward forces of one or more hydrofoils 130, 136 of the craft 100 to keep the hydrofoils 130, 136 submerged until after the upwards aero lift, $L_W$, is sufficient to allow the craft 100 to sustain flight.

In some examples, the $L_F$ is in the downward direction and is introduced via the hydrofoil(s) as $L_W$ increases beyond $W_{CRAFT}$ while the craft 100 is increasing in speed in anticipation of takeoff. This allows the craft 100 to generate a greater overall aero lift, $L_W$, prior to actual takeoff than would otherwise be possible. Then, at the appropriate time (e.g., when $L_W$ reaches some predetermined threshold such as the weight of the craft 100 or some margin thereof), the negative lift, $L_F$, can be "released" from the craft 100, and the craft 100 can, as a result, proceed to become wing-borne.

Figure 7B:
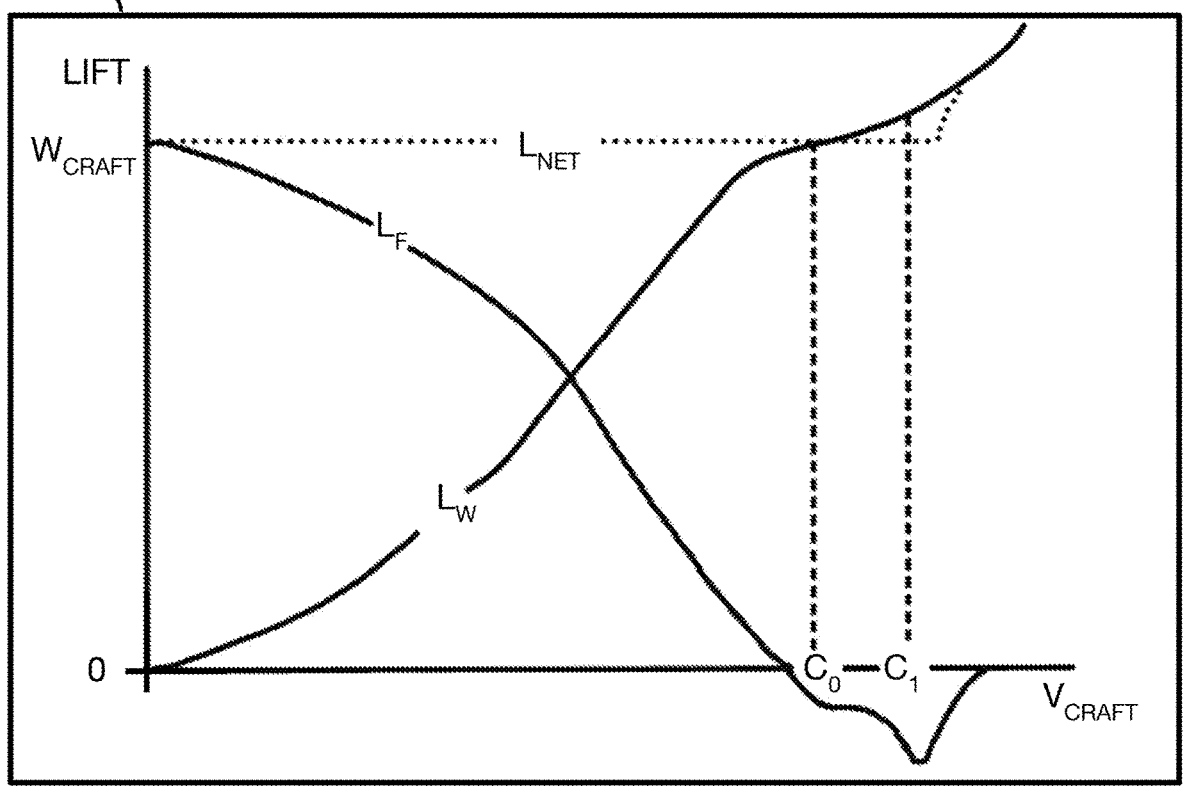
FIG. 7B is a graph that depicts various lift forces acting on a craft, in accordance with example embodiments.

FIG. 7B is an example of a graph 700 that relates these aspects. The relationships shown in the graph 700 and the ways in which various lift forces, thresholds, etc., are depicted are merely examples and are provided to aid understanding of the various operations and procedures described herein. As shown, the net lift, $L_{NET}$, on the craft 100 initially corresponds to the combination of the aero lift, $L_W$, generated by the wing (e.g., main wing, tail wing, etc.) and the lift, $L_F$, generated by the hydrofoils 130, 136 (e.g., $L_{NET} = L_W + L_F$). On the left side of the graph 700, the speed of the craft 100 is such that $L_{NET}$ is sufficient to allow the craft 100 to operate in hydrofoil-borne maneuvering mode but is insufficient to allow the craft 100 to become wing-borne. Moving to the right of the graph 700 as speed increases, $L_W$ increases with increased craft 100 water speed. To maintain ride height and prevent the hydrofoils 130, 136 from breaching the water surface, $L_F$ is reduced in proportion to an increase in $L_W$. For example, $L_F$ is adjusted with the speed of the craft 100 to maintain $L_{NET}$ at a margin equal to the weight, $W_{CRAFT}$, of the craft 100. The overall lift provided by the hydrofoils 130, 136 may decrease at the same rate at which lift from the wing is increased towards zero or even become negative with increased speed. For example, just before the speed of the craft 100 reaches the speed associated with condition $C_0$, $L_F$ may be reduced to zero. The conditions at $C_0$ (e.g., speed of the craft 100, angle of attack of craft 100, deflection angles of control surfaces, angle of incidence of hydrofoils, etc.) may be such that $L_F$ may be negative. At $C_0$, the aero lift, $L_W$, generated by the main wing 105 may be expected to be able to transition the craft 100 to a wing-borne mode of operation if the downwards hydrofoil lift, $L_F$, were to be removed as $L_W = W_{CRAFT}$. Accordingly, at some time and/or increased speed after this point (e.g., speed associated with condition $C_1$) where $L_W > W_{CRAFT}$, $L_F$ may be gradually or abruptly removed/released. This, in turn, allows $L_{NET}$ to be approximately equal to or greater than $W_{CRAFT}$, which allows the craft 100 to take off and become wing-borne.

While not shown in the graph, in some examples, $L_F$ is not removed/released as described. Rather, as the craft 100 continues to accelerate, the downwards hydrofoil lift, $L_F$, increases to a maximum downwards amount (e.g., a predetermined maximum amount and/or a maximum amount achievable due to the limitations of the control capabilities of the hydrofoil). As the aero lift, $L_W$, generated by the main wing 105 continues to increase passed this maximum amount of downwards hydrofoil lift, $L_F$, $L_{NET}$ increases in the upwards direction beyond $W_{CRAFT}$ and the craft 100 is pulled from the water. This, in turn transitions the craft 100 to a wing-borne mode of operation.

FIGS. 8A-8G illustrate examples of ways in which one or more of the hydrofoils 130, 136 of the craft 100 can be articulated to control the lift, $L_F$, generated by the hydrofoils 130, 136. The hydrofoil 130 in the figures represents the main hydrofoil 130. However, the aspects described herein apply to the rear hydrofoil 136 or other hydrofoil configurations that use a different number of hydrofoils. Further, additional/alternative aspects may be capable of further controlling the lift generated by the hydrofoils, and such aspects may be implemented additionally or alternatively to the specific aspects described in connection with FIGS. 8A-8G.

Figure 8A:
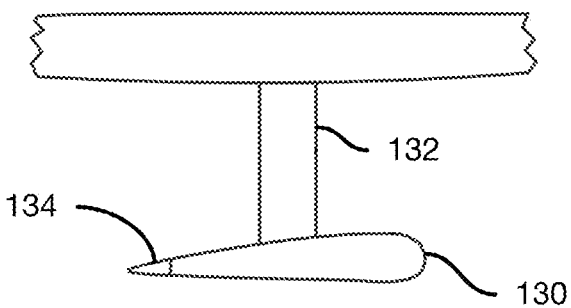
FIG. 8A depicts example aspects of articulation of a hydrofoil of a craft, in accordance with example embodiments.
Figure 8B:
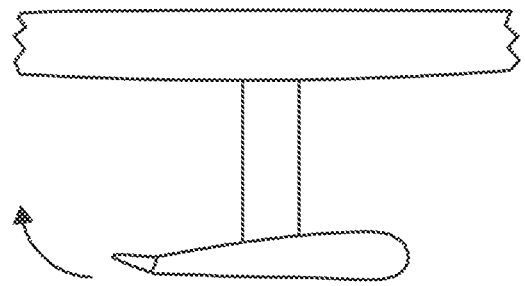
FIG. 8B depicts example aspects of articulation of a hydrofoil of a WIG craft, in accordance with example embodiments.
Figure 8C:
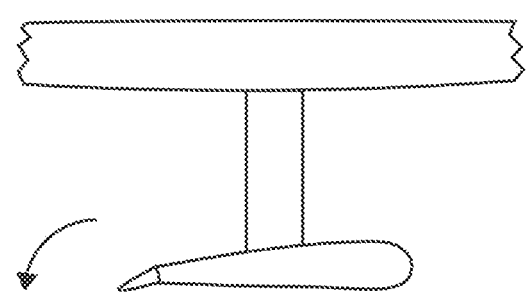
FIG. 8C depicts example aspects of articulation of a hydrofoil of a craft, in accordance with example embodiments.

FIGS. 8A-8C illustrate the articulation of one or more control surfaces 134 of the hydrofoil 130 of the craft 100 to control the lift, $L_F$, generated by the hydrofoil 130. As noted above, some examples of the hydrofoils 130, 136 include one or more control surfaces 134, 140 that are hingedly connected to trailing edges of the hydrofoils 130, 136. These control surfaces 134, 140 operate in a similar manner as the flaps 118, ailerons 120, and/or elevators on the main wing 104 of the craft 100 and the elevators 126 on the tail 106 of the craft 100. Some examples of these control surfaces 134, 140 are operated via one or more actuators which are in turn controlled by the control system 500. As the craft 100 accelerates through the water, the control system 500 can adjust/maintain the ride height of the craft 100 (e.g., the height of the craft 100 above the water surface) by adjusting the respective position (e.g., deflection angles) of the control surfaces 134, 140. For example, as shown in FIGS. 8A-8C, a control surface 134 of the main hydrofoils 130 can be rotated from the initial position shown in FIG. 8A to the upward direction shown in FIG. 8B to generate negative lift, $L_F$ (or reduce positive lift, $L_F$). The control surface 134 of the main hydrofoil 130 can be rotated in the downward direction shown in FIG. 8C to generate positive lift, $L_F$ (or reduce negative lift, $L_F$).

Figure 8D:
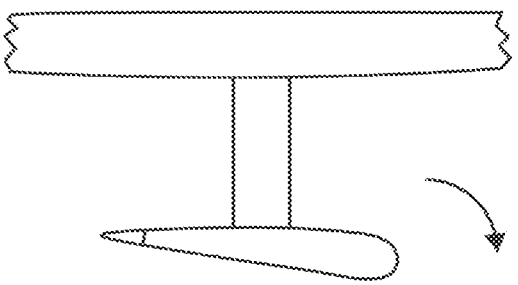
FIG. 8D depicts example aspects of articulation of a hydrofoil of a craft, in accordance with example embodiments.
Figure 8E:
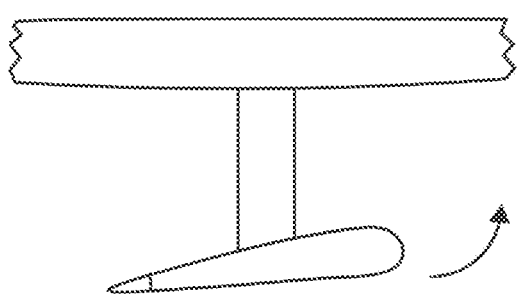
FIG. 8E depicts example aspects of articulation of a hydrofoil of a craft, in accordance with example embodiments.

FIGS. 8D-8E illustrate the articulation of the angle of incidence of the hydrofoil 130 of the craft 100 to control the lift, $L_F$, generated by the hydrofoil 130. As previously noted, some examples of the craft 100 include one or more actuators for controlling the angle of incidence of the main hydrofoil 130 and/or the rear hydrofoil 136 (i.e., rotating the main hydrofoil 130 and/or the rear hydrofoil 136 around the pitch axis). As shown in FIG. 8D, the angle of incidence of the main hydrofoil 130 can be reduced by rotating the main hydrofoil 130 clockwise from the initial position shown in FIG. 8A (i.e., rotated downward in the direction of travel) to generate negative lift, $L_F$ (or reduce positive lift, $L_F$). As shown in FIG. 8E, the angle of incidence of the main hydrofoil 130 can be increased by rotating the main hydrofoil 130 counterclockwise from the initial position (i.e., rotated upward in the direction of travel) to generate positive lift, $L_F$ (or reduce negative lift, $L_F$).

Figure 8F:
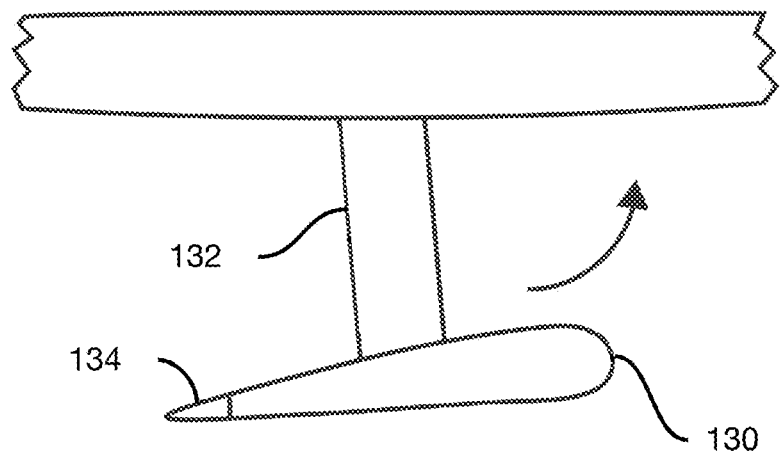
FIG. 8F depicts example aspects of articulation of a hydrofoil of a craft, in accordance with example embodiments.
Figure 8G:
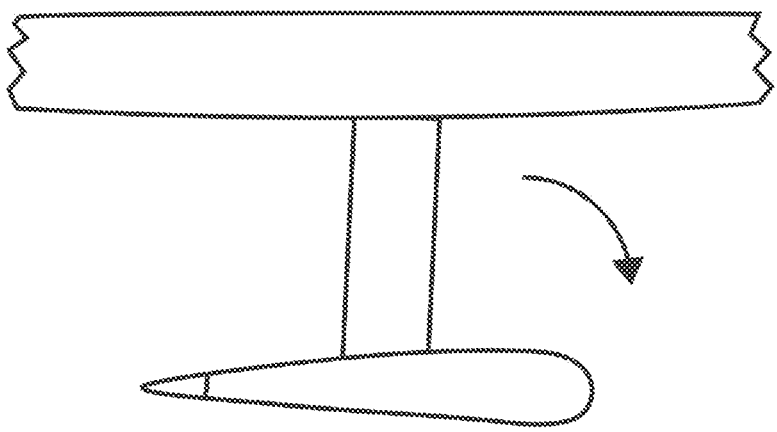
FIG. 8G depicts example aspects of articulation of a hydrofoil of a craft, in accordance with example embodiments.

FIGS. 8F-8G illustrate the articulation of the angle of the strut 132 of the hydrofoil 130 of the craft 100 to control the lift, $L_F$, generated by the hydrofoil 130. As previously noted above, some examples of the craft 100 include one or more actuators for controlling the angle of main hydrofoil struts 132 and the rear hydrofoil struts 138 that couple the corresponding main hydrofoil 130 and/or the rear hydrofoil 136 to the hull 102, respectively. As shown in FIGS. 8F and 8G, the angle of incidence of the main hydrofoil 130 can be increased or decreased by rotating the main hydrofoil 130 counterclockwise as shown in FIG. 8F (i.e., rotated upwards in the direction of travel) or clockwise as shown in FIG. 8G (i.e., rotated downwards in the direction of travel) from the initial position shown in FIG. 8A using these actuators to generate positive lift, $L_F$ (or reduce negative lift, $L_F$) or to generate negative lift, $L_F$ (or reduce positive lift, $L_F$), respectively. While the various ways in which the main hydrofoil 130 can be articulated are shown separately in FIGS. 8A-8G, it should be understood that any combination of these articulation procedures can be used to control the lift, $L_F$, generated by the main hydrofoil 130 and/or the rear hydrofoil 136.

Figure 9A:
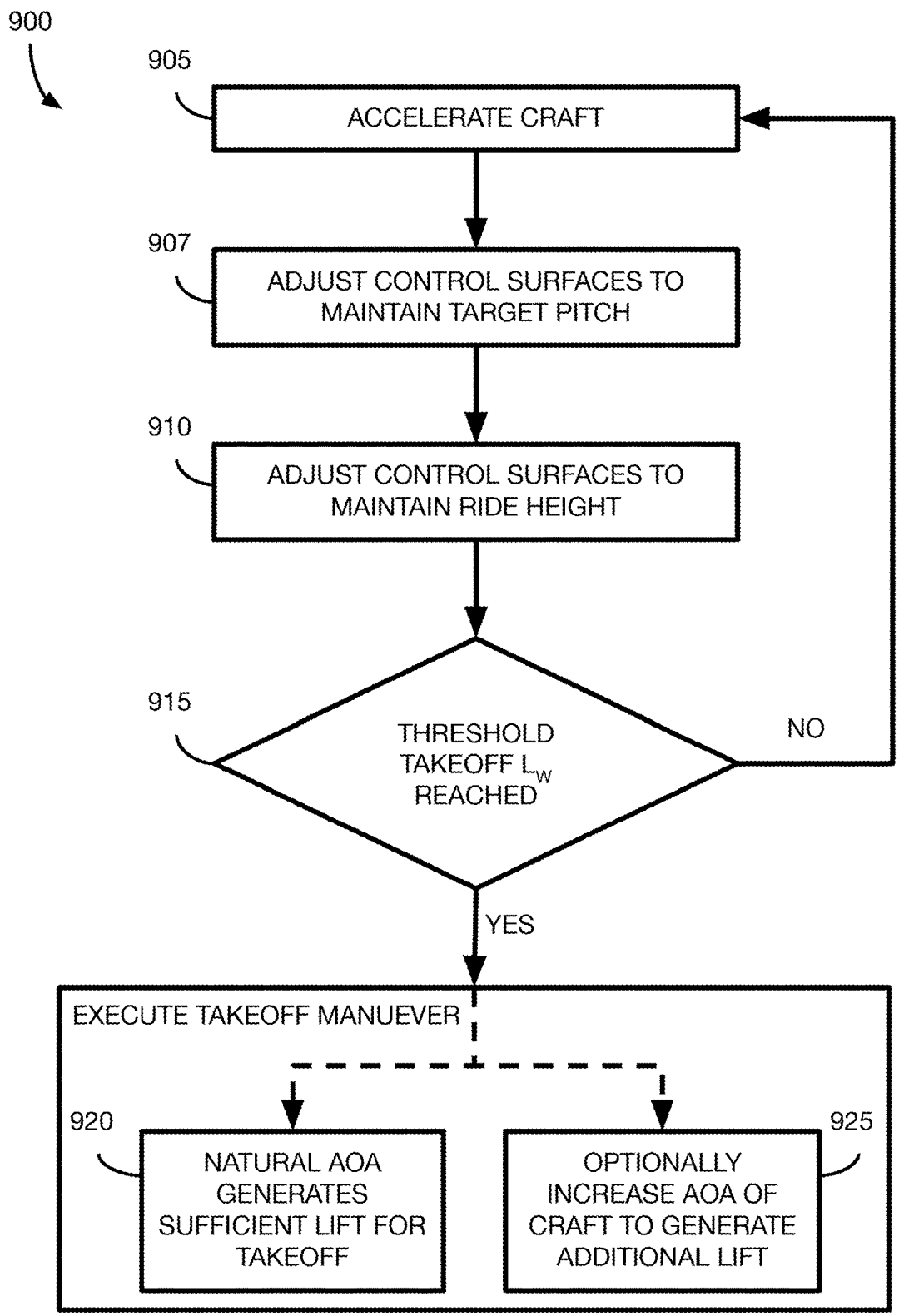
FIG. 9A depicts example operations that facilitate transitioning a craft to a wing-borne mode of operation, in accordance with example embodiments.
Figure 9B:
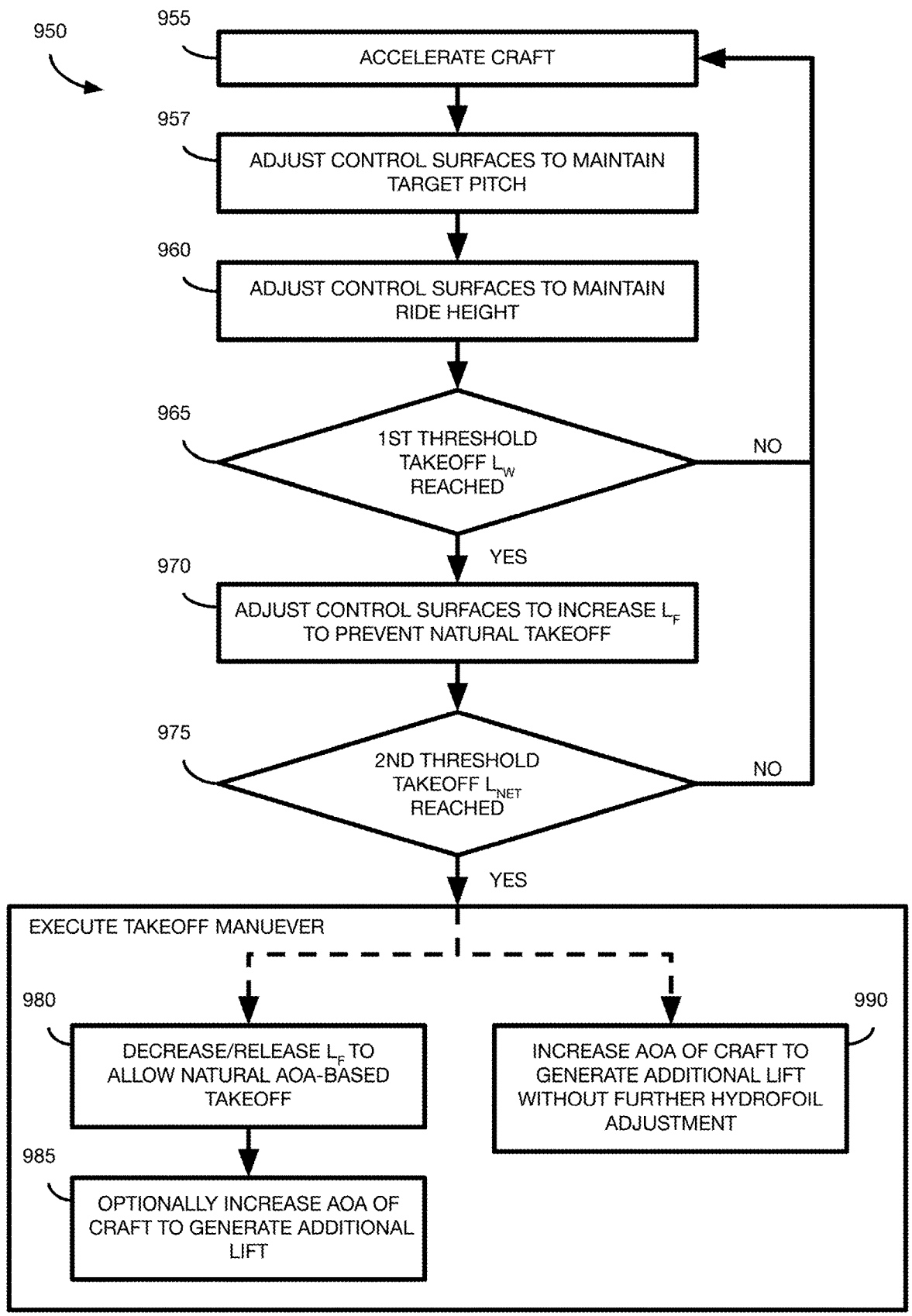
FIG. 9B depicts additional example operations that facilitate transitioning a craft to a wing-borne mode, in accordance with example embodiments.

FIGS. 9A and 9B illustrate examples of operations 900, 950 performed by the craft 100 when operating in the hydrofoil-borne takeoff mode. In some examples, the control system 500 of the craft 100 is configured to control various components of the craft 100 to facilitate performance, by the craft 100, of these operations.

The operations 900 in FIG. 9A facilitate transitioning the craft 100 to a wing-borne mode of operation without "holding" the craft 100 in the water. That is, the overall lift, $L_F$, generated by the hydrofoils 130, 136 tends to remain in the upward/positive direction so that the craft is not "held" in the water past the point at which the craft 100 can take off based on the natural amount of lift generated by the wings of the craft 100, which will lift the craft 100 out of the water due to the net upwards force.

Referring to FIG. 9A, the operations at block 905 involve accelerating the craft 100. For instance, the propulsion system 508 of the craft 100 is controlled to begin to accelerate the craft 100 to a sufficient speed to transition to wing-borne operation.

The operations at block 907 involve adjusting one or more control surfaces of the craft 100 to achieve and maintain a target pitch or angle of attack of the craft 100 for takeoff. In an example, the target pitch is between about 0-5 degrees. In some examples, the pitch of the craft 100 is actively monitored and controlled to maintain the pitch at the target pitch while craft 100 accelerates. In some examples, one or more control surfaces of one or more of the main hydrofoil 130, the rear hydrofoil 136, and the main wing 104 are adjusted relative to one another to maintain the pitch of the craft 100 at the target pitch as the craft 100 accelerates. The pitch target for the craft 100 while riding on the main hydrofoil 130 and the rear hydrofoil 136 can be actively adjusted to increase or decrease the angle of attack of the aero wing, and thus, control the aero lift, $L_W$. In some examples, this is accomplished by adjusting the control surfaces on the main hydrofoil 130 and/or the rear hydrofoil 136 to create the same lift $L_F$ at a different operational angle of attack.

The operations at block 910 involve adjusting one or more control surfaces of the craft 100 to maintain the ride height of the craft 100 while in the hydrofoil-borne mode of operation. For instance, as the craft 100 accelerates through the water, the control system 500 is configured to adjust/maintain the ride height of the craft 100 (e.g., the height of the craft 100 above the water surface) by adjusting the respective position (e.g., deflection angles) of the control surfaces 134, 140 of the main hydrofoil 130 and/or rear hydrofoil 136 and/or the overall angle of attack of the main hydrofoil 130 and/or rear hydrofoil 136, as shown and described above with reference to FIGS. 8A-8G. For example, a control surface 134 of the main hydrofoil 130 can be rotated in the upward direction relative to the direction of travel to decrease the lift, $L_F$, generated by the main hydrofoil 130 and can be rotated in the downward direction relative to the direction of travel to increase the lift, $L_F$, generated by the main hydrofoil 130. Similar operations can be performed by the rear hydrofoil 136.

If at block 915, the aero lift, $L_W$, acting on the craft 100 has not reached a threshold level that is sufficient to allow the craft 100 to become wing-borne and sustain wing-borne flight, the operations repeat from block 905. In some examples, the threshold level corresponds to the weight of the craft 100, $W_{CRAFT}$, or a margin above the weight of the craft 100, $W_{CRAFT}$ (e.g., $W_{CRAFT}$+10% to allow the craft to accelerate upwards away from the water's surface). In some examples, the control system 500 is configured to determine or infer the aero lift, $L_W$, based at least in part on the speed of the craft 100, an angle of attack of the main wing 104, and respective positions of control surfaces (e.g., flaps 118, ailerons 120, elevator, rudder, etc.) of the main wing 104 (and/or the tail wing) of the craft 100, the density of the air etc. In some examples, the control system 500 is configured to determine or infer the aero lift, $L_W$, based at least in part on a sensed load force imparted on one or both of the hydrofoil assemblies 108, 110 (e.g., sensed via one or more load sensors). In some examples, the control system 500 is configured to determine or infer the aero lift, $L_W$, based at least in part on the speed of the craft 100, an angle of attack of the main wing 104, and respective positions of control surfaces (e.g., main foil control surfaces 134) of the main hydrofoil assembly 108 (and/or the rear hydrofoil assembly 110 control surfaces 140) of the craft 100, the density of the water, etc. In some examples, the control system 500 is configured to determine or infer the aero lift, $L_W$, based at least in part on an amount of unlock and/or back-drive current used to drive or maintain the main hydrofoil struts 132 and/or the rear hydrofoil struts 138 in a particular position. For instance, in some examples, an increase in the amount of current to actuators of the main hydrofoil struts 132 and/or the rear hydrofoil struts 138 indicates an increased load imparted on the main hydrofoil struts 132 and/or the rear hydrofoil struts 138. In some examples, the control system 500 computes the aero lift, $L_W$, acting on the craft 100 according to various functions, lookup tables, etc., that relate the aspects to the aero lift, $L_W$.

If the aero lift, $L_W$, acting on the craft 100 has reached the threshold level to become wing-borne and sustain wing-borne flight, then the operations at block 920 are performed. The operations at block 920 involve allowing the craft 100 to naturally take off based on the pitch that was targeted at block 907. That is, the craft 100 can take off without changing the angle of attack/pitch of the craft 100. In some examples, the articulations of the main hydrofoil 130 and/or rear hydrofoil 136 as configured at block 910 to maintain ride height are maintained as the craft 100 takes off. That is, the respective angles of incidence of the main hydrofoil 130 and/or rear hydrofoil 136, deflection angles of the control surfaces 134, 140 of the main hydrofoil 130 and/or rear hydrofoil 136, etc., are not actively or passively adjusted to different positions as the craft 100 takes off from the water.

Alternatively, at block 925, the angle of attack/pitch of the craft 100 can be actively adjusted to generate additional lift. (See block 985 and description thereof.)

The operations 950 in FIG. 9B facilitate transitioning the craft 100 to the wing-borne mode of operation by actively controlling one or more of the main hydrofoil 130 and rear hydrofoil 136 to generate a negative lift, $L_F$, that "holds" the craft 100 within the water until the aero lift, $L_W$, generated by the wings(s) is sufficient for the craft 100 to become wing-borne and sustain wing-borne flight. The operations 950 can be more clearly understood with reference to the graph 700 in FIG. 7B.

Referring to FIG. 9B, the operations performed at blocks 955-960 are generally the same as those operations performed at blocks 905-910 of FIG. 9A. For example, the operations at block 955 involve accelerating the craft 100 towards a takeoff speed (e.g., 45 mph). The operations at block 957 involve adjusting one or more control surfaces of the craft 100 to maintain a target pitch or angle of attack of the craft 100. In an example, the target pitch is between about 0-5 degrees. The operations at block 960 involve maintaining the ride height of the craft 100 during hydrofoil-borne operation while the craft is accelerating during the process of transitioning from hydrofoil-borne operation to wing-borne operation.

The operations at block 965 involve determining whether the aero lift, $L_W$, generated by the main wing 104 (and/or tail wing, hull, etc.) has reached a threshold level that is sufficient to allow the craft 100 to become wing-borne and sustain the wing-borne mode of operation. In some examples, the threshold level corresponds to the weight of the craft 100, $W_{CRAFT}$, or a margin above the weight of the craft 100, $W_{CRAFT}$, (e.g., $W_{CRAFT}$+10% to accommodate passengers and cargo). In some examples, the control system 500 is configured to determine or infer the aero lift, $L_W$, based at least in part on the speed of the craft 100, an angle of attack of the main wing 104, and respective positions of control surfaces (e.g., flaps 118, ailerons 120, elevator, rudder, etc.) of the main wing 104 (and/or the tail wing) of the craft 100, the density of the air etc. In some examples, the control system 500 is configured to determine or infer the aero lift, $L_W$, based at least in part on a sensed load force imparted on one or both of the hydrofoil assemblies 108, 110 (e.g., sensed via one or more load sensors). In some examples, the control system 500 is configured to determine or infer the aero lift, $L_W$, based at least in part on the speed of the craft 100, an angle of attack of the main wing 104, and respective positions of control surfaces (e.g., main foil control surfaces 134) of the main hydrofoil assembly 108 (and/or the rear hydrofoil assembly 110 control surfaces 140) of the craft 100, the density of the water, etc. In some examples, the control system 500 is configured to determine or infer the aero lift, $L_W$, based at least in part on an amount of unlock and/or back-drive current used to drive or maintain the main hydrofoil struts 132 and/or the rear hydrofoil struts 138 in a particular position. For instance, in some examples, an increase in the amount of current to actuators of the main hydrofoil struts 132 and/or the rear hydrofoil struts 138 indicates an increased load imparted on the main hydrofoil struts 132 and/or the rear hydrofoil struts 138. In some examples, the control system 500 computes the aero lift, $L_W$, acting on the craft 100 according to various functions, lookup tables, etc., that relate the aspects to the aero lift, $L_W$.

If at block 965, the aero lift, $L_W$, has not reached the threshold level, the operations continue from block 955. The left side of the graph 700 of FIG. 7B (i.e., left of $C_0$) characterizes the state of the various lift forces acting on the craft 100 during the operations performed above. For example, as the craft 100 accelerates, the hydrofoil lift, $L_F$, generated by one or more of the hydrofoils 130, 136 is positive but is controlled to decrease the hydrofoil lift, $L_F$, to counteract increases in the aero lift, $L_W$, generated by the main wing 104. This results in a net lift, $L_{NET}$, that is sufficient to maintain the desired ride height of the craft 100 during hydrofoil-borne operation.

If at block 965, the aero lift, $L_W$, reaches the first threshold level, the operations at block 970 are performed. The operations at block 970 involve generating or increasing the negative lift, $L_F$, generated by one or more of the main hydrofoil 130 and the rear hydrofoil 136 to prevent the craft 100 from becoming wing-borne due to the main wing 104 and other aerodynamic surfaces. For instance, as noted in block 960, as the craft 100 accelerates through the water while hydrofoil-borne, the control system 500 is configured to adjust/maintain the ride height of the craft 100 (e.g., the height of the craft 100 above the water surface) by adjusting control surface deflections of the control surfaces 134, 140 of the main hydrofoil 130 and/or rear hydrofoil 136 and/or the overall angle of attack of the main hydrofoil 130 and/or rear hydrofoil 136, as shown in FIGS. 8A-8G. As the speed of the craft 100 increases and the aero lift, $L_W$, generated by the wing(s) increases beyond the point required to initially achieve wing-borne flight (e.g., the weight of the craft 100, $W_{CRAFT}$), the control system 500 causes one or more of the main hydrofoil 130 and the rear hydrofoil 136 to generate a force in the downward direction to maintain the proper force balance to maintain the desired ride height. At this stage, the deflection of one or more of the control surfaces 134, 140 of the main hydrofoil 130 and/or the rear hydrofoil 136 and/or the overall angle of attack of the main hydrofoil 130 and/or rear hydrofoil 136 are configured to generate an overall negative lift, $L_F$, that "holds" the hydrofoils 130, 136 in the water, thereby forcing the craft 100 to remain hydrofoil-borne despite the wing(s) generating a lift force greater than the weight of the craft, $W_{CRAFT}$, and thus sufficient lift to achieve wing-borne flight.

The portion of the graph 700 of FIG. 7B between $C_0$ and $C_1$ characterizes the state of the various lift forces acting on the craft 100 during the operations performed in block 970. For example, when the speed of the craft 100 reaches the speed associated with condition $C_0$, the aero lift, $L_W$, generated by the main wing 104 equals the weight of the craft, $W_{CRAFT}$. Therefore, the craft 100 should be able to achieve flight. However, the hydrofoil lift, $L_F$, is controlled to generate a negative lift, $L_F$, such that the net lift, $L_{NET}$, acting on the craft 100 keeps the craft 100 in hydrofoil-borne operation. Thus, the craft 100 is "held" in the water by the negative lift, $L_F$ at the desired ride height.

At block 975, if the aero lift, $L_W$, has not reached the second threshold level, the operations continue from block 955. For example, referring to FIG. 7B, if the aero lift, $L_W$, has not reached the lift associated with condition $C_1$, the operations continue from 955. An example of the second threshold level corresponds to the weight of the craft plus some margin (e.g., $W_{CRAFT}$+10% or some other margin). The aero lift, $L_W$, acting on the craft 100 can be determined or inferred as described above with reference to block 965 and the first threshold level.

In some examples, the determination as to whether the threshold above has been passed is based on whether the speed of the craft is a particular margin higher (e.g., 10% higher or some relative amount higher) than the speed of the craft 100 associated with the first threshold level (e.g., from FIG. 7B, condition $C_1$). In some examples, the determination as to whether the threshold above has been passed is based on the amount of time that has elapsed since the first threshold was passed (e.g., 10 seconds later after the first threshold passed). In some examples, the determination that the second threshold level has been reached is based on an indication from an operator (e.g., the pilot) of the craft 100. That is, the operator can override any other determinations and indicate to the control system 500 whether the second threshold level has or has not been reached.

If at block 975, the aero lift, $L_W$, has reached the second threshold level, final takeoff operations are performed. Some examples of the final takeoff operations include the operations at block 980 and block 985. The operations at block 980 involve decreasing the negative lift, $L_F$, generated by one or more hydrofoils of the craft 100. That is, the "hold" is gradually, passively, or abruptly released. In some examples, this involves actively controlling the deflection angles of one or more of the control surfaces 134, 140 of the main hydrofoil 130 and/or the rear hydrofoil 136 and/or the overall angle of attack of the main hydrofoil 130 and/or rear hydrofoil 136 to gradually decrease the overall negative lift, $L_F$. In some examples, this involves removing all control of the deflection angles of one or more of the control surfaces 134, 140 of the main hydrofoil 130 and/or the rear hydrofoil 136 and/or the overall angle of attack of the main hydrofoil 130 and/or rear hydrofoil 136 to allow these components to passively move to their respective natural states to decrease the overall negative lift, $L_F$. In some embodiments, allowing these hydrofoil components to passively move to their natural states to decrease the overall negative lift includes gradually reducing the power applied to the electric actuators that control the positions of the hydrofoil components.

The portion of the graph 700 of FIG. 7B where to the right of condition $C_1$ characterizes the state of the various lift forces acting on the craft 100 during the operations performed in block 980. For example, when the speed of the craft 100 reaches the speed associated with condition $C_1$, the aero lift, $L_W$, generated by the main wing 104 is more than sufficient to achieve sustained wing-borne flight. As such, the negative lift, $L_F$, generated by one or more of the hydrofoils is gradually (in a controlled manner), naturally/passively, or abruptly (in a controlled manner) reduced to zero such that the net lift, $L_{NET}$, acting on the craft 100 becomes equal to the aero lift, $L_W$, and the craft 100 becomes wing-borne.

Additionally, at block 985, the angle of attack/pitch of the craft 100 can be actively adjusted to generate additional lift. In this regard, in some examples, in addition to (or as an alternative to) gradually, passively, or abruptly releasing the "hold" generated by the one or more hydrofoils of the craft 100, the angle of attack/pitch of the craft 100 can be actively adjusted to generate sufficient lift to overcome the "hold" created by the negative lift, $L_F$, of the hydrofoil to bring the craft 100 airborne. In this regard, in some examples, once the control system 500 determines that the craft 100 has reached the desired takeoff speed or desired main wing lift has been achieved, the control system 500 deploys the flaps 118 (and the ailerons 120 if configured as flaperons), causing the main wing 104 to generate additional lift. In some examples, the control system 500 additionally actuates the rear foil control surfaces 140 and/or the elevators 126 to pitch the craft 100 upward and increase the angle of attack of the main wing 104 and the hydrofoil assemblies 108, 110. In this configuration, the main wing 104 and hydrofoil assemblies 108, 110 create enough lift to accelerate the craft 100 upwards until the hydrofoil assemblies 108, 110 breach the surface of the water and the entire weight of the craft 100 is supported by the lift of the main wing 104.

In some examples, when performing this transition from hydrofoil-borne operation to wing-borne operation, the control system 500 quickly deploys the flaps 118 (and the ailerons 120 if configured as flaperons) over a very short period of time (e.g., in less than 1 second, less than 0.5 seconds, or less than 0.1 seconds). Quickly deploying the flaps 118 (and ailerons 120) in this manner creates even further additional lift on the main wing 104 that helps "pop" the craft 100 out of the water and into wing-borne operation.

Figure 13:
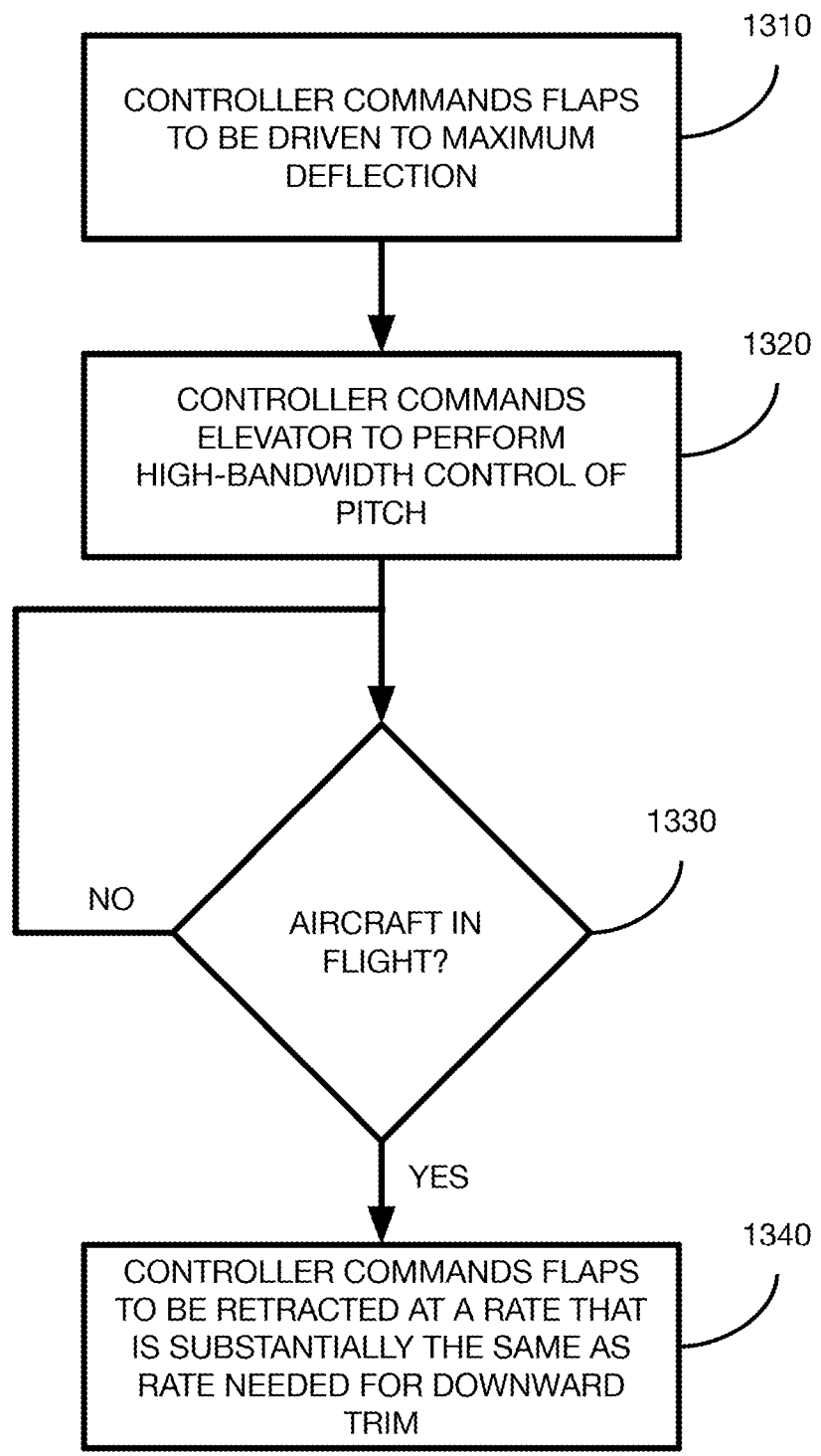
FIG. 13 depicts example operations for controlling a multi-foil tail of a craft, in accordance with example embodiments.

Additionally, in some examples, during the transition from hydrofoil-borne operation to wing-borne operation, the control system 500 actuates various control surfaces (e.g., the elevator 126) of the craft 100 to balance moments along the pitch axis. For instance, the propeller assemblies 116, the flaps 118, and the drag from the hydrofoil assemblies 108, 110 all generate nose-down moments around the center of gravity about the pitch axis during the transition. To counteract these forces, as illustrated in FIG. 13, the control system 500 may deploy the elevator 126, the tail flaps 127, and the rear foil control surfaces 140 to a maximum setting or other setting to generate a nose-up moment and stabilize the craft 100 at block 1310. The control system 500 can perform high-bandwidth control of the elevator 126 for precise pitch control of the craft 100. Likewise, at block 1320, the control system 500 can perform low-bandwidth control of the elevator 126 and/or the tail flaps 127 for increased downforce and increased pitch up moment. As such, in some embodiments, the control actuation speed results in the elevator 126 being useful for pitch stabilization, and the tail flaps 127 being useful for trimming the vehicle.

Alternative examples of the final takeoff operations that do not involve releasing the "hold" described in block 980 are described in block 990.

The operations at block 990 involve maintaining the negative lift, $L_F$, generated by one or more hydrofoils 130, 136 of the craft 100. That is, rather than releasing the "hold" (as described in block 980), the respective articulations of the main hydrofoil 130 and/or the rear hydrofoil 136 (e.g., the deflection angles of the control surfaces 134, 140, the angles of incidence of the main hydrofoil 130 and/or the rear hydrofoil 136, etc.) are maintained. As the craft 100 accelerates, the lift, $L_F$, generated by the hydrofoils 130, 136 reaches a constant/steady downward force that is maintained for the remainder of the takeoff procedure (e.g., the summation of the aero lift, $L_W$, the weight of the craft, $W_{CRAFT}$, and the hydrofoil lift, $L_F$, equal zero). In an example, the "steady" downward hydrofoil lift, $L_F$, is effectively a "maximum" amount of downward hydrofoil lift, $L_F$, that is possible to be applied as a result of the control capabilities of the hydrofoils 130, 136. This conceptually means that the ride height of the craft 100 is maintained up to the point of takeoff. As ride height is maintained and the craft 100 is "held" in the water as speed is increased and aero lift, $L_W$, on the wings is increased, eventually the ability to apply further maintenance/downward hydrofoil lift, $L_F$, is "saturated."

At this stage, continued acceleration of the craft 100 causes a natural increase (e.g., without further articulation of the main wing control surfaces) in the aero lift, $L_W$, and, therefore, the angle of attack of the craft 100. The gradual increasing of the angle of attack of the craft 100 further contributes to the "saturation" of the downward lift, $L_F$. That is, the downward lift, $L_F$, is reduced as the angle of attack of the craft 100 increases.

In some examples, the angle of attack of the craft 100 is actively adjusted to generate additional lift as described above in block 985. The increase in the angle of attack of the craft 100 causes the craft to rise without further increasing the downwards lift, $L_F$, generated by the hydrofoils 130, 136.

FIG. 11 is a table 1100 that summarizes some examples of the procedures described above and in FIGS. 9A and 9B that facilitate foil-borne takeoff operations and the ways in which different components of the craft 100 can be used in these procedures to facilitate foil-borne takeoff operations. All the procedures generally involve maintaining the ride height of the craft 100 using the control surfaces 134, 140 of one or more of the hydrofoils 130, 136 as the craft 100 accelerates (e.g., FIG. 9A, block 907).

In procedure (A), downwards lift, $L_F$, is not introduced using the control surfaces 134, 140 of the hydrofoils 130, 136 or by adjusting the angle of attack of the hydrofoils 130, 136. In this procedure, the speed of the craft 100 is increased using the aero lift, $L_W$, generated by one or more wings of the craft 100 until the aero lift, $L_W$, is greater than the weight, $W_{CRAFT}$, of the craft 100 (e.g., FIG. 9A, block 905-915). At that point, the craft 100 can "naturally" take off without otherwise increasing the angle of attack and/or pitch of the craft 100 because the aero lift, $L_W$, alone is greater than the weight of the craft (e.g., FIG. 9A, block 920).

In procedure (B), downwards lift, $L_F$, is introduced using one or more control surfaces 134, 140 of one or more hydrofoils 130, 136 of the craft, but the angle of attack of the hydrofoils 130, 136 is fixed (e.g., FIG. 9B, block 960). In this procedure, as the craft 100 accelerates, aero lift, $L_W$, is generated by one or more of the wings. When the aero lift, $L_W$, exceeds the weight, $W_{CRAFT}$, of the craft 100, the control surfaces 134, 140 of the hydrofoils 130, 136 are adjusted to introduce a downwards lift, $L_F$, or "extended hold" that holds the hydrofoils 130, 136 in the water (e.g., FIG. 9B, blocks 970-975). In some examples, when the perceived aero lift, $L_W$, generated by the wings reaches a desired threshold (e.g., above "natural" takeoff lift by some margin), the hold on the hydrofoils 130, 136 is "released" by adjusting the control surfaces 134, 140 of the hydrofoils 130, 136 to reduce the downward lift, $L_F$, and takeoff is permitted to proceed (e.g., FIG. 9B, block 980). In some examples, the downwards lift, $L_F$, is not released and instead, as the craft 100 continues to accelerate, the downwards lift, $L_F$, increases to a maximum downwards amount (e.g., a predetermined amount and/or a maximum amount achievable due to the limitations of the control capabilities of the hydrofoils 130, 136). As the aero lift, $L_W$, generated by the wings continues to increase and overcomes this maximum amount of downwards lift, $L_F$, the craft 100 takes off from the water (e.g., FIG. 9B, block 990).

Procedure (C) is similar to procedure (B), except that the pitch of the craft 100 is increased during takeoff to generate additional upwards lift (e.g., FIG. 9B, block 985).

In procedure (D), downwards lift, $L_F$, is introduced using one or more of the control surfaces 134, 140 of one or more of the hydrofoils 130, 136 and by adjusting the angle of attack of one or more of the hydrofoils 130, 136 (e.g., FIG. 9B, block 960). In this procedure, as the craft accelerates, aero lift, $L_W$, is generated by the wings. When the aero lift, $L_W$, exceeds the weight, $W_{CRAFT}$, of the craft 100, one or more of the control surfaces 134, 140 and the angles of attack of one or more of the hydrofoils 130, 136 are adjusted to introduce a downwards lift, $L_F$, that holds the hydrofoils 134, 140 in the water (e.g., FIG. 9B, blocks 970-975). In some examples, the perceived aero lift, $L_W$, generated by the wings reaches a desired threshold (e.g., above "natural" takeoff lift by some margin), the hold on the hydrofoils 130, 136 is passively "released" by allowing the control surfaces 134, 140 of the hydrofoils 130, 136 and the angles of attack of the hydrofoils 130, 136 to passively return to their respective natural positions (e.g., FIG. 9B, block 980). This, in turn, reduces the downward lift, $L_F$, and takeoff is permitted to proceed. The procedure may further involve increasing the pitch of the craft 100 afterward to generate additional upwards lift (e.g., FIG. 9B, block 985). In some examples, the downwards lift, $L_F$, is not released and instead, as the craft 100 continues to accelerate, the downwards lift, $L_F$, increases to a maximum downwards amount (e.g., a predetermined amount and/or a maximum amount achievable due to the limitations of the control capabilities of the hydrofoils 130, 136). As the aero lift, $L_W$, generated by the wings continues to increase and overcomes this maximum amount of downwards lift, $L_F$, the craft 100 takes off from the water (e.g., FIG. 9B, block 990).

Procedure (E) is similar to procedure (D) except that when the perceived aero lift, $L_W$, generated by the wings reaches a desired threshold (e.g., above "natural" takeoff lift by some margin), the hold on the hydrofoils 130, 136 is actively "released" in a controlled manner by controlling the control surfaces 134, 140 of the hydrofoils 130, 136 and the angles of attack of the hydrofoils 130, 136 to gradually or abruptly return to their respective natural positions (e.g., FIG. 9B, block 980).

In some of the procedures above, the downwards lift, $L_F$, that "holds" the craft 100 in the water is released when the aero lift, $L_W$, reaches a particular takeoff threshold. In some other examples, the articulation of the hydrofoils 130, 136 (e.g., the control surfaces 134, 140, respective angles of incidence, etc.) may not be released. In these examples, the amount of downward hydrofoil lift, $L_F$, that can be generated by the hydrofoils 130, 136 eventually saturates (e.g., reaches a maximum amount).

In some examples, continued acceleration of the craft 100 causes a natural increase (e.g., without further articulation of the main wing control surfaces) in aero lift, $L_W$, and, therefore, the angle of attack of the craft 100. The gradual increasing of the angle of attack of the craft 100 contributes to further "saturation" of the downward hydrofoil lift, $L_F$, as the craft takes off from the water. In some examples, the angle of attack of the craft 100 is actively adjusted to generate additional aero lift, $L_W$.

In some examples, when $L_W$ is greater than the weight, $W_{CRAFT}$, of the craft 100, the downward hydrofoil lift, $L_F$, is released by initiating ventilation of one or more of the hydrofoils 130, 136 which creates a loss of downward lift, $L_F$, allowing the craft 100 to take off.

D. Wing-Borne Operation

Figure 10:
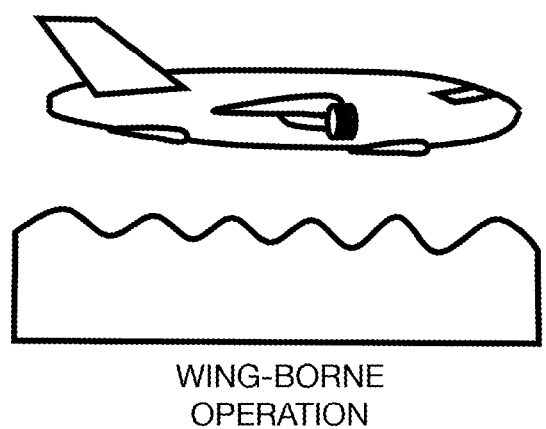
FIG. 10 depicts a craft in a wing-borne mode of operation, in accordance with example embodiments.

FIG. 10 illustrates an example of the craft 100 after becoming wing borne. In some examples, once the transition from hydrofoil-borne operation to wing-borne operation is complete, the control system 500 causes the main hydrofoil deployment system 300 and the rear hydrofoil deployment system 400 to respectively retract the main hydrofoil assembly 108 and the rear hydrofoil assembly 110. In some examples, the control system 500 initiates this retraction as soon as the hydrofoil assemblies 108, 110 are clear of the water to reduce the chance of the hydrofoil assemblies 108, 110 reentering the water. The control system 500 may determine that the hydrofoil assemblies 108, 110 are clear of the water in various ways. For instance, in an example, the control system 500 makes such a determination based on a measured altitude of the craft 100 (e.g., based on data provided by the radar system 516, the lidar system 518, and/or the other sensors 522 described above for measuring an altitude of the craft 100). In another example, the sensors 522 may further include one or more conductivity sensors, temperature sensors, pressure sensors, strain gauge sensors, or load cell sensors arranged on the hydrofoil assemblies 108, 110, and the control system 500 may determine that the hydrofoil assemblies 108, 110 are clear of the water based on data from these sensors.

Once the craft 100 is clear of the water, the control system 500 continues to accelerate the craft 100 to the desired cruise speed by controlling the speed of the propeller systems 116. In some examples, the control system 500 retracts the flap systems when the craft 100 has achieved sufficient airspeed to generate enough lift to sustain altitude without them. In some examples (and still in the acceleration phase) as illustrated at block 1340 of FIG. 13, the tail flaps 127 can be retracted at substantially the same rate one would need application of downward trim. It should be understood that the retraction of the tail flaps 127 can be based on a fixed aircraft speed schedule, the specific loading configuration of the craft 100, and/or in response to a determination of the downward deflection. By way of non-limiting example, it should be understood that in some examples when the elevator 126 is deflected downward, the tail flaps 127 could be retracted to reduce or eliminate the need for downward deflection of the elevator 126, thereby resulting in reduced total drag and increased efficiency.

Additionally, the control system 500 can actuate the various control surfaces of the craft 100 and/or apply differential thrust to the propeller systems 116 to perform any desired maneuvers, such as turning, climbing, or descending, and to provide efficient lift distribution. While in wing-borne mode, the craft 100 can fly both low over the water's surface in ground-effect or above ground-effect depending on operational conditions and considerations.

Figure 14:
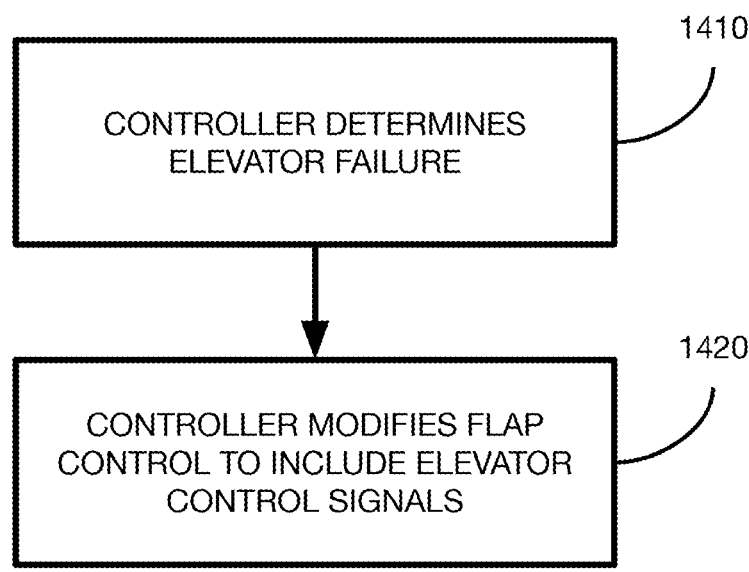
FIG. 14 depicts example operations for controlling a craft in response to an elevator failure, in accordance with example embodiments.

During normal flight (i.e., wing-borne mode), the tail flaps 127 can remain fully retracted to reduce drag and increase efficiency. However, in event the elevator 126 fails, the tail flaps 127 can be extended to maintain pitch stability of the craft 100. That is, in some embodiments as illustrated in FIG. 14, the control system 500 can determine a failure of the elevator 126 at block 1410. This may be determined by the control system 500 using data obtained from one or more motion and/or position sensors associated with the elevator 126. A command can be sent to the elevator actuator to move the elevator 126 a determined distance and/or in a determined direction. Expected positional data is determined by the control system 500 based on the command sent to the elevator actuator. Positional data is received by the control system 500 from the one or more sensors on the elevator 126. The received positional data is compared with the expected positional data to determine if a failure has occurred. If the received positional data is different than the expected positional data by more than a threshold, then the control system 500 determines a failure has occurred with the elevator 126. One example failure is "no output." At block 1420, the control system 500 modifies the flap control signal to include the pitch control signal otherwise sent to the elevator 126. The output typically delivered to the tail flaps 127 is modified sufficiently to achieve the same pitch as would have been achieved by the elevator 126. The tail flaps 127 are used as primary pitch control element to get the craft 100 to safety during failure of the elevator 126.

E. Return to Hull-Borne Operation

To facilitate transitioning from wing-borne to hull-borne mode of operation (See FIG. 6A), the control system 500 determines that the hydrofoil assemblies 108, 110 are fully retracted so that the craft 100 may safely land on its hull 102. In some examples, the control system 500 additionally determines and suggests the desired landing direction and/or location based on observed, estimated, or expected water surface conditions (e.g., based on data from the radar system 516, the lidar system 518, the imaging system 520, or other sensors 522).

The control system 500 initiates deceleration of the craft 100, for instance, by reducing the speeds of the propeller systems 116 until the craft 100 reaches a desired landing airspeed. During the deceleration, the control system 500 may deploy the flaps 118 to increase lift at low airspeeds and/or to reduce the stall speed, and may further deploy the tail flaps 127 to provide increased pitch authority. In some embodiments, as deceleration continues (or during any phase of flight), the control system 500 can extend the tail flaps 127 as necessary to keep or maintain the elevator 126 minimally loaded. In some embodiments, if the rate of extension or deployment of the tail flaps 127 is sufficiently high, the elevator 126 is not required to maintain a sustained aerodynamic load or torque and, therefore, can be designed to be smaller and/or lighter and potentially require less vehicle power. Once the craft 100 reaches the desired landing airspeed (e.g., approximately 50 knots), the control system 500 reduces the descent rate (e.g., to be less than approximately 200 ft/min). As the craft 100 approaches the surface of the water (e.g., once the control system 500 determines that the craft 100 is within 5 feet of the water surface), the control system 500 further slows the descent rate to cushion the landing (e.g., to be less than approximately 50 ft/min). As the hull 102 of the craft 100 impacts the surface of the water, the control system 500 reduces thrust, and the craft 100 rapidly decelerates due to the presence of hydrodynamic drag, the reduction in forward thrust, and the reduction or elimination of blowing air over the wing which significantly reduces lift causing the vehicle to settle into the water. The hull 102 settles into the water as the speed is further reduced until the craft 100 is stationary.

In some examples, after the craft 100 is settled in the water, the craft 100 is transitioned back to hydrofoil-borne maneuvering mode (See FIG. 6B) by extending the hydrofoil assemblies 108, 110 to transition from hull-borne operation to hydrofoil-borne operation in the same manner as described above. In some examples, the control system 500 then sustains the hydrofoil-borne mode and maneuvers the craft 100 into port while keeping the hull 102 insulated from surface waves. The control system 500 then reduces the thrust generated by the propeller assemblies 116 to lower the speed of the craft 100 until the hull 102 settles into the water, thereby transitioning that craft back to hull-borne operation. The control system 500 then retracts the hydrofoil assemblies 108, 110 and performs the hull-borne operations described above to maneuver the craft 100 into a dock for disembarking passengers or goods and recharging the battery system 200.

IV. Example Control Operations

Figure 12:
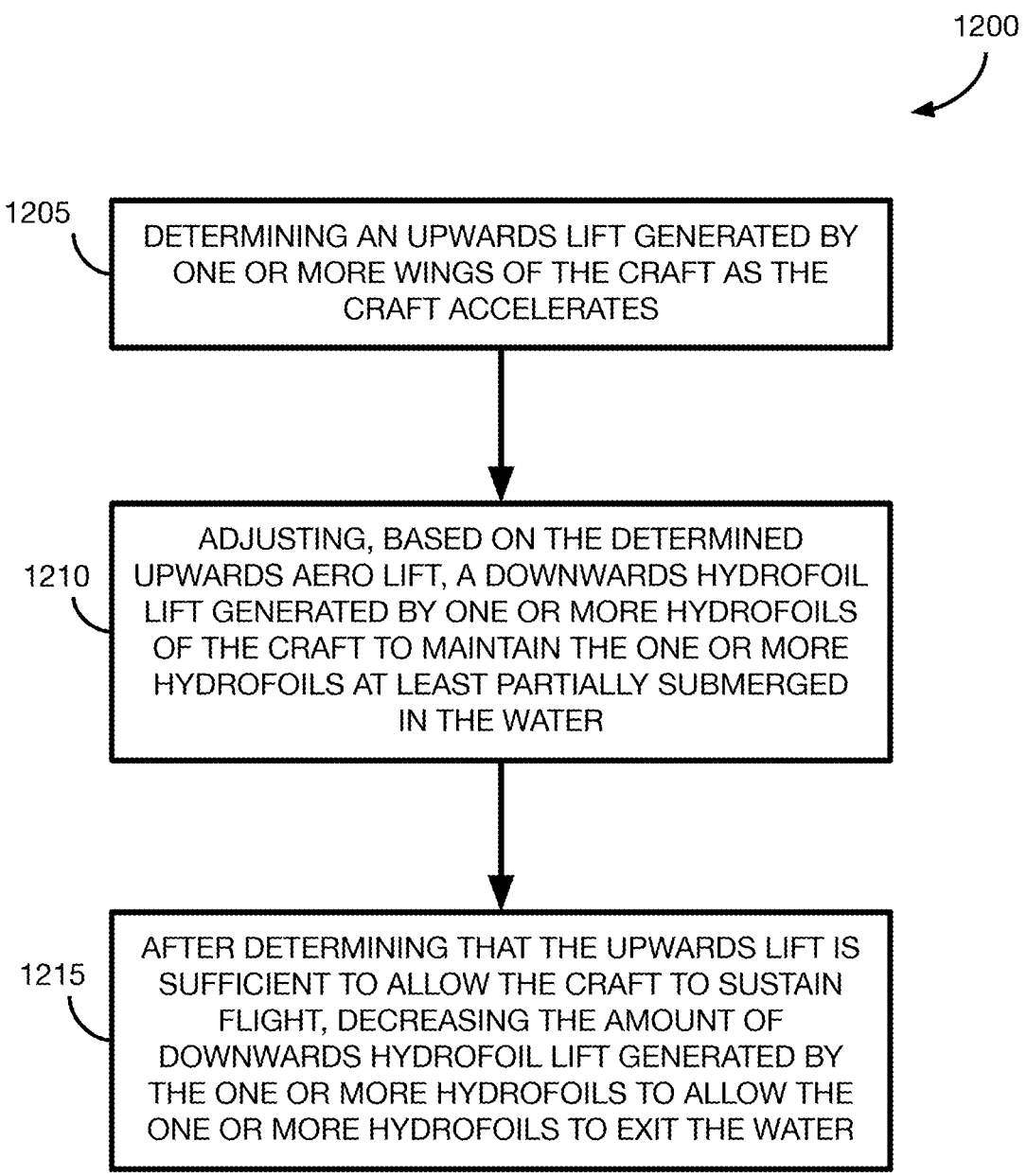
FIG. 12 depicts example operations performed by a craft, in accordance with example embodiments.

FIG. 12 illustrates examples of operations 1200 that facilitate operating a craft 100 according to some embodiments, including operating the craft 100 to facilitate transitioning from hydrofoil-borne to wing-borne modes. In some embodiments, a control system of the craft (e.g., control system 500) performs one or more of the functions shown in FIG. 12.

The operations at block 1205 involve determining upwards aero lift (FIG. 7A, $L_W$), generated by one or more wings 104 of the craft 100 as the craft 100 accelerates over the water while the craft 100 is in hydrofoil-borne operation. (See also FIG. 9B, block 965 and description thereof).

The operations at block 1210 involve adjusting, based on the determined upwards aero lift, $L_W$, downwards hydrofoil lift (FIG. 7A, $L_F$) generated by one or more hydrofoils 130, 136 of the craft 100 to maintain the one or more hydrofoils 130, 136 at least partially submerged in the water, thereby causing the craft 100 to remain in a hydrofoil-borne maneuvering mode of operation (FIG. 6B) despite upwards aero lift, $L_W$, generated by the wing(s) 104 that would otherwise cause the hydrofoil(s) 130, 136 to breach the surface of the water and the craft 100 to become wing-borne. (See also FIG. 9B, block 970; FIG. 11, procedures B-E; and description thereof).

The operations at block 1115 involve, after determining that the upwards aero lift, $L_W$, generated by the wing(s) 104 is sufficient to allow the craft 100 to sustain flight, decreasing the amount of downwards hydrofoil lift, $L_F$, generated by the hydrofoil(s) 130, 136 to allow the hydrofoil(s) 130, 136 to exit the water. (See also FIG. 9B, block 975; FIG. 11, procedures B-E; and description thereof).

In some examples, adjusting the downwards hydrofoil lift, $L_F$, generated by the hydrofoil(s) 130, 136 involves adjusting the downwards hydrofoil lift, $L_F$, generated by the hydrofoil(s) 130, 136 to both (i) allow the hull of the craft 100 to lift above the water as the craft 100 accelerates and (ii) maintain the hydrofoil(s) 130, 136 at least partially submerged in the water, thereby causing the craft 100 to remain in the hydrofoil-borne maneuvering mode of operation. (See also FIG. 9B, block 960; FIG. 11, procedures B-E; and description thereof).

In some examples, adjusting the downwards hydrofoil lift, $L_F$, generated by the hydrofoil(s) 130, 136 involves increasing the downwards hydrofoil lift, $L_F$, generated by the hydrofoil(s) 130, 136 in proportion to an increase in the upwards aero lift, $L_W$, generated by the wing(s) 104. (See also FIG. 9B, block 970; FIG. 11, procedures B-E; and description thereof).

In some examples, adjusting the downwards hydrofoil lift, $L_F$, generated by the hydrofoil(s) 130, 136 involves increasing the downwards hydrofoil lift, $L_F$, generated by the hydrofoil(s) 130, 136 to maintain a ride height of the craft 100.

In some examples, determining the upwards aero lift, $L_W$, generated by the wing(s) 104 involves determining a speed of the craft 100 and determining the upwards aero lift, $L_W$, generated by the wing(s) 104 based at least in part on the determined speed of the craft 100. (See also FIG. 9B, blocks 965 and 975; FIG. 11, procedures B-E; and description thereof).

In some examples, determining the upwards aero lift, $L_W$, generated by the wing(s) 104 involves determining an angle of attack of the wing(s) 104 and determining the upwards aero lift, $L_W$, generated by the wing(s) based at least in part on an angle of attack of the wing(s) 104. (See also FIG. 9B, blocks 965 and 975 and description thereof).

In some examples, determining the upwards aero lift, $L_W$, generated by the wing(s) 104 involves determining the angle of attack of one or more hydrofoils 130, 136, respective deflections of one or more control surfaces 134, 140 of the one or more hydrofoils 130, 136, a water speed of the craft 100, and a density of water in which the craft 100 is moving.

In some examples, determining the upwards aero lift, $L_W$, generated by the wing(s) 104 involves determining a sensed load force on the hydrofoil(s) 130, 136 and determining the upwards aero lift, $L_W$, generated by the wing(s) 104 based at least in part on a sensed load force on the hydrofoil(s) 130, 136. (See also FIG. 9B, blocks 965 and 975 and description thereof).

In some examples, one or more of the hydrofoils 130, 136 comprise one or more flaperons and/or ailerons and/or elevators. In some of these examples, adjusting the downwards hydrofoil lift, $L_F$, generated by the hydrofoil(s) 130, 136 involves adjusting the respective deflections of the one or more flaperons and/or ailerons and/or elevators to thereby control the downwards hydrofoil lift, $L_F$, generated by the hydrofoil(s) 130, 136. (See also FIG. 9B, block 970; FIG. 11, procedures B-E; and description thereof).

In some examples, one or more of the hydrofoils 130, 136 are moveable. Some of these examples involve extending the hydrofoil(s) 130, 136 below the hull of the craft 100 for submersion in the water and at least partially retracting the hydrofoil(s) 130, 136 into the hull of the craft 100 after the craft is wing-borne. (See FIG. 10 and description thereof).

In some examples, respective angles of incidences of the one or more of the hydrofoils 130, 136 are adjustable. (See FIGS. 8D-8G and description thereof).

In some examples, adjusting the downwards hydrofoil lift, $L_F$, generated by the hydrofoil(s) 130, 136 involves adjusting an angle at which the hydrofoil(s) 130, 136 extends below the hull to thereby control the downwards hydrofoil lift, $L_F$, generated by the hydrofoil(s) 130, 136. (See also FIG. 9B, block 970; FIG. 11, procedures D-E; and description thereof).

V. Example Wave State Analysis

As noted above, the control system 500 may include various sensor systems for controlling operation of the craft 100, such as sensors in the GNSS system 512, the INS system 514, the radar system 516, the lidar system 518, the imaging system 520, and/or other sensors 522. Detailed examples of specific sensors that may be included in one or more of the above sensor systems are explained in further detail below. These sensors may be configured to generate various sensor data indicative of characteristics of the water surface below the craft 100, and the control system 500 may use this sensor data as a basis for controlling operation of the craft 100.

A. Focal Length Image Sensors

The craft 100 may include one or more focal length image sensors configured to measure a distance between the craft 100 and a surface of the body of water beneath the craft 100. The focal length image sensors may have an adjustable focal length and may measure the distance between the craft 100 and the surface of the body of water by adjusting the sensor focal length until the image is brought into focus, such that the focal length of the sensor matches the distance between the sensor and the water surface. As such, the control system 500 may determine the distance between the sensor and the water surface to be equal to the value of the focal length of the image sensor once the image sensor is brought into focus.

Each focal length image sensor may include a multi-pixel camera sensor configured to adjust its focal length using any currently known autofocus techniques, such as, for example, phase detection (PD) autofocus techniques, contrast detection (CD) autofocus techniques, or a hybrid of PD and CD techniques. When using any of these autofocus techniques, adjusting the focal length of the sensor to focus the image captured by the sensor may involve focus hunting in which the sensor starts with an initial focal length and then repeatedly adjusts the focal length, either in a sweeping or stepping manner, until the autofocus is achieved. For instance, when using PD autofocus techniques, a feedback loop may adjust the optical focal length about an initial guess and converge on the true focal length (i.e., the focal length that results in a focused image), which involves under-stepping and over-stepping the true focal length. Further, when using CD autofocus techniques, the focal length may be swept from one extrema towards the other, stopping once a maximum contrast is reached between neighboring pixels.

When using PD or CD autofocus techniques, the focus hunting described above may be relatively time-consuming, especially when the starting focal length is far from the true focal length. As a result, existing PD or CD autofocus techniques may not be suitable for measuring distances based on the focal length in the manner described above when the distances are rapidly changing. For instance, the present disclosure contemplates using the focal length image sensors to determine the distance between a water surface and a vehicle (e.g., the craft 100) in motion over the water surface. In such a configuration, the speed of the vehicle and the magnitude and frequency of the waves at the water surface may cause the distance between the vehicle and the water surface to rapidly change. Accordingly, existing PD and CD autofocus techniques may not be capable of resolving this distance faster than the distance changes, thereby rendering such existing techniques unsuitable for this measurement.

To help address these issues, the technology disclosed herein uses prior distance measurements and/or distance measurements from one or more other sensors to intelligently predict an estimated value of the distance between the vehicle and the water surface. The focal length image sensors may then use this estimated value of the distance as the initial value of the focal length of the image sensors. Performing PD, CD, or a hybrid PD/CD autofocus technique starting from this initial value may drastically reduce the time it takes to resolve the true focal length and, therefore, determine the actual current distance between the vehicle and the water surface.

Figure 15:
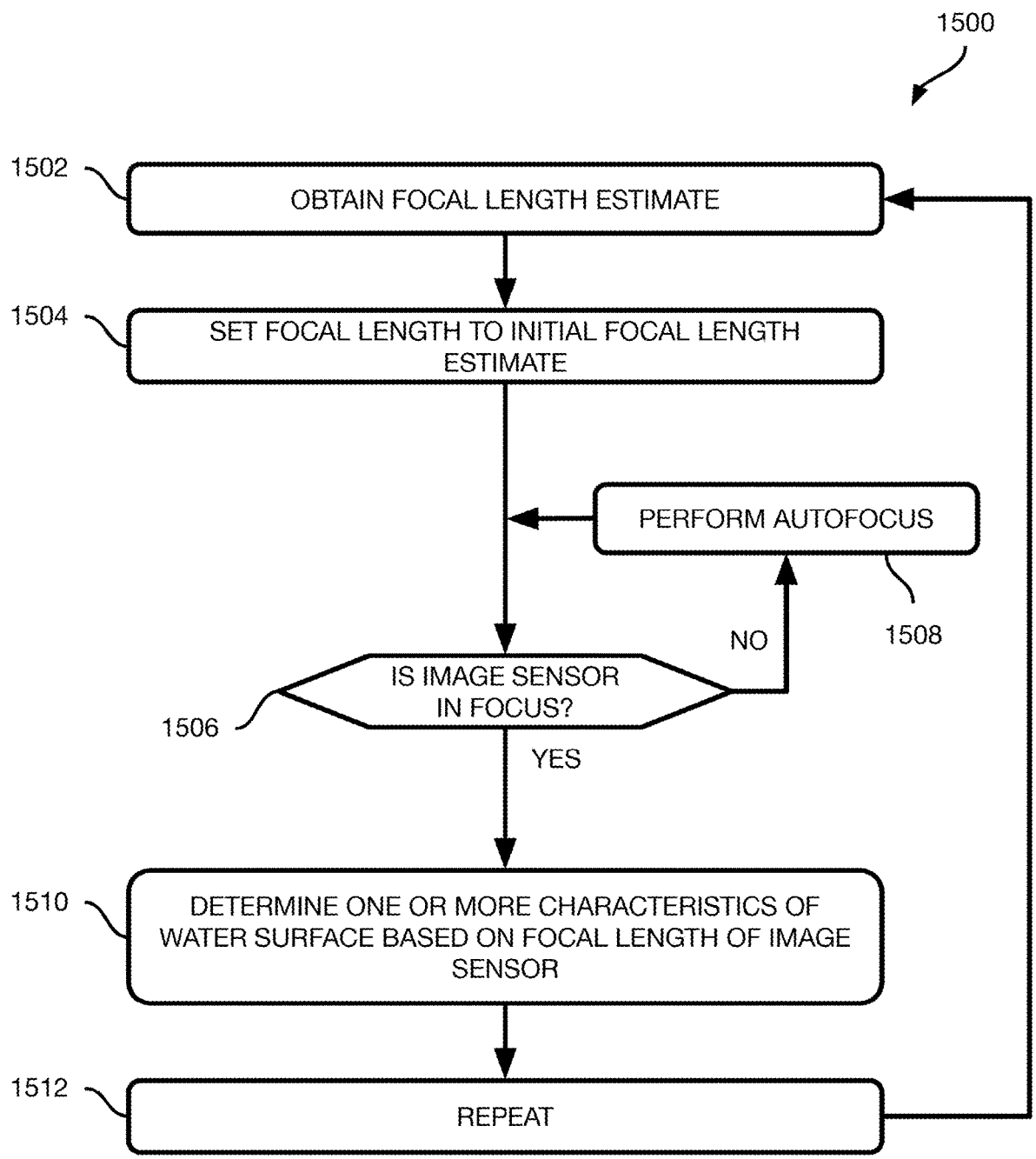
FIG. 15 depicts example operations for using adjustable focal length image sensors to determine various characteristics of a water surface beneath a vehicle in motion, in accordance with example embodiments.

FIG. 15 depicts a flowchart 1500 of example operations that may be carried out in connection with each of the focal length image sensors in order to determine various characteristics of the surface of a body of water, including the slope or shape of the water surface and/or the distance between the water surface and a vehicle (e.g., the craft 100) in motion over the water surface. The example operations will be discussed with reference to a control system that may carry out the example operations. In this regard, the control system may be similar to or the same as the control system 500 of FIG. 5. The flowchart 1500 may include one or more operations, functions, or actions as illustrated by one or more of blocks 1502-1512. Although blocks 1502-1512 are illustrated in sequential order, these blocks may also be performed in parallel, and/or in a different order than those described herein, where possible. Also, the various blocks may be combined into fewer blocks, divided into additional blocks, and/or removed based upon the desired implementation.

In addition, for the flowchart 1500 and other processes and methods disclosed herein, including those depicted by flowcharts 1600, 1700, and 1900 described below in connection with FIGS. 16, 17, and 19, each flowchart shows functionality and operation of one possible implementation of present examples. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the flowcharts disclosed herein, each block shown may represent circuitry that is wired to perform the specific logical functions in the process.

Turning now to the operations of flowchart 1500, at block 1502, the control system may obtain an initial focal length estimate. During the first execution of the operations in flowchart 1500, the control system may obtain the initial focal length estimate based solely on sensor data from sensors that are different from the focal length image sensors. For example, the control system may obtain sensor data from one or more IMUs indicating positional information of the vehicle, such as an altitude of the vehicle, and the control system may determine the initial focal length estimate to be equal to the altitude of the vehicle. In other examples, the control system may obtain sensor data from various other sensors as well, such as any of the distance measuring sensors described herein, and use the distance measurements from those sensors as the initial focal length estimate.

Alternatively, in some examples, the control system may cause the focal length image sensors to perform functions similar to traditional autofocusing techniques during the first execution of the operations in flowchart 1500. For example, the control system may cause the focal length image sensors to choose a random, pseudorandom, or otherwise predetermined initial focal length value. Starting from this initial focal length value, the control system may then cause the focal length image sensors to iteratively adjust the focal length value using traditional autofocus techniques until the image captured by the focal length image sensor is focused. The control system may then treat this adjusted focal length value as the initial focal length estimate.

During second and subsequent execution of the operations in the flowchart 1500, the control system will have access to previous distance measurements determined using the focal length image sensors as well as previous distance measurements determined using any of the other measurement techniques described herein, and the control system may additionally or alternatively use one or more of these previous measurements, such as one or more of the most recent distance measurements, to determine the initial focal length estimate. For instance, the control system may use a set of recent distance measurements to determine a slope or shape of the water surface, such as by fitting a curve to the distance measurements. Then, based on the altitude of the vehicle as determined by the IMU and the determined slope and/or shape of the water surface, the control system may estimate the distance between the vehicle and the water surface and use the estimated distance as the initial focal length estimate.

At block 1504, the control system may set the focal length of the focal length image sensor to be equal to the initial focal length estimate. Setting the focal length may involve moving a lens of the image sensor, such as by controlling one or more servo motors coupled to the lens and causing the lens to move closer to or farther from a sensor array.

At block 1506, the control system may determine whether the image sensor is in focus. In line with the discussion above, the control system may make this determination using any currently known or later developed autofocus techniques, such as, for example, using a PD technique, a CD technique, or a hybrid PD/CD technique. When using a PD technique, this may involve capturing two separate images using light that passes through the lens of the image sensor and comparing the images to determine a phase difference indicative of how focused the image is. When using a CD technique, this may involve determining an amount of contrast between adjacent pixels in the image.

If the control system determines that the image sensor is still out of focus, then the flowchart 1500 advances to block 1508 where the control system attempts to autofocus the image, such as, for example, by using a PD, CD, or hybrid PD/CD technique. When using a PD technique, this may involve moving the lens of the image sensor a particular distance that is determined based on the determined phase difference between the compared images at block 1506. When using a CD technique, this may involve incrementally moving the lens a predefined distance in a predefined direction. The predefined direction may be a fixed direction, a randomly chosen direction, or a direction chosen based on a rate of change of the distance measurement. For instance, previous distance measurements may be compared to determine a rate of change of the distance measurement, which may correspond with a slope of the water surface. The control system may use the rate of change of the distance measurement to estimate a current distance between the image sensor and the water surface and/or to forecast a future distance between the image sensor and the water surface. Based on the estimated current distance or forecasted future distances, the control system may move the lens of the image sensor in a particular direction that causes the focal length of the image sensor to approach the estimated current distance or forecasted future distance.

After attempting to autofocus the image, the flowchart 1500 returns to block 1506 where the control system reevaluates whether the image sensor is in focus. When using a CD technique, the control system may need to repeatedly reposition the lens and evaluate the contrast of the image until peak contrast is reached and the image sensor is in focus.

Once the control system determines that the image sensor is in focus, then the flowchart 1500 advances to block 1510 where the control system determines one or more characteristics of the water surface based on the focal length of the image sensor. In some examples, the determined characteristics of the water surface may include a distance between the vehicle and the water surface, which the control system may determine to be the focal length of the image sensor once the image sensor has been focused at block 1506.

The determined characteristics of the water surface may additionally include a slope, curvature, and/or shape of the water surface. For instance, as explained below in connection with block 1512, the control system may repeatedly perform the process depicted in flowchart 1500, thereby generating a data set defining multiple distances between the vehicle and the water surface over time. The frequency at which the control system repeatedly performs the process depicted in flowchart 1500 may depend on the wave period of the water surface that the control system is attempting to resolve as well as the desired resolution of the measured characteristics of the water surface. For example, at a bare minimum, the control system may perform the process at a frequency corresponding to the Nyquist rate for the water surface (i.e., twice the frequency at which the craft 100 encounters waves while traveling over the water surface), but the control system may perform the process at a higher frequency to improve the resolution of the measured characteristics. In some examples, this frequency may be a predefined frequency or may be set based on previous measurements and/or forecasted characteristics of the water surface. For instance, if previous distance measurements and/or forecasted distance measurements based on the previous distance measurements indicate that the frequency of the waves is increasing, then the control system may increase the rate at which it performs the process depicted in flowchart 1500. Conversely, if previous distance measurements and/or forecasted distance measurements based on the previous distance measurements indicate that the frequency of the waves is decreasing, then the control system may decrease the rate at which it performs the process depicted in flowchart 1500.

When performing the process depicted in flowchart 1500, the control system may determine the slope, curvature, and/or shape of the water surface based on differences between the measured distances over time and the changes in vertical and horizontal position of the vehicle based on positional data from the vehicle's IMU. Examples of such shape data may include locations of wave crests on the water surface, locations of wave troughs on the water surface, an instantaneous or time-averaged height of the waves on the water surface, an instantaneous or time-averaged amplitude of the waves on the water surface, and/or a frequency or period of waves on the water surface based on the distances measured over time.

Further, the vehicle may include an array of focal length image sensors distributed across the underside of the vehicle, such as along the length of the vehicle's hull and/or the width of the vehicle's wingspan. With such an array of image sensors, the control system may perform the process depicted in flowchart 1500 to determine the slope, curvature, and/or shape of the water surface along multiple axes corresponding to the axes of the sensor array.

At block 1512, the control system returns to the beginning of the flowchart 1500 to repeat the operations all over again. In this manner, the control system iteratively performs the operations of flowchart 1500 to repeatedly and/or continually determine the characteristics of the wave surface using the focal length image sensors.

B. Time-of-Flight Sensors

The craft 100 may include one or more time-of-flight (TOF) sensors configured to measure a distance between the craft 100 and a surface of the body of water beneath the craft 100. The TOF sensors may take various forms, an example of which may include lidar sensors. The TOF sensors may be arranged in an array for imaging an area of the water surface, with each sensor in the array configured to measure a distance to each pixel in the imaged area. An example of such a sensor array is a photonic mixer device (PMD), such as the PMD described in Ringbeck et al., "A 3D Time of Flight Camera for Object Detection," Optical 3-D Measurement Techniques (2007). In a PMD, instead of scanning a single laser beam over an entire surface area to obtain the distance measurements of the area, the PMD illuminates the entire area with modulated light and observes the reflected light with an intelligent pixel array. Each pixel in the array can individually measure the turnaround time of the modulated light by using continuous modulation and measuring the phase delay in each pixel.

Figure 16:
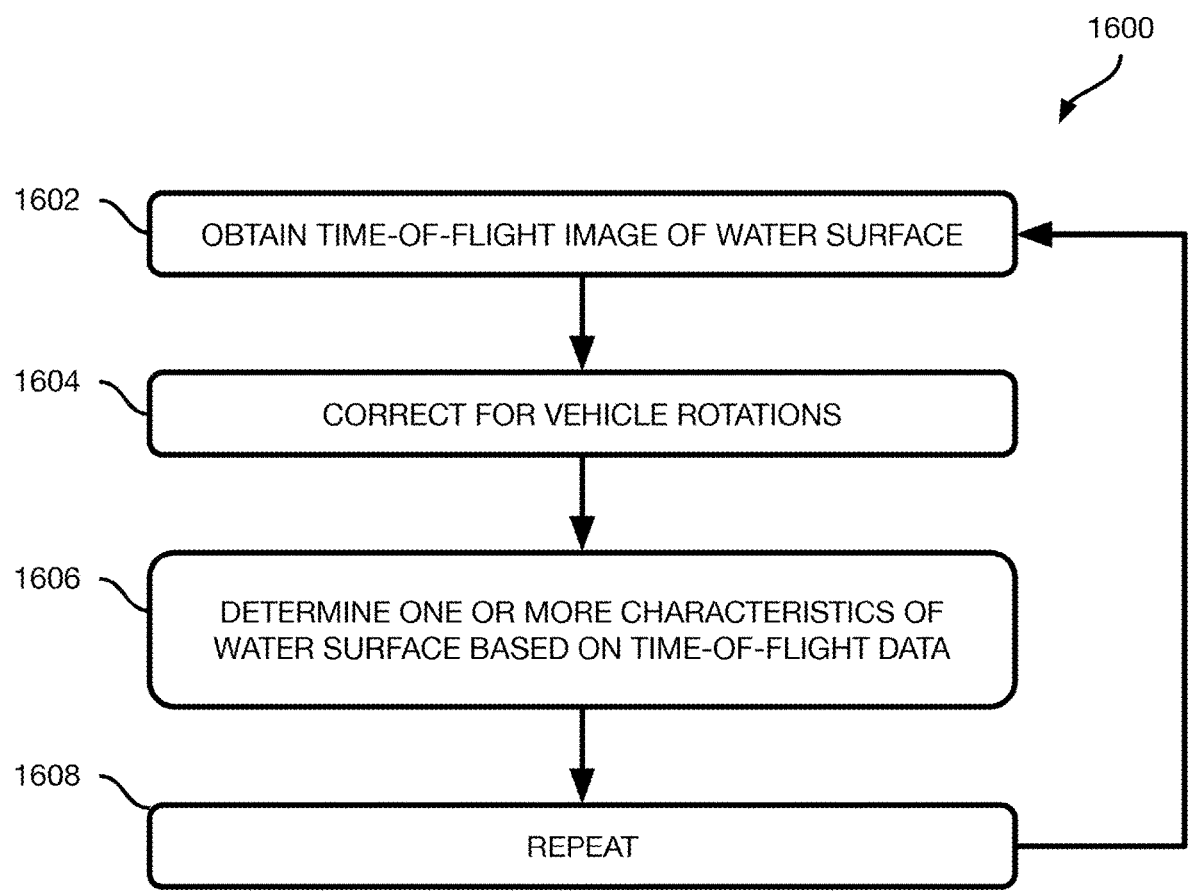
FIG. 16 depicts example operations for using time-of-flight image sensors to determine various characteristics of a water surface beneath a vehicle in motion, in accordance with example embodiments.

FIG. 16 depicts a flowchart 1600 of example operations that may be carried out in connection with each of the TOF sensors in order to determine various characteristics of the surface of a body of water, including the slope or shape of the water surface and/or the distance between the water surface and a vehicle (e.g., the craft 100) in motion over the water surface. The example operations will be discussed with reference to a control system that may carry out the example operations. In this regard, the control system may be similar to or the same as the control system 500 of FIG. 5. The flowchart 1600 may include one or more operations, functions, or actions as illustrated by one or more of blocks 1602-1608. Although blocks 1602-1608 are illustrated in sequential order, these blocks may also be performed in parallel, and/or in a different order than those described herein, where possible. Also, the various blocks may be combined into fewer blocks, divided into additional blocks, and/or removed based upon the desired implementation.

Turning now to the operations of flowchart 1600, at block 1602, the control system may obtain a TOF image of the water surface, such as by using one or more PMDs. In line with the discussion above, the TOF image may identify a distance between the PMD sensor array and a plurality of points on the water surface corresponding to each pixel in the TOF image.

At block 1604, the control system may adjust the distance measurements identified by the TOF image to correct for one or more rotations of the vehicle (e.g., roll, pitch, or yaw). In order for the TOF image to provide distance measurements that directly correspond to the height of the vehicle above the water surface, the sensor array should be substantially horizontal. Any rotations of the vehicle may likewise rotate the sensor array out of the horizontal plane, and the control system may apply one or more transformations to the TOF measurements to account for such rotations. For instance, the vehicle may include an IMU configured to measure the position and orientation of the vehicle, as noted above, and the control system may determine the extent of rotation of the vehicle about the roll, pitch, or yaw axes based on data from the IMU. The control system may then apply the appropriate transformation to the TOF measurements to compensate for the determined rotations of the vehicle.

At block 1606, the control system may determine one or more characteristics of the water surface based on the corrected distance measurements from the TOF image. In some examples, the determined characteristics of the water surface may include a distance between the vehicle and the water surface, which the control system may determine by performing a statistical analysis to the distance measurements, such as, for example, by averaging the distance measurements across all pixels.

The determined characteristics of the water surface may additionally include a slope, curvature, and/or shape of the water surface. For instance, the control system may determine a local slope, curvature, and/or shape of the water surface from a single TOF image based on differences between the TOF measurements of two pixels in the TOF image (corresponding to a change in height of the water surface between the two pixels) and the horizontal distance between the two pixels. Further, in some examples, determining the shape of the water surface may involve determining the gradient of the TOF image. For instance, the control system may determine an approximation of the gradient at each pixel of the TOF image using the distance measurements of two or more pixels of the TOF image. However, these are just some examples of ways in which the control system may determine the slope, curvature, and/or shape of the water surface, and the control system may additionally or alternatively apply any other mathematical or statistical analyses to the TOF measurements that would indicate the shape of the water surface.

Further, as explained below in connection with block 1608, the control system may repeatedly perform the process depicted in flowchart 1600, thereby generating a data set defining the distances between the vehicle and the water surface over time. The control system may determine the slope, curvature, and/or shape of the water surface based on differences between the measured distances over time and/or space and the changes in vertical and horizontal position of the vehicle based on positional data from the vehicle's IMU or other spatial position and orientation sensors. Examples of such shape data may include locations of wave crests on the water surface, locations of wave troughs on the water surface, an instantaneous or time-averaged height of the waves on the water surface, an instantaneous or time-averaged amplitude of the waves on the water surface, and/or a frequency or period of waves on the water surface based on the distances measured over time.

Still further, the vehicle may include TOF sensor arrays distributed across the underside of the vehicle, such as along the length of the vehicle's hull and/or the width of the vehicle's wingspan. With multiple arrays of TOF sensors, the control system may determine the slope, curvature, and/or shape of the water surface over larger areas monitored by the multiple arrays of TOF sensors and/or may do so more accurately.

At block 1608, the control system returns to the beginning of the flowchart 1600 to repeat the operations all over again. In this manner, the control system iteratively performs the operations of flowchart 1600 to repeatedly and/or continually determine the characteristics of the wave surface using the TOF sensors.

C. Wing Deflection Sensors

The craft 100 may include one or more wing deflection sensors configured to measure various characteristics of a surface of the body of water beneath the craft 100. As used herein, the term "wing deflection" may refer to any deflection of the wing from its unloaded configuration, or from some other nominal configuration, as well as any deformation of the wing from its unloaded or nominal configuration due to aerodynamic and/or hydrodynamic loading. The wing deflection sensors may take various forms and may include any sensor capable of measuring deflections of one or more wings of the craft 100. Examples of such sensors may include: (i) strain gauges configured to measure the strain of the wings when the wings are deflected in an upward or downward direction, (ii) optical backscatter reflectometers configured to measure the deflections or bends in optical fibers run across the spans of the wings, or (iii) fiber Bragg gratings configured to measure the deflections or bends in optical fibers run across the spans of the wings. However, these examples are merely illustrative, and various other sensors capable of measuring wing deflection may be used in other examples.

Figure 17:
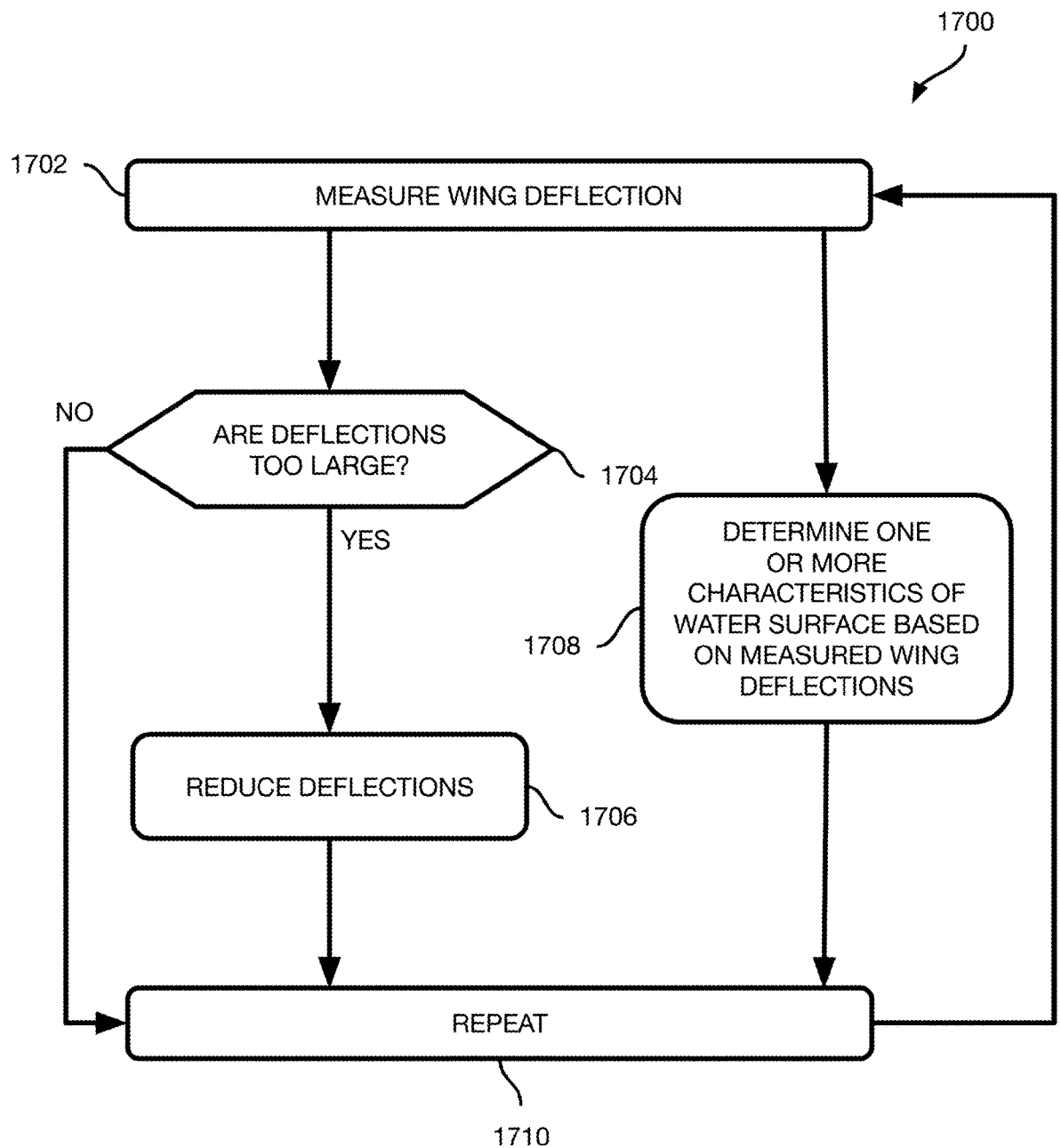
FIG. 17 depicts example operations for using wing deflection sensors to determine various characteristics of a water surface beneath a vehicle in motion, in accordance with example embodiments.

FIG. 17 depicts a flowchart 1700 of example operations that may be carried out in connection with the wing deflection sensors in order to determine various characteristics of the surface of a body of water beneath a vehicle (e.g., the craft 100) in motion over the water surface. The example operations will be discussed with reference to a control system that may carry out the example operations. In this regard, the control system may be similar to or the same as the control system 500 of FIG. 5. The flowchart 1700 may include one or more operations, functions, or actions as illustrated by one or more of blocks 1702-1710. Although certain ones of blocks 1702-1710 are illustrated in a particular sequential or parallel order, these blocks may also be performed in a different sequential or parallel order than those described herein, where possible. Also, the various blocks may be combined into fewer blocks, divided into additional blocks, and/or removed based upon the desired implementation.

Turning now to the operations of flowchart 1700, at block 1702, the control system may measure a deflection of one or more wings of the vehicle using any of the wing deflection sensors described herein. Based on data from the wing deflection sensors, the control system may determine a magnitude of the deflection of the wing (e.g., a distance measurement in the form of an absolute or relative distance measurement) from a reference position. The reference position may be any predefined position, such as the position of the wing at rest (e.g., when not in motion in a quiescent fluid environment).

Wing deflection may be caused by various forces exerted on the wing. As one example, a wing operating in ground effect (i.e., near a rigid surface like the ground or near a free surface behaving similar to a rigid surface like a water surface) experiences a loading force distributed along the wing's span and chord, which generates a lift force. The lift force exerted on the wing while operating in ground effect is different than the lift force exerted on the wing while operating in an unbound fluid (e.g., at typical cruising altitudes of standard aircraft). For instance, while operating in ground effect, the lift force exerted on the wing and how it is distributed over the wing, depends on a distance between the wing and the surface providing the ground effect, such that the deflection of the wing may vary as the distance between the vehicle and the water surface varies. Further, rapid wing deflection may occur when operating in ground effect above a rapidly changing surface, such as when operating above a water surface with wave peaks and valleys. Again, because the distance between the wing and the ground surface affects the amount of lift force exerted on the wing, the presence of waves may cause this distance to vary as the vehicle traverses the waves and may therefore cause wing deflections that correspond to this varying distance.

At block 1704, the control system may determine whether the measured wing deflections are so large that remedial action should be taken to reduce the deflections. Wing deflections may become too large when they are large enough to put the vehicle at risk of structural damage or large enough to create an unpleasant ride experience for passengers. For instance, high frequency deflections caused by the change in lift force resulting from peaks and valleys of waves beneath the vehicle may induce vibrations in the vehicle that, if large enough, create an unpleasant ride experience, increase the risk of structural damage to the vehicle, or interfere with the ability to control or safely operate the vehicle. In order to determine whether the measured deflections are too large, the control system may compare the measured deflections to a predetermined value. If the magnitude of the deflections exceeds the predetermined value, then the flowchart 1700 may advance to block 1706, and the control system may take action to reduce the wing deflections. If, on the other hand, the magnitude of the deflections does not exceed the predetermined value, then the flowchart 1700 may advance to block 1710, and the control system may refrain from taking action to reduce the wing deflections.

At block 1706, the control system may reduce the wing deflections in various ways. The action taken by the control system may depend on the type and/or magnitude of the measured wing deflections. For example, as noted above, the amount of lift force exerted on the wing and how the lift force is distributed may depend on the distance between the wing and the water surface. Namely, reducing the distance between the wing and the water surface may increase the lift force, and increasing the distance between the wing and the water surface may decrease the lift force. As such, in order to reduce or alter the nature of the wing deflection, the control system may increase the distance between the wing and the water surface, and the control system may do so by adjusting one or more control surfaces of the vehicle to increase the vehicle's altitude.

As another example, the wing deflections may occur at a particular frequency that is likely to cause excessive vibration and/or mechanical fatigue of the vehicle. For instance, due to the structural composition of the vehicle, there may be one or more resonant frequencies at which induced vibrations caused by rapid wing deflections may experience positive feedback and continue to grow until the magnitude of the wing deflections and/or the vibrations exceeds a threshold magnitude. In such a scenario, the control system may take action to alter the frequency of the wing deflections in order to distance the deflection frequency from the resonant frequency of the vehicle. For example, the control system may be configured to increase or decrease a velocity of the vehicle, as this may increase or decrease the frequency at which the vehicle travels over the waves of the water surface and thus increases or decreases the frequency of the wing deflections. As another example, the control system may be configured to change a heading of the vehicle, as this may similarly increase or decrease the frequency at which the vehicle travels over the waves of the water surface and thus increases or decreases the frequency of the wing deflections.

When increasing the vehicle's altitude and/or changing the velocity and/or heading of the vehicle in order to reduce the wing deflections, the control system may be configured to do so by a predetermined amount or until the magnitude of the deflections no longer exceed the predetermined value. As shown in the flowchart 1700, this may be an iterative process in which, after attempting to reduce the magnitude of the wing deflections at block 1706, the control system remeasures the wing deflection at block 1702 and reevaluates whether the deflections are too large at block 1704.

Further, in some or all of the example scenarios described above, the control system may be configured to display to an operator of the vehicle, such as the pilot of the craft 100, an indication that the measured wing deflections are too large. The operator may then interact with the control system, such as by using the flight controls 526, to adjust and altitude and/or velocity of the vehicle to reduce the magnitude of the measured wing deflections.

In parallel with the operations described above in connection with blocks 1704 and 1706 for reducing wing deflections, at block 1708, the control system may determine one or more characteristics of the water surface based on the measured wing deflections. In some examples, the determined characteristics of the water surface may include a distance between the vehicle and the water surface. As noted above, the magnitude of the measured wing deflection may depend on the distance between the vehicle and the water surface. As such, the control system may determine the distance between the vehicle and the water surface based on the magnitude of the measured wing deflection. The precise relationship between the magnitude of the wing deflection and the distance between the vehicle and the water surface may depend on a number of factors, such as the shape and material of the wings. Therefore, the control system may need to be calibrated beforehand using experimental data that correlates the magnitude of the wing deflection to the distance between the vehicle and the water surface. Such calibration data may be stored in a data storage of the control system, such that the control system may access the calibration data for comparison with the measured wing deflection to determine the distance between the vehicle and the water surface.

The determined characteristics of the water surface may additionally include a slope or shape of the water surface. For instance, as explained below in connection with block 1710, the control system may repeatedly perform the process depicted in flowchart 1700, thereby generating a data set defining multiple distances between the vehicle and the water surface over time. The control system may determine the slope or shape of the water surface based on differences between the measured distances over time and the changes in vertical and horizontal position of the vehicle based on positional data from the vehicle's IMU. Examples of such shape data may include locations of wave crests on the water surface, locations of wave troughs on the water surface, an instantaneous or time-averaged height of the waves on the water surface, an instantaneous or time-averaged amplitude of the waves on the water surface, and/or a frequency or period of waves on the water surface based on the distances measured over time.

Further, in some examples, the determined characteristics of the water surface may include a frequency and/or period of the waves on the water surface. In line with the discussion above, changes in the height of the water surface due to the presence of waves may induce changes in the deflection of the wings, such that the frequency and period of the wing deflections may correspond to the frequency and period of the waves. As such, the control system may determine the frequency and period of the waves to be the frequency and period, respectively, of the measured wing deflections.

At block 1710, the control system returns to the beginning of the flowchart 1700 to repeat the operations all over again. In this manner, the control system iteratively performs the operations of flowchart 1700 to repeatedly and/or continually determine the characteristics of the wave surface using the wing deflection sensors.

D. Distributed Sensor Array

Some or all of the sensors described herein may be distributed across the planform of the vehicle, such as in an array, in order to provide multiples spatially-distinct measurements. Such an arrangement of the sensors may allow for noise reduction and for resolving directionality. Noise reduction may be accomplished by means of spatial averaging techniques, which may include weighted spatial averaging techniques. Spatial averaging of the sensor data may be performed across the multiple sensors concurrently, thereby avoiding challenges with real-time temporal filtering end effects. Directionality of the waves can be resolved by correlating measurements taken at distinct spatial locations. Estimates of the vehicle and wave propagation directions can be used, in conjunction with an application of the total derivative, to provide a spatially-consistent predicted measurement of the water surface.

Figure 18:
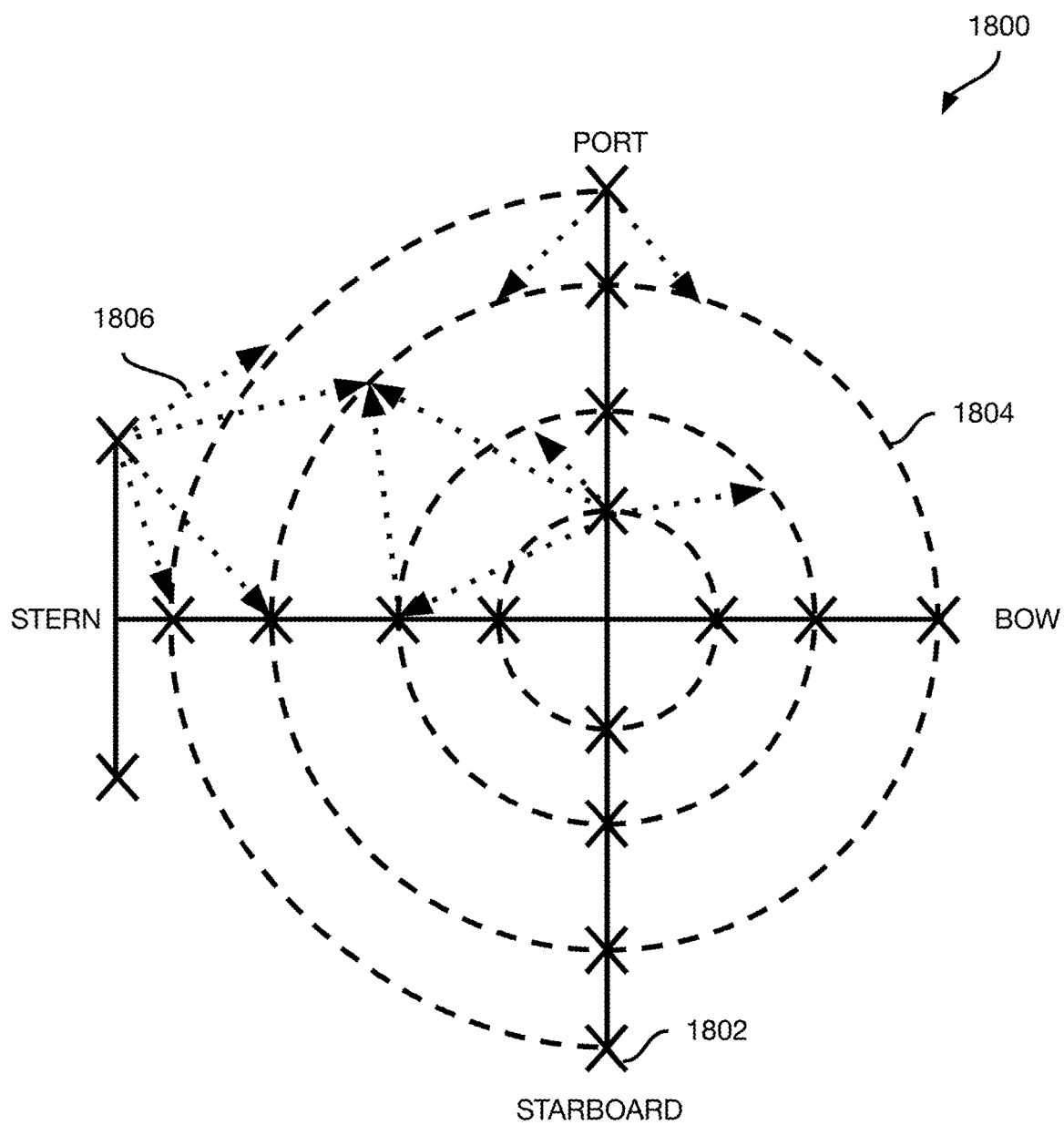
FIG. 18 depicts a simplified diagram of an example distributed sensor array, in accordance with example embodiments.

FIG. 18 depicts an example distributed sensor array 1800 that may be implemented in connection with the craft 100. As shown, the sensors 1802 may be arranged in a pattern that is as close to uniformly-spaced in a circular manner as possible to resolve angular variations in the wave-vehicle heading. The sensors 1802 may be arranged in several projections of a circle 1804 with the same focus and/or different foci. An uneven radial spacing of sensors 1802 may provide the best potential to avoid aliasing phenomena. The radial spacing may be implemented according to Chebychev-Gauss-Lobatto (cosine) spacing for use with orthogonal polynomial interpolants or random radial lines for Fourier or spline bases.

The sensors 1802 may be implemented as directional and steerable sensors 1802 and may be arranged such that the sensors 1802 are capable of targeting different locations 1806 along circular or cartesian patterns 1804 underneath the vehicle. The use of an array and phased signals, which may or may not contain overlapping frequency components, can be used to measure the distance to the water surface at multiple positions in space beneath the vehicle. These measurements may be combined to resolve slopes of the water surface, and/or averaged or fused to reduce noise in the measurements.

In some examples, the sensors 1802 that can directly measure surface gradients, such as the TOF image sensors described above, may be placed near the center of the vehicle, while the sensors 1802 that can take point measurements, such as the focal length image sensors, may placed both near the center and extremities of the vehicle. Placing sensors capable of directly measuring surface gradients near the center of the vehicle may provide more accurate measurements, as there may be less variability in the distance between the center of the vehicle and the water surface than between the extremities of the vehicle and the water surface. Further, the center of the vehicle is typically the lowest point of the vehicle and may therefore be the most critical position for measuring the distance between the vehicle and the water surface for purposes of avoiding collision with the water surface.

However, it should be appreciated that other configurations are possible as well. For instance, in some examples, other components of the vehicle, such as the outriggers 114 may extend below the hull, especially during certain maneuvers such as those that involve banked turns or when landing. Accordingly, in some examples, it may be more critical to measure the distance between the outriggers 114 or other components of the vehicle and the water surface. This may be accomplished by placing one or more of the sensors described herein on such components to directly measure the distance between such components and the water surface. Additionally, or alternatively, the control system may be provisioned with data defining the locations of these extremities of the vehicle in 3D space (e.g., relative to the positions of the sensors). Then, based on the distance measurements obtained from the sensors and a determined orientation of the vehicle (e.g., based on IMU data), the control system may determine distances between these critical extremities of the vehicle and the water surface. As described below in connection with FIG. 19, the control system may then control the motion of the vehicle to make sure these extremities do not make unwanted contact with the water surface.

V. Example Vehicle Control Based On Wave State Analysis

Figure 19:
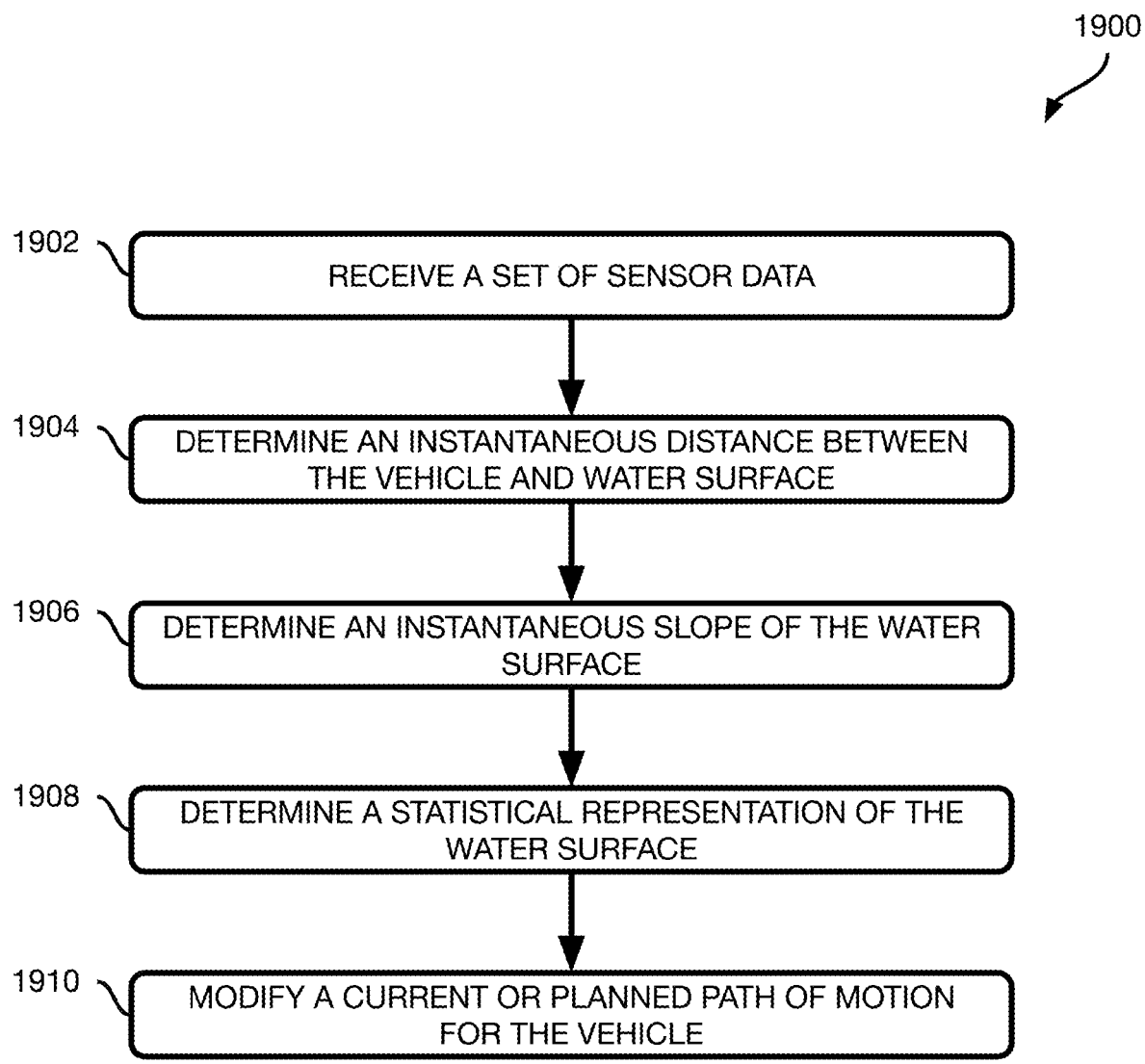
FIG. 19 depicts example operations for determining various characteristics of a water surface beneath a vehicle in motion and controlling operation of the vehicle, in accordance with example embodiments.

FIG. 19 depicts a flowchart 1900 of example operations that may be carried out in connection with a vehicle (e.g., the craft 100) in motion over a water surface. The example operations will be discussed with reference to a control system that may carry out the example operations. In this regard, the control system may be similar to or the same as the control system 500 of FIG. 5. The flowchart 1900 may include one or more operations, functions, or actions as illustrated by one or more of blocks 1902-1910. Although blocks 1902-1910 are illustrated in sequential order, these blocks may also be performed in parallel, and/or in a different order than those described herein, where possible. Also, the various blocks may be combined into fewer blocks, divided into additional blocks, and/or removed based upon the desired implementation.

Turning now to the operations of flowchart 1900, at block 1902, the control system may receive a set of sensor data from one or more sensors of the vehicle. The one or more sensors may include any of the sensors described herein for measuring various characteristics of the water surface, such as one or more of the focal length image sensors, one or more of the TOF image sensors, and/or one or more of the wing deflection sensors.

At block 1904, based on the set of sensor data, the control system may determine an instantaneous distance between the vehicle and the water surface. In examples where the one or more sensors include an image sensor having an adjustable focal length, the control system may determine the instantaneous distance between the vehicle and the water surface by adjusting the focal length of the image sensor until the image captured by the sensor is in focus (e.g., using any of various autofocusing techniques), such that the focal length of the image sensor matches the distance between the image sensor and the water surface. The set of sensor data in such examples may include a value of the focal length of the sensor, and the control system may determine the instantaneous distance between the vehicle and the water surface to be equal to the focal length of the image sensor after the focal length has been adjusted to bring the captured image into focus.

As further described above, adjusting the focal length of the image sensor may involve using historical data indicative of one or more previously measured characteristics of the wave surface to estimate a current characteristic of the wave surface. For instance, the control system may adjust the focal length based on a previously determined slope of the water surface, which may have been determined using any of the techniques described below in connection with block 1906. In some examples, if the previously measured slope indicates that the water surface is rising along a direction of travel of the vehicle, then the control system may decrease the focal length of the image sensor from its previous value. Alternatively, if the previously measured slope indicates that the water surface is falling along a direction of travel of the vehicle, then the control system may increase the focal length of the image sensor from its previous value. The amount that the control system increases or decreases the focal length of the sensor may depend on the steepness of the slope and the speed of the vehicle. For instance, the control system may determine a horizontal distance traveled by the vehicle since the previous slope measurement based on the vehicle's speed and/or based on data from an IMU of the vehicle, and the control system may multiply the distance traveled by the previously measured slope of the water surface to estimate the change in height of the water surface since the previous measurement. The control system may then increase or decrease the focal length of the image sensor a specific amount that compensates for this estimated change in height of the water surface.

In examples where the one or more sensors include one or more of the TOF image sensors described herein, which are configured to measure a respective TOF for each pixel of a plurality of pixels of an image captured by the image sensor (e.g., a PMD sensor), the set of sensor data received from the TOF image sensor may include a respective TOF value for each respective pixel of the plurality of pixels. In such examples, the control system may determine a respective instantaneous distance between the vehicle and the water surface for each pixel of the TOF image sensor using each pixel's TOF value in any of the manners described above.

In examples where the one or more sensors include one or more of the wing deflection sensors described herein, the set of sensor data received from the one or more wing deflection sensors may include data indicating a magnitude of the deflection of one or more wings of the vehicle. In such examples, determining the instantaneous distance between the vehicle and the surface of the body of water comprises determining the instantaneous distance in any of the manners described above.

At block 1906, further based on the set of sensor data, the control system may determine an instantaneous slope of the water surface. The control system may determine the instantaneous slope of the water surface based on multiple instantaneous distance measurements determined using any of the techniques described above in connection with block 1904 of the flowchart 1900. For instance, the control system may determine multiple instantaneous distances between the vehicle and the water surface, including at least a first instantaneous distance and a second instantaneous distance. The control system may then determine the instantaneous slope of the water surface based on a difference between the first and second instantaneous distances. For instance, the control system may determine the instantaneous slope by dividing the difference between the first and second instantaneous distances by a horizontal distance between the points on the water surface where the first and second instantaneous distances were measured.

In some examples, the first and second instantaneous distances may be consecutive distance measurements made using a single sensor, such as consecutive measurements made using one of the focal length image sensors or one of the wing deflection sensors. In other examples, the first and second instantaneous distances may be concurrent measurements made using a single sensor. For instance, the first and second instantaneous distances may respectively correspond to two different distance measurements determined using the TOF data for two different pixels of one of the TOF image sensors.

Further, in some examples, the control system may determine the instantaneous slope of the water surface based on more than just two instantaneous distance measurements. For instance, the control system may determine several instantaneous distance measurements over time, apply a curve fitting technique to a set of recent distance measurements, and determine the slope of the water surface based on the slope of the fitted curve. Additionally or alternatively, in line with the discussion above, when using a TOF image sensor to concurrently measure a plurality of distances over a pixel area, the control system may determine an instantaneous slope at each pixel of the area by determining a gradient of the measured distances. Other examples are possible as well.

At block 1908, the control system may determine a statistical representation of the water surface based on at least one of the instantaneous distance or slope measurements. In some examples, determining the statistical representation of the water surface may include determining, for the body of water, at least one of a time-averaged wave height, a time-averaged wave amplitude, a wave height variance, a wave amplitude variance, a wave frequency, or a mean free surface of the body of water.

As described above in connection with FIGS. 15-17, when measuring the distance between the vehicle and the water surface using any of the sensors described herein, the control system may repeatedly make these measurements over time and correlate these measurements with a position of the vehicle to resolve different characteristics of the water surface. For instance, at any given time, the control system may determine a position and orientation of the vehicle in three-dimensional (3D) space based on data obtained from an IMU of the vehicle. Based on the vehicle's known position and orientation in 3D space and the determined distance between the vehicle and a point on the water surface, the control system may likewise determine where that point on the water surface lies in 3D space. And by rapidly repeating this process over time for many points across the water surface, the control system may generate a map of data points corresponding to positions of the water surface in 3D space. The control system may then apply various statistical analyses to this data to determine any of the statistical representations of the water surface identified above, or various other statistical representations as well. Further, in some examples, the control system may identify, based on the 3D map of the water surface, certain water surface features and their locations in 3D space, such as the locations of wave crests and wave troughs.

Still further, based on the various characteristics of the water surface that the control system directly measures using the techniques described above, the control system may predict various characteristics of approaching areas of the water surface along the direction of travel of the vehicle. For instance, the control system may determine trends in the measured characteristics of the water surface and project those trends along the vehicles direction of travel to estimate the same characteristics in the approaching areas of the water surface.

At block 1910, the control system may modify a current or planned path of motion for the vehicle based on one or more of the measurements described above, such as the instantaneous distance measurements, the instantaneous slope measurements, the statistical representations of the water surface, the 3D map of the water surface, and/or the locations of various water surface features. In some examples, this may involve the control system modifying the path of motion based on forecasted characteristics of the water surface determined using any of the measurements described above. For instance, in line with the discussion above, the control system may use data from the sensors to predict the slope, curvature, and/or shape of the water surface that the vehicle is expected to encounter, such as by forecasting characteristics of approaching areas of the water surface along the direction of travel of the vehicle. As such, the control system may preemptively modify the path of motion and/or one or more operational parameters of the vehicle in anticipation of encountering such characteristics.

In some examples, the control system may modify a current path of motion for the vehicle in order to maintain a desired altitude of the vehicle above the water surface. For example, if the vehicle is in wing-borne flight or in hydrofoil-borne travel with the hull raised above the water surface, it may be advantageous to maintain an altitude at which the vehicle (e.g., the entire vehicle when in flight, or the hull of the vehicle when hydrofoiling) avoids contacting the water surface while still keeping the vehicle close to the water surface for other operational considerations (e.g., to maintain ground effect for a WIG in flight, or to ensure that the hydrofoil remains submerged for a hydrofoil-borne vehicle).

To facilitate this, the control system may determine a target distance between the vehicle and the water surface. The target distance may be a predefined distance that may be specified by an operator of the vehicle via user input. The target distance may be relative to various different features of the water surface. As one example, the target distance may be a target distance between the vehicle and the mean free surface of the water. As another example, the target distance may be a target distance between the vehicle and the peak height (e.g., a wave crest) of the water surface. Other examples are possible as well.

Using any of the techniques described above, the control system may measure the actual distance between the vehicle and the various features of the water surface and compare the actual distance to the target distance. For instance, the control system may measure the actual distance between the vehicle and the mean free surface of the water and compare this measurement to the target distance between the vehicle and the mean free surface of the water. Additionally or alternatively, the control system may measure the actual distance between the vehicle and the water surface at its peak height and compare this measurement to the target distance between the vehicle and the water surface at its peak height.

Based on the difference between the actual distance and the target distance, the control system may adjust one or more control surfaces of the vehicle in order to modify the motion of the vehicle until the actual distance matches the target distance. For instance, the control system may adjust one or more elevators, ailerons, and/or flaps of the wings and/or hydrofoils of the vehicle to increase or decrease the altitude of the vehicle until the actual distance matches the target distance.

In examples where the sensor technology described herein is implemented in connection with a WIG similar to the craft 100 described herein, the control system may use any of the measured characteristics of the water surface as a basis for controlling transitions between different modes of operation of the WIG, such as when transitioning from hydrofoil-borne mode to wing-borne mode or when transitioning from wing-borne mode to hull-borne mode.

When transitioning from hydrofoil-borne mode to wing-borne mode, it is desirable for the WIG's hydrofoil to quickly break free of the water surface and to remain free without making subsequent contact, which could result in damage to the hydrofoil or, even worse, cause the vehicle to crash into the water. One way to reduce or eliminate the chances of the hydrofoil making subsequent contact with the water surface after breaking free from the water is to cause the hydrofoil to break free from the water at or near a wave crest, as this is the highest point of the water surface. Breaking free from the water surface at its highest point and then continuing to increase in altitude in airborne mode may greatly reduce the chance of the hydrofoil striking a subsequent wave after breaking free from the water.

To achieve this, the control system may determine the locations of wave crests on the water surface using any of the techniques described above and may identify a particular location of a wave crest at which the WIG's hydrofoil is to break free from the water surface. Based on the current location of the WIG (e.g., based on IMU data or other positional data) and the known location of the hydrofoil relative to the WIG, the control system may then adjust a speed of the WIG and/or one or more control surfaces of the WIG, such as one or more elevators, ailerons, and/or flaps of the wings and/or hydrofoils of the WIG, in a manner that causes the hydrofoil to break free from the water surface at or near the identified location of the wave crest.

When transitioning from wing-borne mode to hull-borne mode (i.e., when landing the WIG on a water surface), it may be desirable for the WIG's hull to initiate contact with the water at a particular water surface feature. The particular feature may vary depending on the design of the WIG, but may include a wave trough, or an upward or downward slope of a wave.

In order to cause the WIG to transition from wing-borne mode to hull-borne mode at a desirable water surface feature, the control system may determine the locations of the desirable water surface features using any of the techniques described above and may identify a particular location of a desirable water surface feature at which the WIG's hull is to make contact with the water surface. Based on the current location of the WIG and the known orientation of the hull (e.g., based on IMU data or other positional data), the control system may then adjust a speed of the WIG and/or one or more control surfaces of the WIG, such as one or more elevators, ailerons, and/or flaps of the wings of the WIG, in a manner that causes the hull to make initial contact with the water surface at or near the identified location of the desirable water feature.

Additionally or alternatively, in response to identifying a particular location of a desirable water surface feature at which the WIG's hull is to make contact with the water surface, the control system may cause a display of the WIG to present a visual indication of the identified location to an operator of the WIG, such that the operator may manually land the WIG at the identified location, such as by using the flight controls 526.

VI. Conclusion

The above detailed description describes various features and functions of the disclosed WIGs, sensor systems, and methods of operation with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope being indicated by the claims.

Further, in light of the above detailed description, the present disclosure contemplates the following example features:

(Feature 1) A method for controlling a wing-in-ground effect vehicle that includes (i) a main wing comprising one or more main wing control surfaces, (ii) a tail comprising one or more tail control surfaces, (iii) a blown-wing propulsion system comprising an array of electric motors arranged along at least one of the main wing or the tail, and (iv) a retractable hydrofoil system comprising a retractable hydrofoil, the method comprising: (a) causing the retractable hydrofoil system to operate in an extended configuration in which the retractable hydrofoil extends below a hull of the wing-in-ground effect vehicle for submersion below a water surface; (b) while the retractable hydrofoil system is in the extended configuration, (1) determining a first position, orientation, and velocity of the wing-in-ground effect vehicle and (2) based on the determined first position, orientation, and velocity of the wing-in-ground effect vehicle, maneuvering the wing-in-ground effect vehicle by causing one or more actuators of the retractable hydrofoil system to change an orientation of the retractable hydrofoil; (c) causing the retractable hydrofoil system to operate in a retracted configuration in which the retractable hydrofoil is retracted at least partially into the hull of the wing-in-ground effect vehicle; and (d) while the retractable hydrofoil system is in the retracted configuration, (1) determining a second position, orientation, and velocity of the wing-in-ground effect vehicle and (2) based on the determined second position, orientation, and velocity of the wing-in-ground effect vehicle, maneuvering the wing-in-ground effect vehicle by causing one or more actuators of the main wing and the tail to change an orientation of the main wing control surfaces and tail control surfaces.

(Feature 2) The method of feature 1, further comprising sustaining operation of the wing-in-ground effect vehicle in each of the following operational modes: (i) a hull-borne mode in which the hull of the vehicle contacts the water surface; (ii) a hydrofoil-borne mode in which the retractable hydrofoil is at least partially submerged below the water surface and the hull of the vehicle is entirely above the water surface; and (iii) a wing-borne mode in which the wing-in-ground effect vehicle is entirely above the water surface.

(Feature 3) The method of feature 2, further comprising, while the wing-in-ground effect vehicle is operating in the hull-borne mode, (i) causing the retractable hydrofoil system to transition from operating in the retracted configuration to operating in the extended configuration, and (ii) causing the blown-wing propulsion system to accelerate the wing-in-ground effect vehicle until the wing-in-ground effect vehicle transitions from operating in the hull-borne mode to operating in the hydrofoil-borne mode.

(Feature 4) The method of feature 2 or 3, further comprising: (i) determining that the wing-in-ground effect vehicle has transitioned from operating in the wing-borne mode to operating in the hull-borne mode; and (ii) based on determining that the wing-in-ground effect vehicle has transitioned from operating in the wing-borne mode to operating in the hull-borne mode, causing the retractable hydrofoil system to transition from operating in the retracted configuration to operating in the extended configuration.

(Feature 5) The method of any of features 2 to 4, further comprising: (i) determining that the wing-in-ground effect vehicle has transitioned from operating in the wing-borne mode to operating in the hull-borne mode; and (ii) based on determining that the wing-in-ground effect vehicle has transitioned from operating in the wing-borne mode to operating in the hull-borne mode, causing the retractable hydrofoil system to transition from operating in the retracted configuration to operating in the extended configuration.

(Feature 6) The method of any of features 2 to 5, wherein the retractable hydrofoil system is a first retractable hydrofoil system, the retractable hydrofoil is a first retractable hydrofoil, the extended configuration is a first extended configuration, and the retracted configuration is a first retracted configuration, and wherein the wing-in-ground effect vehicle further comprises a second retractable hydrofoil system comprising a second retractable hydrofoil, wherein the second retractable hydrofoil system is configured to operate in: (i) a second extended configuration in which the second retractable hydrofoil extends below the hull of the wing-in-ground effect vehicle for submersion below the water surface and (ii) a second retracted configuration in which the second retractable hydrofoil is retracted at least partially into or toward the hull of the wing-in-ground effect vehicle.

(Feature 7) The method of feature 6, further comprising, while the wing-in-ground effect vehicle is operating in the hull-borne mode, (i) causing the first retractable hydrofoil system to transition from operating in the first retracted configuration to operating in the first extended configuration, (ii) causing the second retractable hydrofoil system to transition from operating in the second retracted configuration to operating in the second extended configuration, and (iii) causing the blown-wing propulsion system to accelerate the wing-in-ground effect vehicle until the wing-in-ground effect vehicle transitions from operating in the hull-borne mode to operating in the hydrofoil-borne mode.

(Feature 8) The method of feature 6 or 7, further comprising: (i) determining that the wing-in-ground effect vehicle has transitioned from operating in the hydrofoil-borne mode to operating in the wing-borne mode; and (ii) based on determining that the wing-in-ground effect vehicle has transitioned from operating in the hydrofoil-borne mode to operating in the wing-borne mode, (a) causing the first retractable hydrofoil system to transition from operating in the first extended configuration to operating in the first retracted configuration and (b) causing the second retractable hydrofoil system to transition from operating in the second extended configuration to operating in the second retracted configuration.

(Feature 9) The method of any of features 6 to 8, further comprising: (i) determining that the wing-in-ground effect vehicle has transitioned from operating in the wing-borne mode to operating in the hull-borne mode; and (ii) based on determining that the wing-in-ground effect vehicle has transitioned from operating in the wing-borne mode to operating in the hull-borne mode, (a) causing the first retractable hydrofoil system to transition from operating in the first retracted configuration to operating in the first extended configuration and (b) causing the second retractable hydrofoil system to transition from operating in the second retracted configuration to operating in the second extended configuration.

(Feature 10) The method of any of features 6 to 9, wherein: (i) the first retractable hydrofoil system is positioned between (a) a bow of the wing-in-ground effect vehicle and (b) a midpoint between the bow and a stern of the wing-in-ground-effect vehicle; and (ii) the second retractable hydrofoil system is positioned below the tail of the wing-in-ground effect vehicle.

(Feature 11) The method of feature 10, wherein the tail further comprises a rudder, and wherein, when the second retractable hydrofoil system is operating in the second retracted configuration, the second retractable hydrofoil is retracted at least partially into the rudder.

(Feature 12) The method of any of features 1 to 11, wherein an aspect ratio of the main wing is greater than or equal to five.

(Feature 13) The method of any of features 1 to 12, wherein causing one or more actuators of the retractable hydrofoil system to change the orientation of the retractable hydrofoil when the retractable hydrofoil system is operating in the extended configuration comprises causing one or more actuators of the retractable hydrofoil system to change an angle of attack of the retractable hydrofoil when the retractable hydrofoil system is operating in the extended configuration.

(Feature 14) The method of any of features 1 to 13, wherein the retractable hydrofoil includes one or more hydrofoil control surfaces, and wherein the control system is further configured to cause one or more actuators of the retractable hydrofoil system to change an orientation of the one or more hydrofoil control surfaces when the retractable hydrofoil system is operating in the extended configuration.

(Feature 15) The method of feature 14, wherein the one or more hydrofoil control surfaces include at least one of a hydrodynamic elevator, a hydrodynamic flap, or a hydrodynamic rudder.

(Feature 16) The method of any of features 1 to 15, wherein: (i) the retractable hydrofoil comprises a foil and at least one strut coupling the foil to the hull of the wing-in-ground effect vehicle, and (ii) when the retractable hydrofoil system is operating in the retracted configuration, the at least one strut is at least partially retracted into the hull of the wing-in-ground effect vehicle.

(Feature 17) The method of feature 16, wherein the foil comprises: (i) a horizontal center portion; and (ii) two end portions extending diagonally upward from respective ends of the horizontal center portion.

(Feature 18) The method of any of features 1 to 17, further comprising determining a location of an obstacle based on data received from at least one sensor of the wing-in-ground effect vehicle, wherein maneuvering the wing-in-ground effect vehicle comprises maneuvering the wing-in-ground effect vehicle based on both (i) the determined position, orientation, and velocity of the wing-in-ground effect vehicle and (ii) the determined location of the obstacle.

(Feature 19) A method for controlling a wing-in-ground effect vehicle that includes (i) at least one hull; (ii) at least one wing configured to generate upwards aero lift as air flows past the at least one wing to facilitate wing-borne flight of the vehicle; and (iii) at least one hydrofoil configured to generate upwards hydrofoil lift during a first mode of operation as water flows past the at least one hydrofoil to facilitate hydrofoil-borne movement of the vehicle through the water, wherein the method comprises, while the upwards aero lift is below a threshold lift, controlling the at least one hydrofoil to generate downwards hydrofoil lift that maintains the at least one hydrofoil at least partially submerged in the water.

(Feature 20) The method of feature 19, wherein the threshold lift corresponds to a lift that is sufficient to allow the vehicle to transition from hydrofoil-borne movement through the water to sustained wing-borne flight.

(Feature 21) The method of feature 19 or 20, wherein while the vehicle is hydrofoil-borne, the at least one hull is lifted above the water.

(Feature 22) The method of any of features 19 to 21, further comprising: (i) determining that the upwards aero lift generated by the at least one wing corresponds to the threshold lift; and (ii) after determining that the upwards aero lift generated by the at least one wing corresponds to the threshold lift, controlling the at least one hydrofoil to increase or decrease the downwards hydrofoil lift generated by the at least one hydrofoil.

(Feature 23) The method of any of features 19 to 22, further comprising controlling the at least one hydrofoil to increase the downwards hydrofoil lift generated by the at least one hydrofoil in proportion to an increase in the upwards aero lift generated by the at least one wing.

(Feature 24) The method of any of features 19 to 23, further comprising: (i) determining a speed of the vehicle; and (ii) determining the upwards aero lift generated by the at least one wing based at least in part on the determined speed of the vehicle.

(Feature 25) The method of any of features 19 to 24, further comprising determining the upwards aero lift generated by the at least one wing based at least in part on an angle of attack of the at least one wing, a speed of the vehicle, and respective deflection angles of one or more control surfaces of the at least one wing.

(Feature 26) The method of any of features 19 to 25, wherein the vehicle comprises a sensor configured to sense a load force on the at least one hydrofoil, and wherein the method further comprises: (i) determining a sensed load force on the at least one hydrofoil; and (ii) determining the upwards aero lift generated by the at least one wing based at least in part on a sensed load force.

(Feature 27) The method of any of features 19 to 26, further comprising determining lift generated by the at least one hydrofoil based at least in part on an angle of attack of the at least hydrofoil, a speed of the vehicle, and respective deflection angles of one or more control surfaces of the at least one hydrofoil.

(Feature 28) The method of any of features 19 to 27, wherein the at least one hydrofoil comprises one or more flaperons, ailerons, or elevators, and wherein the method further comprises adjusting respective deflection angles of the one or more flaperons, ailerons, or elevators to thereby control the downwards hydrofoil lift generated by the at least one hydrofoil.

(Feature 29) The method of any of features 19 to 28, wherein an angle of incidence of the at least one hydrofoil is adjustable, and wherein the method further comprises adjusting the angle of incidence of the at least one hydrofoil to thereby control the downwards hydrofoil lift generated by the at least one hydrofoil.

(Feature 30) A method for controlling a wing-in-ground effect vehicle that includes (i) at least one hull; (ii) at least one wing configured to generate upwards aero lift as air flows past the at least one wing to facilitate wing-borne flight of the vehicle; and (iii) at least one hydrofoil configured to generate upwards hydrofoil lift during a first mode of operation as water flows past the at least one hydrofoil to facilitate hydrofoil-borne movement of the vehicle through the water, wherein the method comprises: (a) as the vehicle accelerates, adjusting downwards hydrofoil lift generated by the hydrofoil to maintain the hydrofoil at least partially submerged in the water; and (b) after determining that the upwards aero lift is sufficient to allow the vehicle to sustain flight, decreasing the downwards hydrofoil lift generated by the hydrofoil to allow the hydrofoil to exit the water and the vehicle to become wing-borne.

(Feature 31) The method of feature 30, wherein adjusting the downwards hydrofoil lift generated by the hydrofoil comprises, while the vehicle is hydrofoil-borne and the wing is generating the upwards aero lift, adjusting the hydrofoil lift generated by the hydrofoil to transition from a positive lift that raises the craft to a negative lift that opposes the upwards aero lift to thereby maintain the hydrofoil at least partially submerged in the water while the vehicle accelerates.

(Feature 32) The method of feature 30 or 31, wherein adjusting the downwards hydrofoil lift generated by the hydrofoil comprises increasing the downwards hydrofoil lift generated by the hydrofoil in proportion to an increase in the upwards aero lift generated by the wing.

(Feature 33) The method of any of features 30 to 32, wherein determining the upwards aero lift generated by the wing comprises: (i) determining a speed of the craft; and (ii) determining the upwards aero lift generated by the wing based at least in part on the determined speed of the craft.

(Feature 34) The method of any of features 30 to 33, wherein determining the upwards aero lift generated by the wing comprises: (i) determining an angle of attack of the wing; and (ii) determining the upwards aero lift generated by the wing based at least in part on an angle of attack of the wing.

(Feature 35) The method of any of features 30 to 34, wherein the vehicle comprises a sensor configured to sense a load force on the hydrofoil, and wherein determining the upwards aero lift generated by the wing comprises: (i) determining a sensed load force on the hydrofoil; and (ii) determining the upwards aero lift generated by the wing based at least in part on a sensed load force.

(Feature 36) The method of any of features 30 to 35, wherein the hydrofoil comprises one or more flaperons, ailerons, or elevators, and wherein adjusting the hydrofoil lift generated by the hydrofoil comprises adjusting respective angles of deflection of the one or more flaperons or ailerons of the hydrofoil to thereby control the upwards hydrofoil lift and the downwards hydrofoil lift generated by the hydrofoil.

(Feature 37) The method of any of features 30 to 36, wherein the hydrofoil is moveable, and wherein the method further comprises extending the hydrofoil below the hull of the vehicle for submersion in the water and to at least partially retract into the hull of the vehicle after the vehicle is wing-borne.

(Feature 38) The method of any of features 30 to 37, wherein adjusting the downwards hydrofoil lift generated by the hydrofoil comprises adjusting one or both of an angle or a distance at which the hydrofoil extends below the hull to thereby control the downwards hydrofoil lift generated by the hydrofoil.

(Feature 39) A method comprising: (i) receiving, from one or more sensors of a vehicle in motion over a body of water, a set of sensor data; (ii) based on the set of sensor data, determining (a) an instantaneous distance between the vehicle and a surface of the body of water and (b) an instantaneous slope of the surface of the body of water; (iii) based on at least one of the instantaneous distance or the instantaneous slope, determining a statistical representation of the surface of the body of water; and (iv) based on the determined statistical representation of the surface of the body of water, adjusting one or more control surfaces of the vehicle to change one or more of a speed, altitude, heading, or attitude of the vehicle.

(Feature 40) The method of feature 39, further comprising modifying a motion plan of the vehicle based on at least one of the instantaneous distance, the instantaneous slope, or the statistical representation of the surface of the body of water.

(Feature 41) The method of feature 39 or 40, further comprising adjusting one or more of the control surfaces of the vehicle based on at least one of the instantaneous distance, the instantaneous slope, or the statistical representation of the surface of the body of water.

(Feature 42) The method of any of features 39 to 41, wherein determining the statistical representation of the surface of the body of water comprises determining, for the body of water, at least one of a time-averaged wave height, a time-averaged wave amplitude, a wave height variance, a wave amplitude variance, a wave frequency, or a mean free surface of the body of water.

(Feature 43) The method of any of features 39 to 42, wherein determining the statistical representation of the surface of the body of water comprises determining a mean free surface of the body of water, and wherein the computing system further comprises program instructions stored on the non-transitory computer-readable medium that are executable by the at least one processor such that the computing system is configured to determine a distance between the vehicle and the mean free surface of the body of water.

(Feature 44) The method of feature 43, further comprising comparing the distance between the vehicle and the mean free surface of the body of water to a target distance, wherein adjusting the one or more control surfaces of the vehicle comprises adjusting the one or more control surfaces of the vehicle based on a difference between the target distance and the distance between the vehicle and the mean free surface of the body of water.

(Feature 45) The method of any of features 39 to 44, wherein the instantaneous distance between the vehicle and the surface of the body of water is a first instantaneous distance, wherein the method further comprises determining a second instantaneous distance between the vehicle and the surface of the body of water, and wherein determining the instantaneous slope of the surface of the body of water comprises determining the instantaneous slope of the surface of the body of water based on a difference between the first instantaneous distance and the second instantaneous distance.

(Feature 46) The method of any of features 39 to 45, wherein the one or more sensors comprise an image sensor having an adjustable focal length, wherein the set of sensor data comprises a value of the focal length, wherein the method further comprises adjusting the focal length of the image sensor to match a distance between the image sensor and the surface of the body of water, and wherein determining the instantaneous distance between the vehicle and the surface of the body of water comprises determining the instantaneous distance based on the adjusted focal length of the image sensor.

(Feature 47) The method of feature 46, wherein adjusting the focal length of the image sensor comprises: (i) determining a previously measured slope of the surface of the body of water; and (ii) adjusting the focal length of the image sensor based on the previously measured slope of the surface of the body of water by (a) decreasing the focal length of the image sensor if the previously measured slope indicates that the surface is rising along a direction of travel of the vehicle or (b) increasing the focal length of the image sensor if the previously measured slope indicates that the surface is falling along the direction of travel of the vehicle.

(Feature 48) The method of any of features 39 to 47, wherein the one or more sensors comprise an image sensor configured to measure a respective time-of-flight for each pixel of a plurality of pixels of an image captured by the image sensor, wherein the set of sensor data comprises a respective time-of-flight value for each respective pixel of the plurality of pixels, and wherein determining the instantaneous distance between the vehicle and the surface of the body of water comprises determining a respective instantaneous distance between the vehicle and the surface of the body of water for each respective time-of-flight value.

(Feature 49) The method of feature 48, wherein determining the instantaneous slope of the surface of the body of water comprises determining the instantaneous slope of the surface of the body of water based on a difference between a first one of the determined respective instantaneous distances and a second one of the determined respective instantaneous distances.

(Feature 50) The method of any of features 39 to 49, wherein the one or more sensors comprise one or more sensors configured to measure a deflection of one or more wings of the vehicle, wherein the set of sensor data comprises data indicating the deflection of the one or more wings, and wherein determining the instantaneous distance between the vehicle and the surface of the body of water comprises determining the instantaneous distance based on the data indicating the deflection of the one or more wings.

(Feature 51) A control system of a wing-in-ground effect vehicle, the control system comprising: (i) at least one processor; (ii) a non-transitory computer-readable medium; and (iii) program instructions stored on the non-transitory computer-readable medium that are executable by the at least one processor such that the control system is configured to perform the method of any of features 1 to 50.

(Feature 52) A wing-in-ground effect vehicle comprising the control system of feature 51.

(Feature 53) An airborne vehicle comprising: (i) a body section; (ii) a main wing extending form the body section configured to generate aerodynamic lift, the main wing having one or more main wing control surfaces; and (iii) a tail assembly extending from the body section aft of the main wing, the tail assembly having a first tail member and a second tail member, the first tail member being substantially parallel to the second tail member, the first tail member having one or more control surfaces, the second tail member having one or more flap surfaces selectively deployable between a retracted position and an extended position, the one or more flap surfaces being configured to increase a surface area and/or camber of the second tail member in the extended position.

(Feature 54) The airborne vehicle of feature 53, further comprising a deployment mechanism operably coupled to the one or more flap surfaces of the second tail member, the deployment mechanism being configured to move the one or more flap surfaces between the retracted position and the extended position.

(Feature 55) The airborne vehicle of feature 54, further comprising one or more interconnecting members extending between the first tail member and the second tail member and supporting at least one of the first tail member or the second tail member.

(Feature 56) The airborne vehicle of feature 55, wherein the one or more interconnecting members comprises one or more control surfaces.

(Feature 57) The airborne vehicle of feature 56, wherein the one or more control surfaces comprises one or more rudders.

(Feature 58) The airborne vehicle of feature 55, wherein the deployment mechanism comprises at least one actuator operably coupled to the one or more flap surfaces, the at least one actuator being disposed in the one or more interconnecting members.

(Feature 59) The airborne vehicle of feature 54, wherein the deployment mechanism comprises at least one actuator operably coupled to the one or more flap surfaces, the at least one actuator being disposed in the body section.

(Feature 60) The airborne vehicle of any of features 53 to 59, wherein the main wing is a blown-wing having a blown-wing propulsion system arranged along the blown-wing, the blown-wing propulsion system outputting an aerodynamic effect.

(Feature 61) The airborne vehicle of feature 60, wherein the first tail member is positioned generally within the aerodynamic effect.

(Feature 62) The airborne vehicle of feature 60 or 61, wherein the second tail member is positioned generally above the aerodynamic effect.

(Feature 63) The airborne vehicle of any of features 53 to 62, wherein the one or more flap surfaces is configured as a flap system, the flap system being selected from the group that consists of plain, split, Fowler, double-slotted Fowler, and slotted flaps.

(Feature 64) The airborne vehicle of any of features 53 to 63, wherein the one or more flap surfaces is configured to exert a pitch moment when the one or more flap surfaces is in the extended position.

(Feature 65) The airborne vehicle of any of features 53 to 64, wherein the one or more flap surfaces is configured to generate a downward aerodynamic force in the extended position.

(Feature 66) The airborne vehicle of any of features 53 to 65, wherein a ratio of a surface area of the first tail member to the surface area of the second tail member is in the range of 0.9 to 1.6.

(Feature 67) The airborne vehicle of any of features 53 to 66, wherein a separation distance between the first tail member and the second tail member is in the range of 0.25 to 0.75 the lower tail member span.

(Feature 68) The airborne vehicle of any of features 53 to 67, wherein the first tail member is positioned horizontally below the second tail member.

(Feature 69) The airborne vehicle of any of features 53 to 68, wherein the one or more control surfaces of the first tail member comprises one or more elevators.

(Feature 70) The airborne vehicle of any of features 53 to 69, wherein the body section comprises a hull and the main wing comprises a pair of outriggers, the hull and the pair of outriggers configured to contact a water surface.

(Feature 71) The airborne vehicle of any of features 53 to 70, further comprising a retractable hydrofoil system positioned below the tail assembly.

(Feature 72) The airborne vehicle of any of features 53 to 71, further comprising the control system of feature 51.

The invention claimed is:

1. A craft comprising:
   at least one sensor;
   at least one wing configured to generate upwards aero lift as air flows past the at least one wing to facilitate wing-borne flight of the craft;
   at least one hydrofoil configured to generate hydrofoil lift as water flows past the at least one hydrofoil to facilitate hydrofoil-borne movement of the craft through the water; and
   a control system, wherein while the craft is hydrofoil-borne, the control system is configured to:
   receive, from the at least one sensor, sensor data;
   based on the received sensor data, determine:
     (a) that at least one takeoff parameter does not satisfy a takeoff-parameter threshold condition; and
     (b) a representation of at least a portion of a body of water that comprises the water that flows past the at least one hydrofoil;
   after the determination that the at least one takeoff parameter does not satisfy the takeoff-parameter threshold condition, control the at least one hydrofoil to generate downwards hydrofoil lift that maintains the at least one hydrofoil at least partially submerged in the water; and
   based on the determined representation of the at least the portion of the body of water, change one or more of a speed, altitude, heading, or attitude of the craft.

2. The craft of claim 1, wherein the control system is further configured to, based on the determined representation of the at least the portion of the body of water, determine a distance between at least a portion of the craft and a surface of the body of water.

3. The craft of claim 2, wherein changing one or more of a speed, altitude, heading, or attitude of the craft based on the determined representation of the at least the portion of the body of water comprises changing one or more of a speed, altitude, heading, or attitude of the craft based on the determined distance between the craft and the surface of the body of water being less than a threshold distance.

4. The craft of claim 2, wherein changing one or more of a speed, altitude, heading, or attitude of the craft based on the determined representation of the at least the portion of the body of water comprises changing one or more of a speed, altitude, heading, or attitude of the craft based on the determined distance between the craft and the surface of the body of water being greater than a threshold distance.

5. The craft of claim 1, wherein the control system is further configured to determine a desired takeoff location in the body of water based on the determined representation of the at least the portion of the body of water, and wherein changing one or more of a speed, altitude, heading, or attitude of the craft based on the determined representation of the at least the portion of the body of water comprises changing one or more of a speed, altitude, heading, or attitude of the craft such that the at least one hydrofoil exits the body of water at the desired takeoff location thereby causing the craft to enter wing-borne flight.

6. The craft of claim 5, wherein the desired takeoff location corresponds to an expected location of a wave crest in the body of water.

7. The craft of claim 1, wherein the at least one takeoff parameter comprises a speed of the craft, and wherein the determination that the at least one takeoff parameter does not satisfy the takeoff-parameter threshold condition comprises a determination that the speed of the craft is below a threshold speed.

8. The craft of claim 1, wherein the at least one takeoff parameter comprises an amount of aero lift generated by the at least one wing, and wherein the determination that the at least one takeoff parameter does not satisfy the takeoff-parameter threshold condition comprises a determination that the amount of aero lift generated by the at least one wing is below a threshold amount.

9. The craft of claim 1, wherein the at least one hydrofoil comprises a fixed hydrofoil.

10. The craft of claim 1, wherein the at least one hydrofoil comprises a retractable hydrofoil configured to operate in: (i) an extended configuration in which the retractable hydrofoil extends below a hull of the craft at a first distance and (ii) a retracted configuration in which the retractable hydrofoil is retracted at least partially such that the retractable hydrofoil extends below the hull of the craft at a second distance, wherein the second distance is less than the first distance.

11. The craft of claim 1, wherein the at least one hydrofoil comprises one or more hydrofoil actuators configured to control an angle of attack of the at least one hydrofoil, and wherein controlling the at least one hydrofoil to generate the downwards hydrofoil lift that maintains the at least one hydrofoil at least partially submerged in the water comprises causing the one or more hydrofoil actuators to change the angle of attack of the at least one hydrofoil.

12. The craft of claim 1, wherein changing one or more of a speed, altitude, heading, or attitude of the craft based on the determined representation of the at least the portion of the body of water comprises changing one or more of a speed, altitude, heading, or attitude of the craft to thereby maintain a target distance between the craft and a surface of the body of water.

13. A control system for controlling a craft that includes (i) at least one sensor, (ii) at least one wing configured to generate upwards aero lift as air flows past the at least one wing to facilitate wing-borne flight of the craft, and (iii) at least one hydrofoil configured to generate hydrofoil lift as water flows past the at least one hydrofoil to facilitate hydrofoil-borne movement of the craft through the water, the control system comprising:
  at least one processor;
  non-transitory computer-readable medium; and
  program instructions stored on the non-transitory computer-readable medium that are executable by the at least one processor such that the control system is configured to:
    receive, from the at least one sensor, sensor data;
    based on the received sensor data, determine:
      (a) that at least one takeoff parameter does not satisfy a takeoff-parameter threshold condition; and
      (b) a representation of at least a portion of a body of water that comprises the water that flows past the at least one hydrofoil;
    after the determination that the at least one takeoff parameter does not satisfy the takeoff-parameter threshold condition, control the at least one hydrofoil to generate downwards hydrofoil lift that maintains the at least one hydrofoil at least partially submerged in the water; and
    based on the determined representation of the at least the portion of the body of water, change one or more of a speed, altitude, heading, or attitude of the craft.

14. The control system of claim 13, wherein the at least one takeoff parameter comprises a speed of the craft, and wherein the determination that the at least one takeoff parameter does not satisfy the takeoff-parameter threshold condition comprises a determination that the speed of the craft is below a threshold speed.

15. The control system of claim 13, wherein the at least one takeoff parameter comprises an amount of aero lift generated by the at least one wing, and wherein the determination that the at least one takeoff parameter does not satisfy the takeoff-parameter threshold condition comprises a determination that the amount of aero lift generated by the at least one wing is below a threshold amount.

16. The control system of claim 13, wherein the at least one hydrofoil comprises a retractable hydrofoil configured to operate in: (i) an extended configuration in which the retractable hydrofoil extends below a hull of the craft at a first distance and (ii) a retracted configuration in which the retractable hydrofoil is retracted at least partially such that the retractable hydrofoil extends below the hull of the craft at a second distance, wherein the second distance is less than the first distance.

17. The control system of claim 13, wherein the at least one hydrofoil comprises one or more hydrofoil actuators configured to control an angle of attack of the at least one hydrofoil, and wherein controlling the at least one hydrofoil to generate the downwards hydrofoil lift that maintains the at least one hydrofoil at least partially submerged in the water comprises causing the one or more hydrofoil actuators to change the angle of attack of the at least one hydrofoil.

18. The control system of claim 13, wherein changing one or more of a speed, altitude, heading, or attitude of the craft based on the determined representation of the at least the portion of the body of water comprises changing one or more of a speed, altitude, heading, or attitude of the craft to thereby maintain a target distance between at least a portion of the craft and a surface of the body of water.

19. The control system of claim 13, further comprising program instructions stored on the non-transitory computer-readable medium that are executable by the at least one processor such that the control system is configured to:
  based on the determined representation of the at least the portion of the body of water, determine a distance between at least a portion of the craft and a surface of the body of water, wherein changing one or more of a speed, altitude, heading, or attitude of the craft based on the determined representation of the at least the portion of the body of water comprises changing one or more of a speed, altitude, heading, or attitude of the craft based on the determined distance between the portion of the craft and the surface of the body of water being less than or greater than a threshold distance.

20. The control system of claim 13, further comprising program instructions stored on the non-transitory computer-readable medium that are executable by the at least one processor such that the control system is configured to:
  determine a desired takeoff location in the body of water based on the determined representation of the at least the portion of the body of water, wherein changing one or more of a speed, altitude, heading, or attitude of the craft based on the determined representation of the at least the portion of the body of water comprises changing one or more of a speed, altitude, heading, or attitude of the craft such that the at least one hydrofoil exits the body of water at the desired takeoff location thereby causing the craft to enter wing-borne flight.

* * * * *